US007194417B1

(12) United States Patent
Jones

(10) Patent No.: US 7,194,417 B1
(45) Date of Patent: Mar. 20, 2007

(54) AUTOMATED METHOD AND SYSTEM FOR RECOGNIZING UNFULFILLED OBLIGATIONS AND INITIATING STEPS TO CONVERT SAID OBLIGATIONS TO A FULFILLED STATUS OR TO A NULL STATUS FOR RESALE

(75) Inventor: Robert E. Jones, Marana, AZ (US)

(73) Assignee: Amadeus Revenue Integrity, Inc., Tucson, AZ (US)

(*) Notice: Subject to any disclaimer, the term of this patent is extended or adjusted under 35 U.S.C. 154(b) by 508 days.

(21) Appl. No.: 09/668,494

(22) Filed: Sep. 22, 2000

(51) Int. Cl.
*G06Q 10/00* (2006.01)
(52) U.S. Cl. ...................................................... 705/5
(58) Field of Classification Search ................ 705/5, 705/6, 1
See application file for complete search history.

(56) References Cited

U.S. PATENT DOCUMENTS

| | | | | |
|---|---|---|---|---|
| 3,688,276 | A * | 8/1972 | Quinn | 358/1.18 |
| 4,449,186 | A * | 5/1984 | Kelly et al. | |
| 4,931,932 | A * | 6/1990 | Dalenkoff et al. | |
| 5,732,398 | A * | 3/1998 | Tagawa | |
| 5,797,127 | A * | 8/1998 | Walker et al. | |
| 5,832,484 | A * | 11/1998 | Sankaran et al. | 707/8 |
| 5,948,040 | A * | 9/1999 | DeLorme et al. | |
| 6,329,919 | B1* | 12/2001 | Boies et al. | |
| 6,405,198 | B1* | 6/2002 | Bitar et al. | 707/6 |
| 2002/0099649 | A1* | 7/2002 | Lee et al. | 705/38 |

FOREIGN PATENT DOCUMENTS

EP    1 065 637    * 1/2001

OTHER PUBLICATIONS

Henderson; Turning Bookings into Passengers; Oct. 1999; Air Transport World v36n10 p. 109-110; dialog copy 2 pages.*

(Continued)

*Primary Examiner*—Thomas A. Dixon
(74) *Attorney, Agent, or Firm*—Kenneth E. Darnell

(57) ABSTRACT

An automated method and system for identifying date-sensitive entries in a database wherein an obligation must be satisfied relative to the entry according to instructions provided by the beneficiary of the obligation. The method and system of the invention can be practiced from a location remote from the database and are particularly useful in a number of situations and particularly those wherein unticketed reservations are maintained in a storage medium for a time prior to issuance of a ticket to "firm up" the reservation to a ticketed status. The present system and methodology finds particular utility enforcing ticketing time limit rules on travel agency or other reservation and ticket issuers involved in the reserving and ticketing of airline bookings and the like and results in the reduction of no-shows and overbooking while increasing onboard load factors on sold-out flights in particular. The automated system of the invention is capable of operating essentially continually throughout seven days a week and twenty-four hours each day to constantly "firm" all or selected flights of a given carrier. Enforcement of ticket time limit rules can extend at the option of a user to booking class, market, point of sale and the like or any combination thereof.

30 Claims, 46 Drawing Sheets

OTHER PUBLICATIONS

Anonymous; AAI Tools Identify Fictitious Bookings in Real-Time; PR Newsire; Nov. 1999; dialog copy 1 pages.*

No author; AAI Customer's Tout Impact of Flight Firming, Dec. 1998; PR Newswire; 1 page.*

No author; COPA Airlines Selects FSAS for Flight Scheduling and New Automated Schedule Update Module, Feb. 1999; PR Newswire, 1 page.*

No author; National Airlines Selects AAI for Frequent Flier, Flight Scheduling, and Flight Firming Software, Feb. 1999; PR Newswire; 1 page.*

No author; Grupo TACA Selects AAI's Predator Flight Firming Application; Mar. 1999; PR Newswire, 1 page.*

No author; American Airlines Chooses AAI's Automated Flight Firming System; Sep. 15, 1999; PR Newswire, 1 page.*

* cited by examiner

Fig. 7A
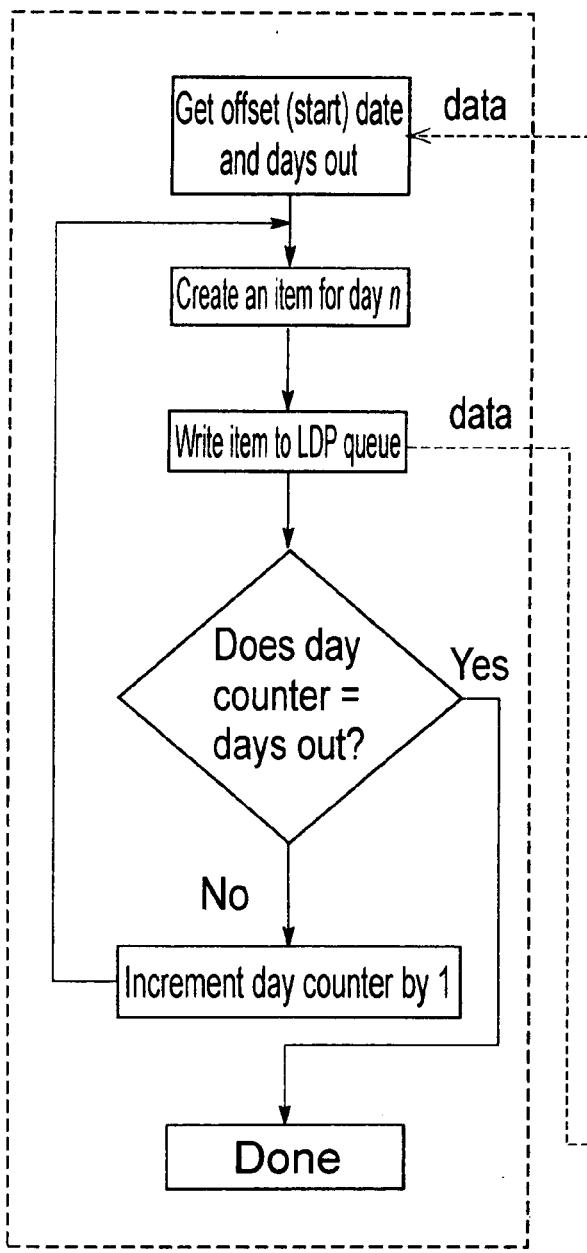
Fig. 7
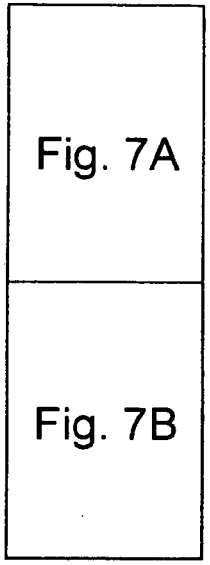
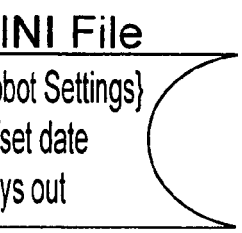
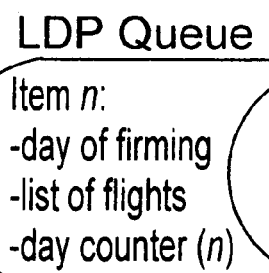

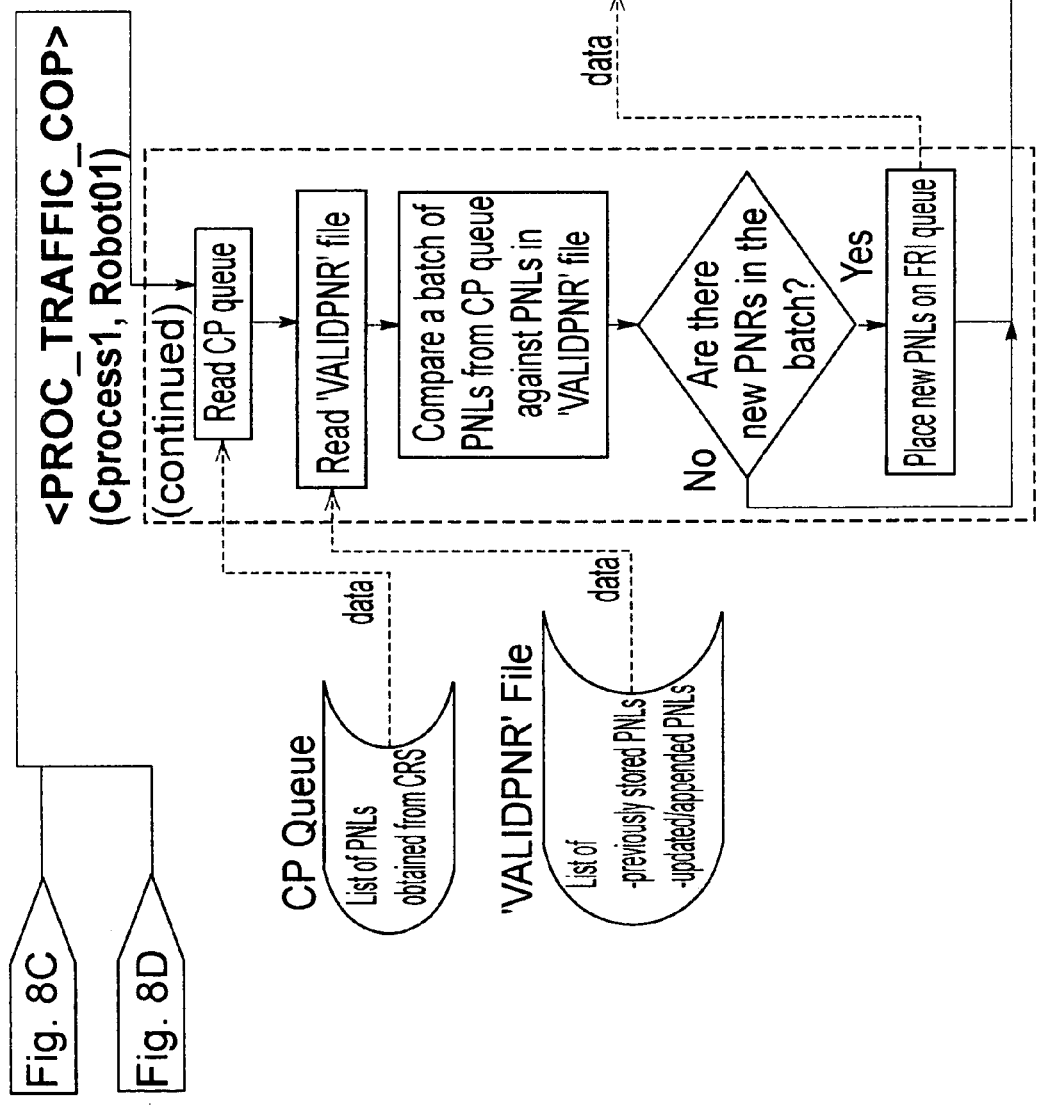

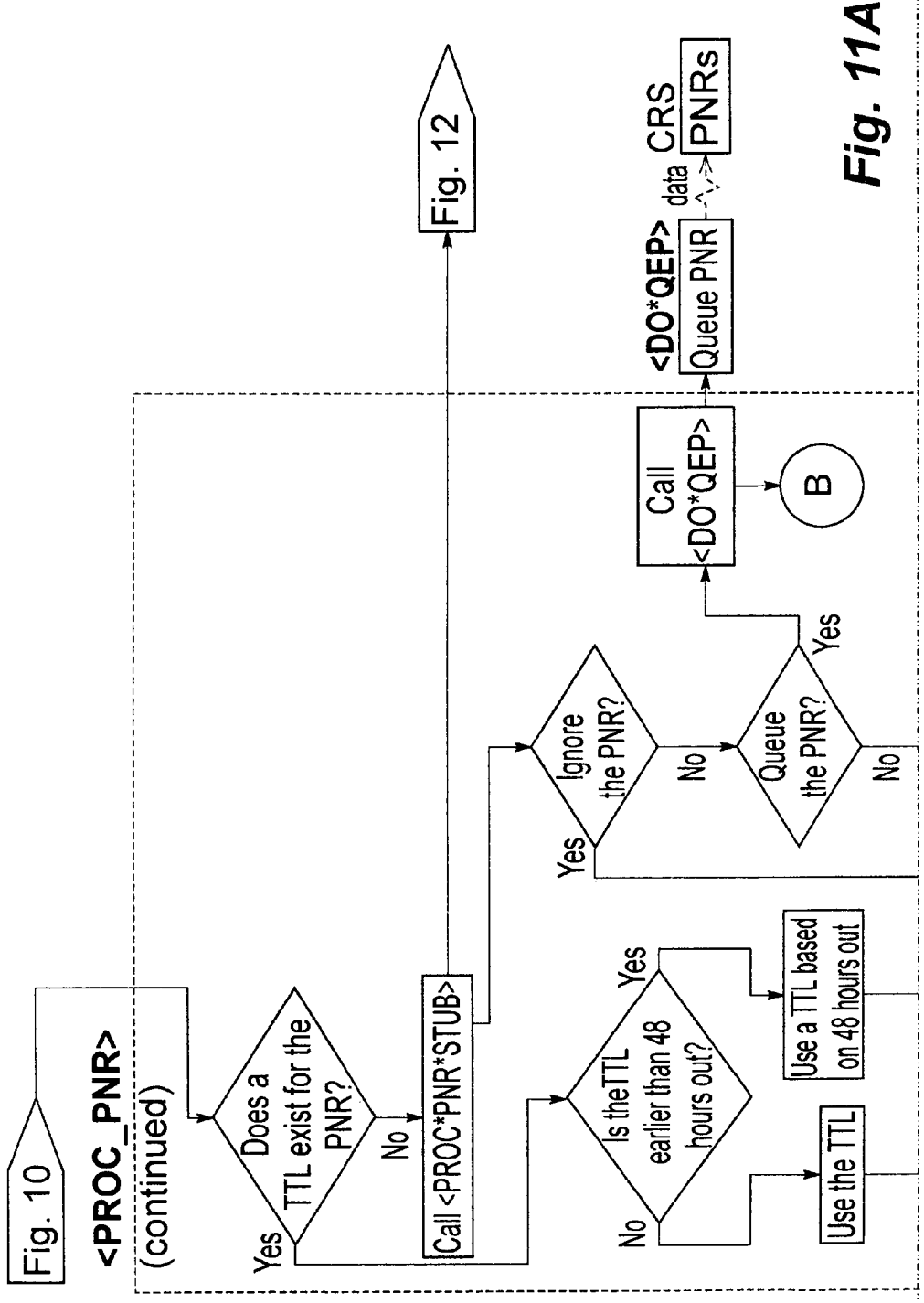

Fig. 16

| Fig. 16A |
|----------|
| Fig. 16B |

Fig. 16A

From Fig. 15 → `<KILL_DUPE_SEGMENTS>` (continued)

- Does CHECK DUPE FOR CLASS = YES?
  - No → (exit)
  - Yes ↓
- Are all classes in DUPE CLASS IGNORE list?
  - No ↓
  - Yes → (exit down)
- Does Q IF JUST DUPE CLASS IGNORE CLASSES = YES?
  - No ↓
  - Yes → (exit)
- Are any cities in ALT DUPE CLASS Q CITIES-1 list?
  - → Use queue specified by ALT DUPE CLASS Q-1
- Are any cities in ALT DUPE CLASS Q CITIES-2 list?
  - → Use queue specified by ALT DUPE CLASS Q-2

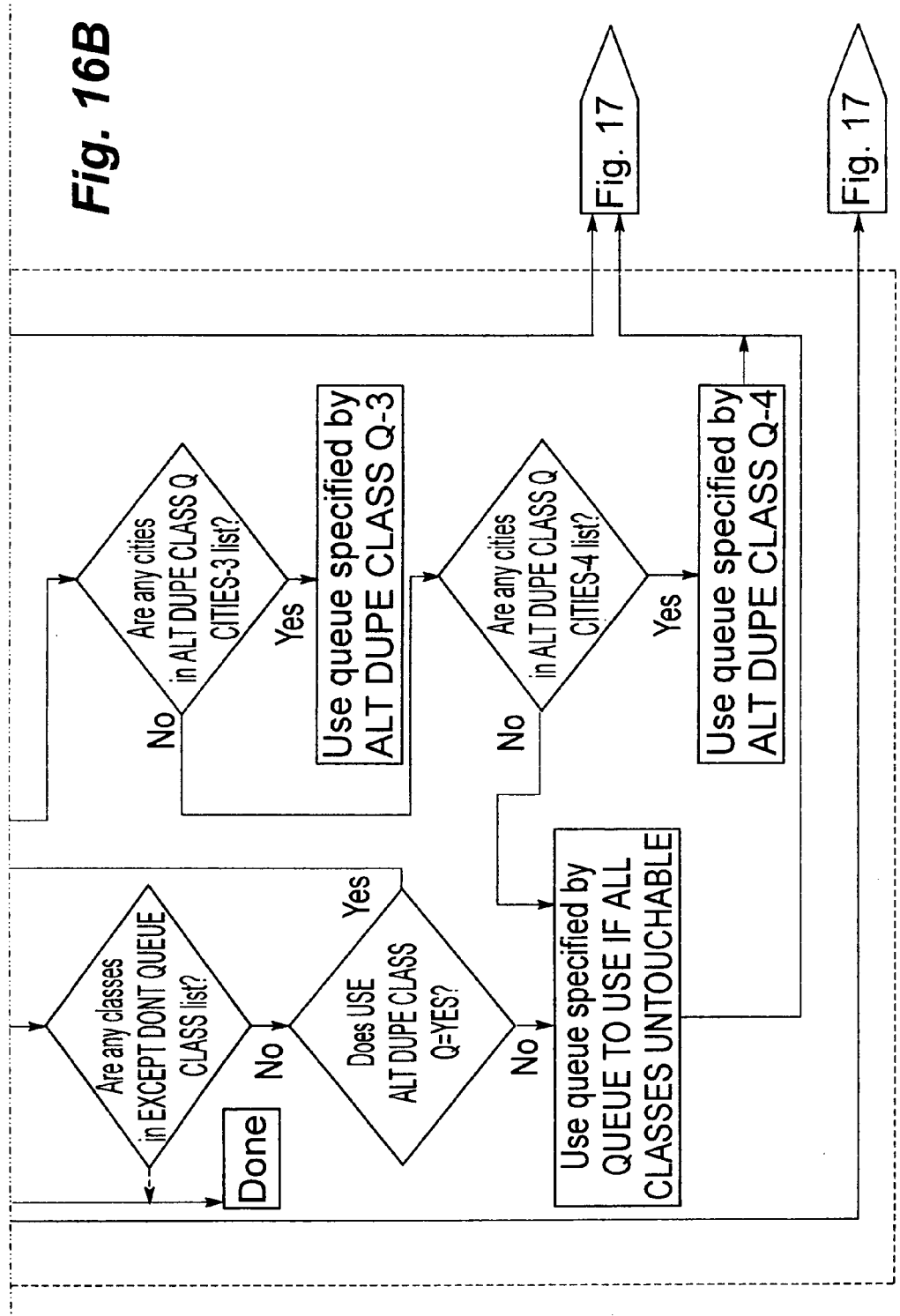

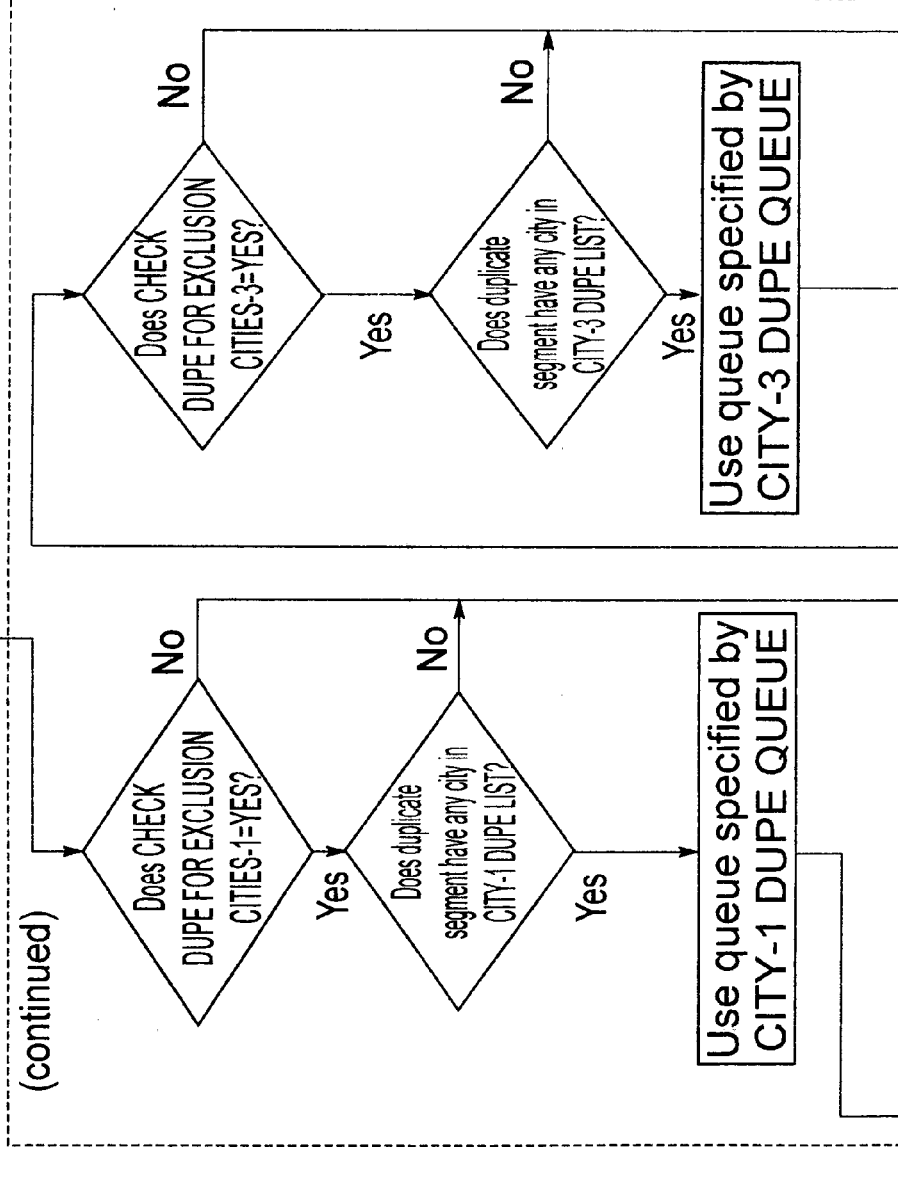

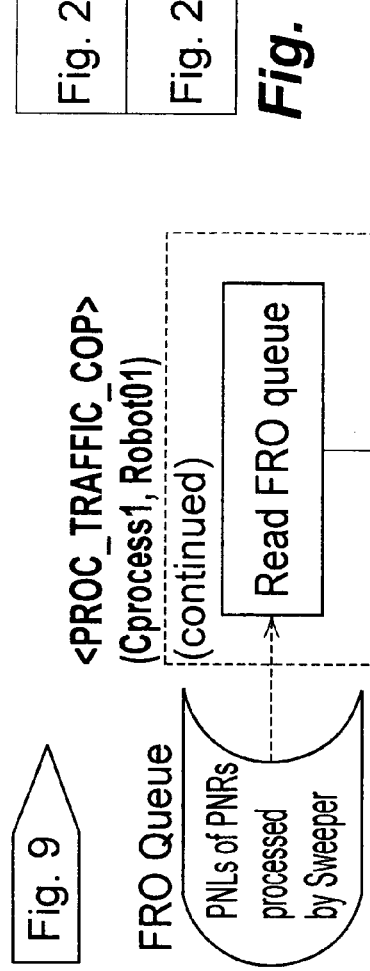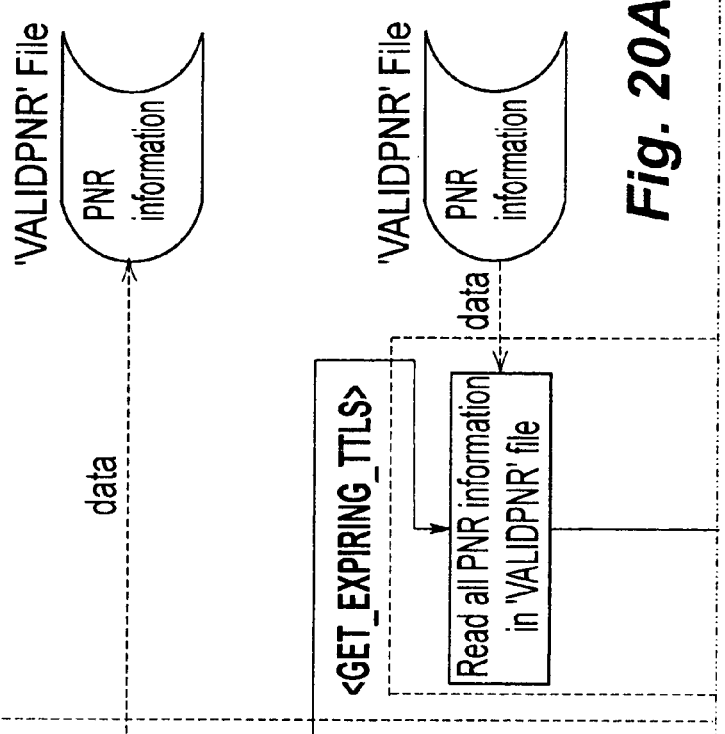
Fig. 20

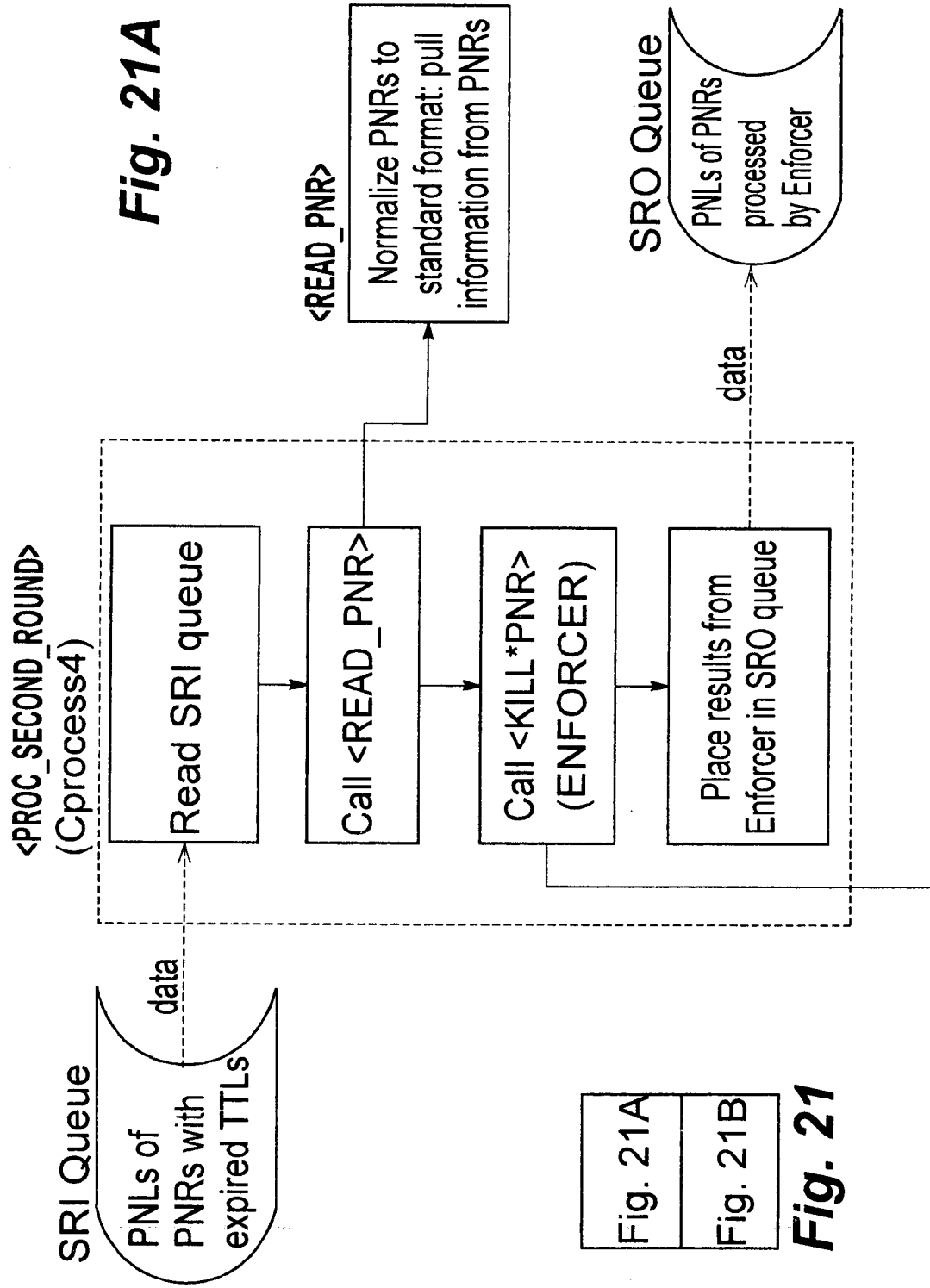

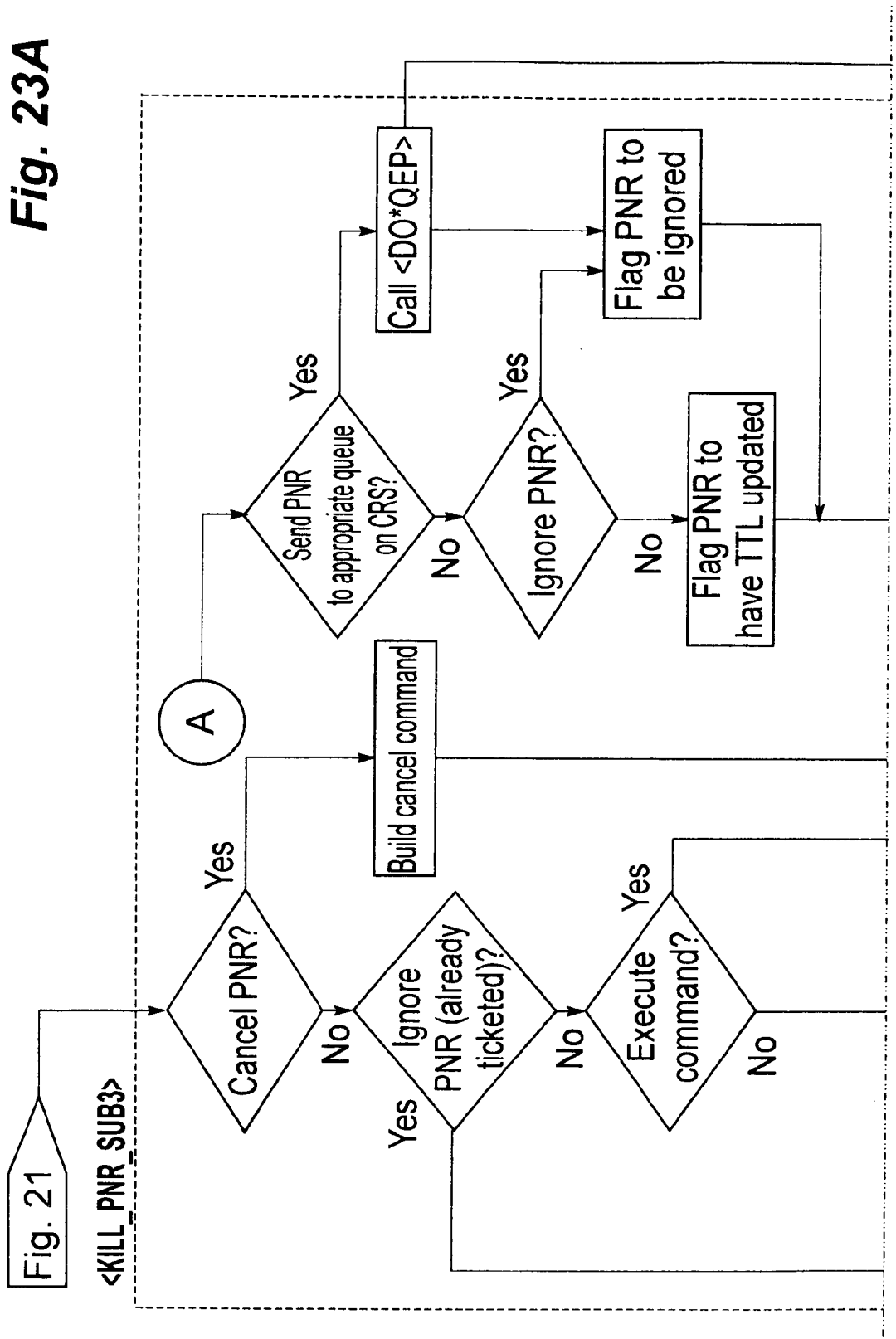

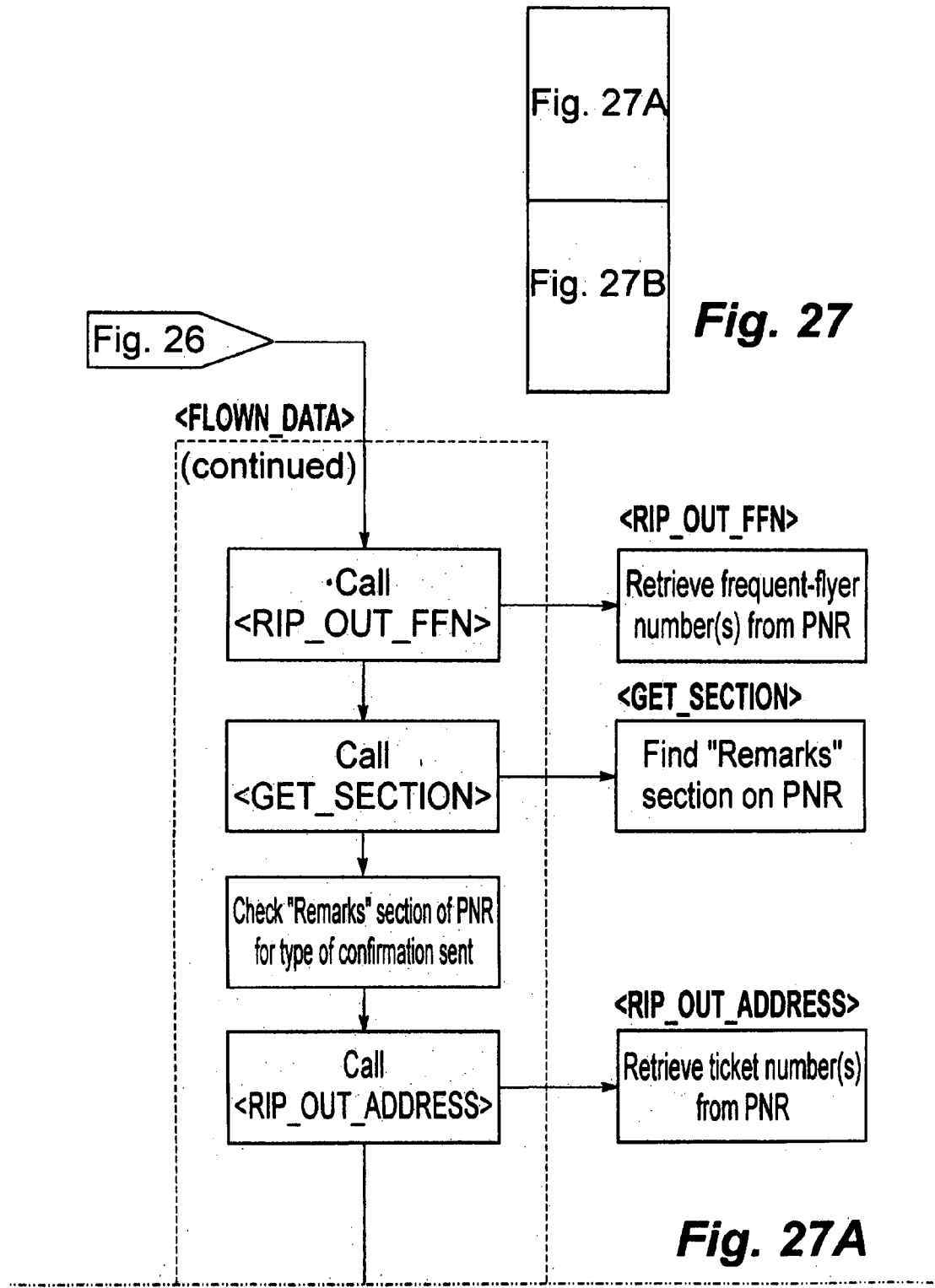

AUTOMATED METHOD AND SYSTEM FOR RECOGNIZING UNFULFILLED OBLIGATIONS AND INITIATING STEPS TO CONVERT SAID OBLIGATIONS TO A FULFILLED STATUS OR TO A NULL STATUS FOR RESALE

BACKGROUND OF THE INVENTION

1. Field of the Invention

The invention relates to automatic identification of unticketed reservations stored in a database, which reservations are required to be ticketed according to certain criteria, the invention automatically noticing a reservation-generating entity at least once of the ticketing requirement and canceling the reservation according to certain criteria if a ticket is not issued for the reservation according to the criteria, the invention further being capable of functioning remote from the database and reservation-generating entity.

2. Description of the Prior Art

Certain time-sensitive services which are reserved by one or more reservations entities must be used as of a date certain or else the opportunity of the service provider to benefit from the reservation is forever lost. A particular example can be found in the airline industry where reservations are made by travel agents, flight packages, various booking agents and even an airline itself, the reservations being maintained in a central reservation system which is effectively a database which can be accessed from remotely of the database. The airline in this situation is the service provider and stands to lose appreciable monies if reservations booked into the central reservation system are not ticketed prior to the service to be provided, that is, a particular flight. It is imperative that a reservation which is not going to be ticketed be removed from the central reservation system well before the service, that is the flight, so that the seat can be sold to a user who will actually buy a ticket and sit in the reserved seat.

For various reasons, some passengers abuse reservations systems by making speculative reservations either in their own names or in fictitious names. Often, multiple reservations are made by one person for a given flight with an outcome often being that none of the reservations are actually used. In order to combat such practices by the public, airlines in particular often resort to overbooking of a flight in order to increase the load factor on flights which are ostensibly sold out. Airlines in particular wish to guard against situations wherein a flight is sold-out prior to the day of departure and yet departs with empty seats. In such situations, revenue is forever lost especially in view of the likely fact that customers wishing to buy a seat were turned away since seats were apparently no longer available. In essence, the reduction of no-show factors on sold-out flights or the like increases revenue. Revenue can also be increased on flights which are not sold out by the practice of "flight firming", that is, periodically checking flight reservations or the like in a central database to determine whether each reservation has been ticketed as of a certain date and time determined according to a given set of criteria. According to these criteria, a notice may be forwarded to the ticketing entity responsible for the reservation and noting that a ticket must be noted in the database prior to a certain time, else the reservation will be canceled so that the reservation can be resold. Removal of non-ticketed reservations of an airline removes speculative reservations or bookings from flight inventories and provides an opportunity to reserve the seat anew in the name of a ticket-buying passenger.

Simplified flight firming has previously been conducted manually especially once a flight has become extremely overbooked or during peak travel periods when overbooking is common. However, manual flight firming is a labor intensive effort which is expensive and difficult to manage. In essence, manual flight firming involves the checking visually of a printout of reservations contained in a central reservations system with each reservation being checked to determine if the reservation has been ticketed. For those reservations which have not been ticketed and which do not fit into a given set of parameters which would excuse the non-ticketing, the manual flight firmer must then contact the reservations issuing agency such as a travel agency or the like with the information that the reservation will be canceled if a ticket is not issued by a certain date. Manual follow-up is necessary in order to determine if the ticket has been issued and, if not, a second notice may be provided depending upon another set of criteria.

Ticketing time limit rules can be set by using flight number, origin, destination, booking class, departure date, booking date, passenger type code, point of sale, Frequent Flier number, global distribution system or GDS requirements, and other special instructions (OSI), messages or any combination thereof. Flexibility of this nature allows air carriers to segment very small portions of each passenger name record or PNR for specialized flight firming to allow for contract fares, wholesalers, consolidators, and numerous other special situations.

Flight firming according to the invention can be automatically carried out from a remote location. Flight firming can be continuously accomplished to enforce ticketing time limits and to maintain flight inventories free of speculative bookings, thereby resulting in lower no-show percentages, lower spoilage in revenue spill and higher onboard load factors on sold-out flights in particular. Flight firming according to the invention can also automatically remove speculative bookings made under assumed names and remove multiple bookings and the like while applying special ticketing requirements to certain accounts, reservations entities or individuals based on criteria including the amount of business previously provided for the holder of the reservation.

While the automated and remotely operable system of the present invention can be utilized other than will be explicitly described herein, it is to be understood that the present methodology and system operates particularly well for the practice of "flight firming" as will be described hereinafter.

SUMMARY OF THE INVENTION

In a preferred embodiment, the invention provides an automated method and system capable of operation from a remote location for identifying date-sensitive entries in a database wherein an obligation is to be satisfied relative to each entry according to instructions provided by the beneficiary of the obligation. In a particular application of the present automated method and system, use within an airline's reservations system is contemplated with the present method and system through connection to a central reservation system identifying individual passenger name records which have not been ticketed and which must be ticketed by a date certain according to pre-established ticketing time limit instructions. On identification of a ticketless reservation, notice is forwarded by the present method and system to a ticketing entity which is responsible for establishment of the reservation, this notice including a demand that a ticket be issued by a certain time according to instructions provided to the automated system of the invention. The present method and system can further be configured to issue more than one notice in the event that a reservation is not ticketed, particular reservations being handled according to the ticketing time limit instructions. These instructions further determine whether or not the reservation is to be canceled in the even that the reservation does not become ticketed by a certain date. In this way, certain classes of reservation holders, such as contract reservations, special frequent flier reservations, etc. will not be canceled even though notices may or may not be forwarded depending upon the ticketing time limit instructions provided by the airline for which the services are provided.

The foregoing is generally referred to in the airline industry as "flight firming" and has as particular objectives the enforcement of ticketing time limit instructions or rules on entities which issue reservations and/or tickets such as travel agencies and the like. A further intent of the process of "flight firming" is the reduction of lost revenue from speculative bookings, the reduction of no-shows and oversales and an increase of onboard load factors on sold-out flights. The ticketing time limit rules can be configured to provide the ability for enforcement based on class, market, origin/destination city, ARC/IATA, booking country, booking date, departure date, etc. or any combination thereof. Flight firming can be conducted at a remote location and can be automated to run twenty-four hours a day, seven days a week, with maximum "up-time" in order to ensure that flights are continually firmed. Removal of non-ticketed reservations from a central reservations system not only removes speculative bookings from flight inventories and global distribution system invoices, the removal also provides the opportunity for reselling of the seat to a person who actually intends to utilize the flight service. Flight inventories are therefore rendered free from speculative bookings with resulting decreases in no-show percentage, lower spoilage and revenue spill, and higher onboard load factors on sold-out flights.

The present automated method and system operates to produce flight firming with two robotic applications, a set of robots operating on a set schedule to review flight inventories for any previously unseen passenger name record or PNR. The system recalls each PNR which has previously been seen and only identifies and takes action relative to a new PNR, thereby reducing the time necessary for accomplishment of the function as well as reducing needless churning through a reservations system. When a new PNR is found, the robot determines if the PNR qualifies for a ticketing time limit set of rules or TTL, these rules being based on carrier-set flight firming parameters. The robot then applies the proper TTL to the PNR and sends a message to the booking agent responsible for the PNR requesting a ticket number by the date/time of the TTL if the reservation is not shown to be ticketed. The message is appended to the PNR as forwarded to the booking agent and is sent to a message queue at the office of the booking agent. Accordingly, a high assurance is provided that the TTL message will be received and actioned by the booking agent. Once the message is sent, the robot logs the time of expiration of the TTL internally.

A log created by the first robot is worked by a second robot to query all PNRs after expiration of respective TTLs. If the second robot finds a ticket number, the PNR is logged as ticketed and the robot moves on. If no ticket number is found, the second robot actions the PNR as per the flight firming parameters of the carrier. A carrier sets rules for the TTL and for operation by the second robot in the event of a ticketless reservation even after expiration of the TTL by any set of desired standards, these rules providing flexibility which allows carriers to segment any desired portion of their particular PNRs for specialized flight firming and to allow for contract fares, wholesalers, consolidators and numerous other "special situations."

The flight firming function is configured to accept any airline ticket stock or, in the alternative, to accept only ticket stock from those carriers with whom a particular carrier has an Interline T&B Agreement. Further, a database of previously accepted ticket numbers can be maintained so that a rejection can be made of any ticket number "previously seen" which may be provided in new PNRs. Duplicate ticket numbers can therefore be checked by the present system. Special handling can be provided by assigning special TTLs to wholesalers, corporate accounts or reservations denoting a certain status of frequent flier account or other special situation as desired.

The second robot employed in the flight firming process can check PNRs before the TTL expires and send a second request prior to TTL expiration if a ticket number is not found. Multiple requests can therefore be made of the ticketing agency.

Customized flight firming scheduling can be provided based upon a carrier's booking curve such that work can be concentrated within the next ninety days of each day with firming within a time period from ninety to three hundred thirty days once a week, as an example. A period of high traffic can be firmed once a week from three hundred thirty days to one hundred eighty days prior to the high traffic period and then daily from one hundred seventy-nine days up through flight date, as an example. Seats thus can be caused to remain available for sale closer to the flight departure date to more effectively reduce no-shows and to provide maximum beneficial load factor.

The method of the invention documents all automated flight firming process operations when working the flights of a given carrier. A copy is made of each new PNR before messaging the PNR, therefore providing the ability to create a PNR database useful for management of customer relations. Further, the present method logs every entry which the robots make in the PNR, as well as responses from the global distribution system or GDS. Another copy is made of the PNR when checking for a ticket number, the foregoing documentation being essential to assuring that questions can be answered as to when and why certain steps were taken, such as cancellation of the reservation, and also alleviates any basis for dispute over how a given PNR was processed.

Still further, management reports can be generated daily and monthly in addition to the logs to advise of flight firming activity. A daily report can summarize the number of PNRs worked the previous day, how many PNRs were assigned TTL requests, how many second warnings were issued and how many PNRs were canceled by agencies and by the present system. A database can also be created from canceled segments with creation of standard reports which illustrate cancellations by city pair, class of service and AITA/ARC number.

The present method and system provides a further robot or robotic application which searches first past logs looking for fictitious names in all of the new PNRs which are seen within a given period of time, an existing database of fictitious names created from BIDT audits inter alia are used to identify attempts to create a PNR with a fictitious name. While action may not be taken relative to such PNRs by the present system, these results can be daily communicated to a carrier such as by email or the like.

Similarly, a robotic application searches PNRs for duplicate flight segments and weeds out duplicate bookings by sifting through connections and similar cities. This robotic application can be customized to handle waitlists clearance from coach to premium class and waitlists clearance within a cabin from a higher to a lower fare of class. Additionally, duplicates so discovered can be canceled or queued as desired.

The present system can operate in concert with other systems which identify "passive" bookings, the issuance of e-tickets or processing of airline teletype reject queues.

Accordingly, it is a primary object of the invention to provide an automated method and system for identifying date-sensitive entries in a database wherein an obligation must be satisfied relative to the entry according to instructions provided by the beneficiary of the obligation.

It is another object of the invention to provide an automated method and system operable from a remote location for applying the present automated method and system to airline flight firming processes so that unticketed reservations maintained in a reservations system for a time prior to issuance of a ticket to "firm" the reservation to a ticketed status can be scrutinized by the present system to determine whether ticketing time limit rules established by a carrier have been adhered to with messages being forwarded to the reserving entity noticing the need for issuance of a ticket for a given PNR.

It is a further object of the invention to provide an automated method and system operable from a remote locate which is capable of enforcing ticketing time limit rules on travel agency reservations and the like in order to reduce lost revenue from speculative bookings, to reduce no shows and oversales, to increase onboard load factors on sold-out flights and to enforce complex ticketing time limit rules based on a variety of factors set by a particular service provider such as an airline carrier.

Further objects and advantages of the invention will become more readily apparent in light of the following detailed description of the preferred embodiments.

BRIEF DESCRIPTION OF THE DRAWINGS

FIG. 9A is a flow chart illustrating operational sequences relative to the identification of new PNRs;

FIGS. 15, 16 and 17 are related flow charts which allow for checking of duplicate segments;

DESCRIPTION OF THE PREFERRED EMBODIMENTS

The methodology of the invention is best carried out with the use of and the system of the invention best comprises commercially available computer apparatus such as that referred to as a personal computer or PC as is manufactured and marketed by International Business Machines. Computer apparatus compatible with such products of IBM, such as Compaq Personal Computers, may also comprise apparatus particularly useful in creation of the system of the invention. Such apparatus can conveniently use an operating system such as Microsoft Windows and particularly Windows NT and Windows 2000. Novell Networking may also be used satisfactorily. It is to be understood that computing apparatus of other manufacture can be operable to produce the functions of the present methodology and to comprise the present system whether or not used within the preferred operating system environment.

Figure 1A:
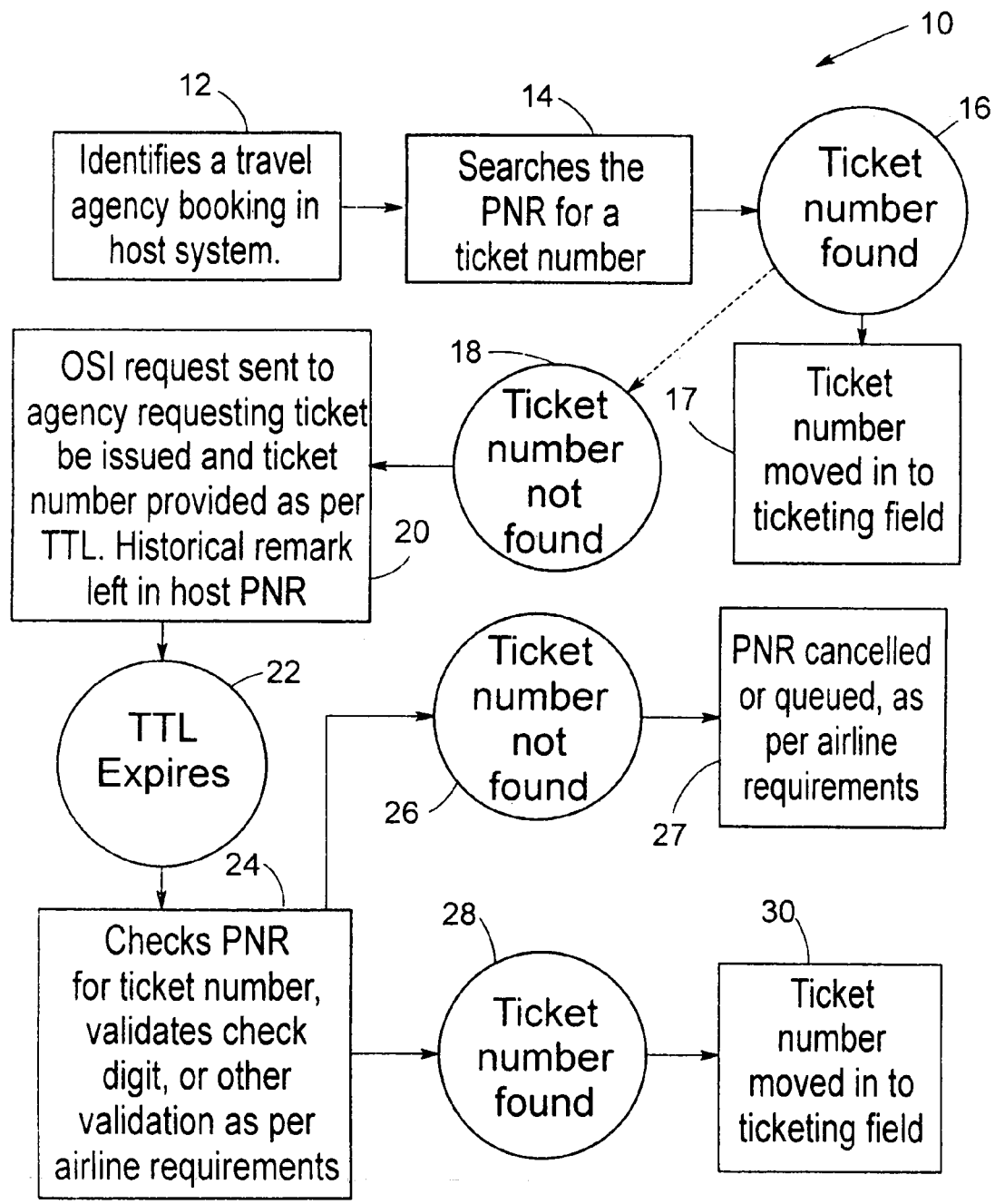
FIG. 1A is a diagrammatical representation of a generalized system according to the invention illustrating operational interrelationships of the component parts of the system as well as operations of said component parts.
Figure 1B:
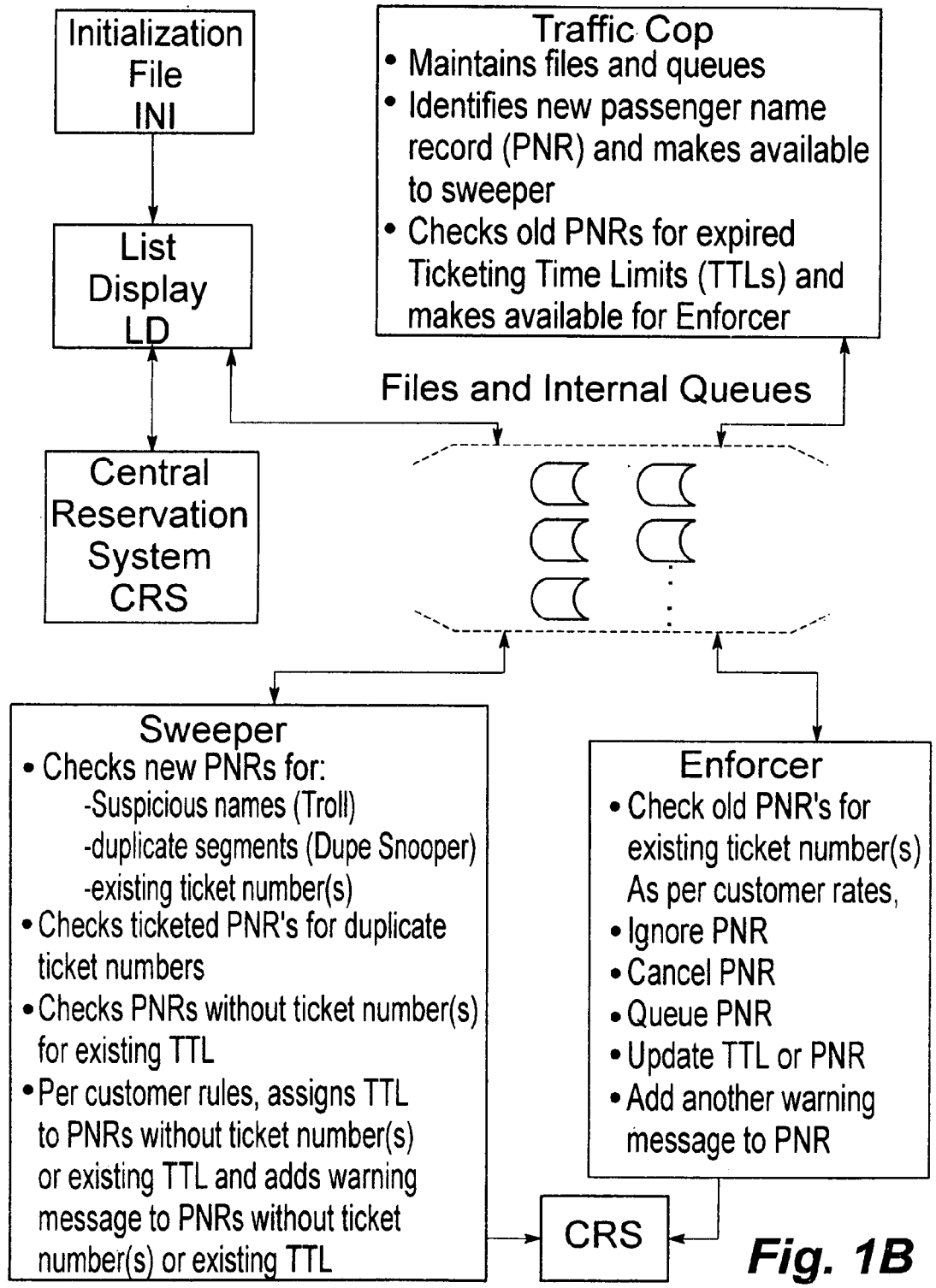
FIG. 1B is a diagrammatical representation of a particular embodiment of the invention and having general representations of the several coordinated program features.

Referring now to FIG. 1, a process flow diagram is shown of a flight firming module represented generally by the numeral 10 as comprising the general process of a system referred to herein and in the business operations of the assignee for convenience as Predator, a trademark of the assignee. The term Predator is representative of a family of modules and robotic applications useful for performing the functions herein described, this family of modules and robotic applications having been developed by the assignee for performing the methodology of the invention. As can be seen from the process flow diagram of FIG. 1, identification is made at 12 of a travel agency booking, for example, in a host system. The element designated as 12 in FIG. 1 also represents a travel agency or other reservation booking entity capable of booking a passenger name reservation or PNR into a host system such as a central reservation system or CRS. A PNR can be booked into the CRS by the travel agency or similar entity with a ticket number attached to the PNR or a ticket number may be later attached to the PNR. Search is made at 14 relative to the PNR identified at 12 in order to determine whether the PNR has a ticket number. In the event that a ticket number is found at 16, the ticket number is moved into a ticketing field whereby the PNR is identified as being "ticketed" and is no longer a concern to operation of the present system. In the event that a ticket number is not found at 18, the module 10 of the invention sends an OSI request to the agency which made the reservation requesting that a ticket be issued and a ticket number provided as per ticketing time limit rules or TTL as have been established by a carrier according to flight firming parameters which the carrier wishes to impose. The OSI request to other special instructions which are provided to the reservation issuing agency, the instructions primarily relating to the need for ticketing of the reservation by a date certain in order to prevent cancellation of the reservation. These functions occur at 20 along with logging of the activity in the host PNR.

Assuming that the TTL expires at 22, a check is then further made at 24 of the PNR previously identified in order to determine whether this PNR has been provided with a ticket number, the system being capable of validating according to predetermined requirements. In the event that a ticket number has not been issued for the PNR as noted at 26, the process of notification can be repeated through the functionality shown at 20 according to the TTL codes which have been chosen by the particular carrier. When a ticket number has not been found at 26, requirements imposed on the system by the carrier can cause immediate cancellation of the PNR or queuing of the PNR according to carrier requirements.

In the event that the check at 24 results in location of a ticket number as represented at 28, then the reservation is considered complete as at 30 and the ticket number is moved into a ticketing field.

Particular importance is attached to the functionality at 12 wherein the PNR is first identified. A robotic or robotic application, known herein as Sweeper, a proprietary term of the assignee, operates on a set schedule and identifies from flight inventories those PNRs which have not been seen previously. Accordingly, PNRs which have been seen previously are not analyzed since such analysis is prevented by a "traffic cop" function which prevents repeat analysis of PNRs, thereby reducing time necessary to process flight inventories as well as reducing needless churning through a reservation system. The robot Sweeper therefor only identifies for action a new PNR at which time it is determined whether the new PNR qualifies for a TTL based on carrier-set flight firming parameters. The process generally shown in the flow diagram of FIG. 1 then proceeds as described.

A second robotic application known as Enforcer, a term proprietary to the assignee, works off of the log created by Sweeper at 20 and queries PNRs after the expiration of the TTL as represented at 22. The robotic application Enforcer thus provides those functions enumerated thereafter in the process flow diagram of FIG. 1.

Reference will now be made to FIGS. 2 through 34 and to tables provided hereinafter in order that the particulars of the present methodology and system can be appreciated. For the sake of convenience, it is necessary to utilize specific terms which are defined in tabular form hereinafter.

Symbols and line types used in the drawings are as follows:

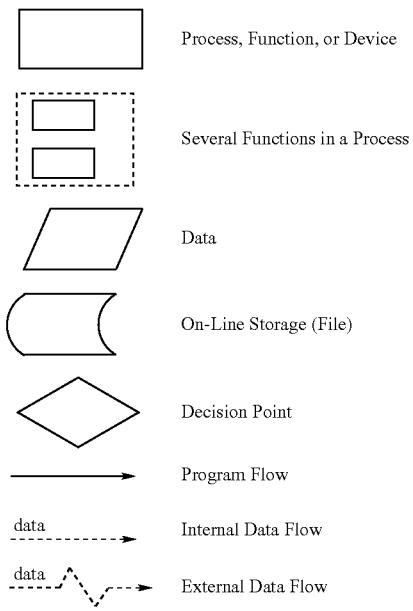

Figure 2:
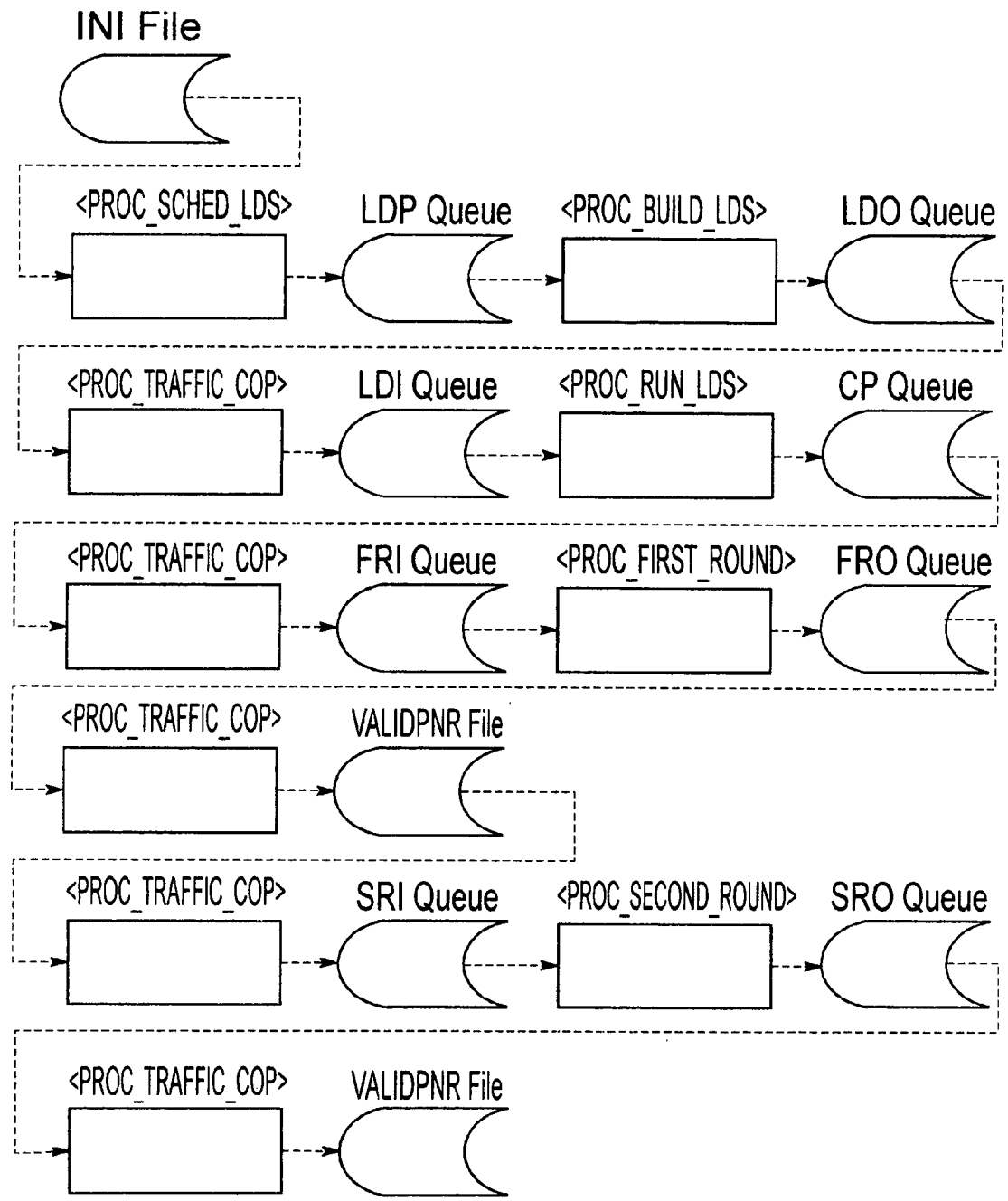
FIG. 2 is a diagrammatical representation illustrating organization of data flow within the system of the invention and is referenced to Table I in the specification.

Referring now to FIG. 2, a representation is made of data flow processing from an .INI file at the upper left-hand corner of FIG. 2 to a VALIDPNR File at the lower, central portion of FIG. 2. FIG. 2 is to be interpreted in view of Table I as follows:

TABLE I

| Queue Name | Meaning |
| --- | --- |
| LDP | List Display Parameters |
| LDO | List Display Output |
| LDI | List Display Input |
| CP | Candidate PNRs |
| FRI | First-Round Input |
| FRO | First-Round Output |
| SRI | Second-Round Input |
| SRO | Second-Round Output |

A typical .INI File entry for robots of the XAL example family are to be seen in Table II and Table III. It is to be understood that numerous entries can be contained in the actual .INI files of such a robot.

TABLE II

Typical .INI File
Robot XAL01
XAL01.INI file:
[Config]
Wssize = 40M

| | |
|---|---|
| Initial workspace = | 24 ROBOT |
| Responsiveness = | 200 |
| [Robot Settings] | |
| RUN LD BATCH SIZE = | 300 |
| FIRST ROUND BATCH SIZE = | 100 |
| SECOND ROUND BATCH SIZE = | 100 |
| CPROCESS1 = | PROC_TRAFFIC_COP |
| CPROCESS2 = | PROC_RUN_LDS |
| CPROCESS3 = | PROC_FIRST_ROUND |
| CPROCESS4 = | PROC_SECOND_ROUND |
| CPROCESS5 = | PROC_BUILD_LDS |
| TPROCESS1 = | Top_Of_Day |
| TPROCESS1-MON TIME = | 00:01 |
| TPROCESS1-TUE TIME = | 00:01 |
| TPROCESS1-WED TIME = | 00:01 |
| TPROCESS1-THU TIME = | 00:01 |
| TPROCESS1-FRI TIME = | 00:01 |
| TPROCESS1-SAT TIME = | 00:01 |
| TPROCESS1-SUN TIME = | 00:01 |
| TPROCESS2 = | PROC_SCHED_LDS 'DAILY FULL SCAN' |
| TPROCESS2-MON TIME = | 08:00 |
| TPROCESS2-TUE TIME = | 08:00 |
| TPROCESS2-WED TIME = | 08:00 |
| TPROCESS2-THU TIME = | 08:00 |
| TPROCESS2-FRI TIME = | OFF |
| TPROCESS2-SAT TIME = | 11:00 |
| TPROCESS2-SUN TIME = | 11:00 |
| DAILY FULL SCAN-MON = | 0 60 |
| DAILY FULL SCAN-TUE = | 0 60 |
| DAILY FULL SCAN-WED = | 0 60 |
| DAILY FULL SCAN-THU = | 0 60 |
| DAILY FULL SCAN-FRI = | 0 60 |
| DAILY FULL SCAN-SAT = | 0 60 |
| DAILY FULL SCAN-SUN = | 0 60 |

TABLE III

Typical .INI File
Robot XAL02
XAL02.INI file:
[Config]
Wssize = 40M

| | |
|---|---|
| Initial workspace = | 24 ROBOT |
| Responsiveness = | 200 |
| [Robot Settings] | |
| FIRST ROUND BATCH SIZE = | 100 |
| SECOND ROUND BATCH SIZE = | 100 |
| CPROCESS1 = | PROC_BUILD_LDS |
| CPROCESS2 = | PROC_RUN_LDS |
| CPROCESS3 = | PROC_FIRST_ROUND |
| CPROCESS4 = | PROC_SECOND_ROUND |
| TPROCESS1 = | EMAIL_SUSPICIOUS_NAMES |
| TPROCESS1-MON TIME = | 00:01 |
| TPROCESS1-TUE TIME = | 00:01 |
| TPROCESS1-WED TIME = | 00:01 |
| TPROCESS1-THU TIME = | 00:01 |
| TPROCESS1-FRI TIME = | 00:01 |
| TPROCESS1-SAT TIME = | 00:01 |
| TPROCESS1-SUN TIME = | 00:01 |
| TPROCESS2 = | ADD_CANCELS_TO_DB ' ' |
| TPROCESS2-MON TIME = | 00:02 |
| TPROCESS2-TUE TIME = | 00:02 |
| TPROCESS2-WED TIME = | 00:02 |
| TPROCESS2-THU TIME = | 00:02 |
| TPROCESS2-FRI TIME = | 00:02 |
| TPROCESS2-SAT TIME = | 00:02 |
| TPROCESS2-SUN TIME = | 00:02 |

Figure 3:
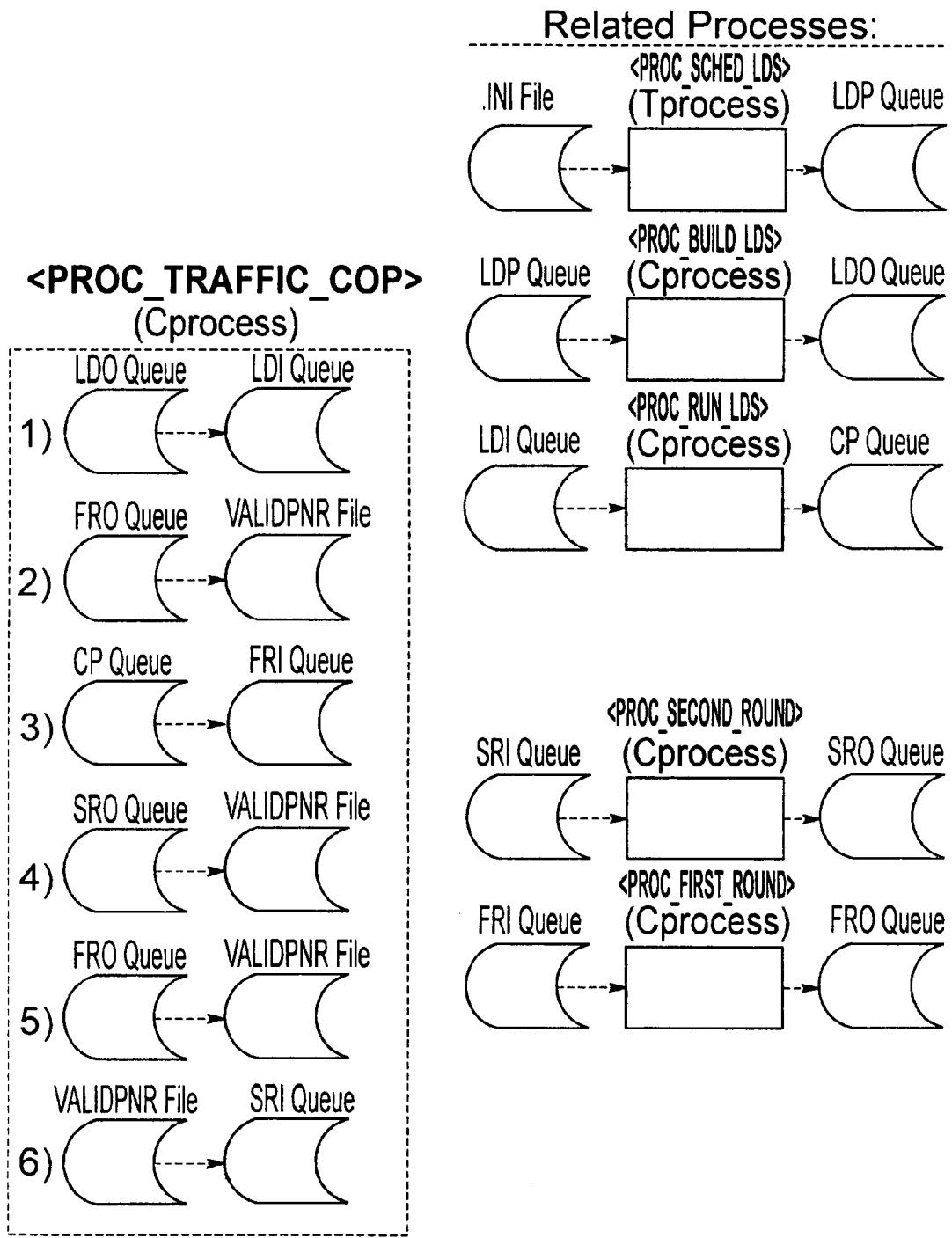
FIG. 3 is a diagrammatical representation of the sequences of operations involving queues which occur in operation of the present system.

Referring also to FIG. 3, sequences of operations involving queues built according to the present methodology are illustrated, the definitions of terms found in FIG. 3 being herein provided.

For the sake of simplicity and convenience, terms and abbreviations herein employed are provided in tabular form in Tables XIV through XX appended to the end of this specification immediately before the Claims section of this application. Definitions of terms herein employed are provided. It is to be understood that at least certain of these definitions will have been provided at other locations within the present specification.

Processes necessary for starting and running a robot for accomplishment of flight firming is now provided along with definition of terms so employed. Particular reference is made to FIGS. 4 through 6 relative to robot start-up, scheduling and running, these drawings being linked as indicated in the drawings themselves and in tabular form provided hereinafter.

A robot according to the invention is a single instance of APL, that is, A Programming Language, running on a PC or personal computer and driven by a unique .INI file which describes the processes to be run by the robot. The APL language is inherently efficient and effective for the processes herein provided due to orientation of this language toward mathematics and logic. More than one robot can be used for a given customer family and for as many processes as are necessary. However, each robot serves only one customer. Each robot further runs on a particular personal computer and several robots can be run simultaneously on the same computer. As an example of an actual system configuration, the use of two servers can be chosen which are assigned as storage for the robots. An H server can contain the robots per se while an I server contains reports and logs produced by the robots. As an example, for a customer known as Example Air Line, the family would be identified as "XAL", the first robot then being XAL01, the second robot being XAL02, the third robot being XAL03, etc. Considering server H, Table IV provides a directory with appropriate entries and the information and files thus contained.

TABLE IV

Server H

| The directory | Contains |
|---|---|
| H:\Robot\Admin | Directories of customer families (1 directory per customer); Procpnr.SF (a list of all robots and their operational settings); Vcfile.SF (the version-controlled APL functions for the robots). |
| H:\Robot\Admin\XAL | Directories for the XAL robots, and an XAL customer directory. |
| H:\Robot\Admin\XAL\XAL01 | The three files for robot XAL01: XAL01.INI Flag.HLD Robosta2.SF |
| H:\Robot\Admin\XAL\XAL02 | The three files for robot XAL02: XAL02.INI Flag.HLD Robosta2.SF |
| H:\Robot\Admin\XAL\XAL03 | The three files for robot XAL03: XAL03.INI Flag.HLD Robosta2.SF |
| H:\Robot\Admin\XAL\ . . . | Files for additional robot(s), if any . . . |
| H\Robot\Admin\XAL\Cust | The customer lists for the XAL family: Citycode.LST Holiday.LST Etc. |

Reference is now made to Table V for similar information relative to Server I:

TABLE V

| Server I | |
| --- | --- |
| The directory | Contains |
| I:\Robot\Reports | Directories for the deliverables for each robot (ftp, email), and repositories. |
| I:\Robot\Reports\XAL | *.TXT files for the XAL family. |
| I:\Robot\Logs | Directories for records of results of processing for each robot. |
| I:\Robot\Logs\XAL | *.LOG files far the XAL family. See Naming Convention below. |
| I:\Robot\Daily | *.TXT, *.XLS, *.LOG files of statistics, counts, etc. for all robots. Each file name identifies its associated robot. |

It is convenient to utilize a naming convention for log-file purposes, log-file names using the following convention:

(1) the first character in a log-file name is alphabetic, such as A, B, C., etc., thereby identifying log type;

(2) three characters can be used to represent the month in which the log-file was created;

(3) two characters can be used employed to represent the day in which the log-file was created; and, (4) the next two characters represent the year in which the log file was created.

As an example, Table VI represents creation of a log-file name for an example given as Amar1500.log.

TABLE VI

| Log File Name Creation for Amar1500.log | | | | | |
| --- | --- | --- | --- | --- | --- |
| Filename: | Character | Month | Day | Year | Ext |
| Example: | A | mar | 15 | 00 | .log |

Figure 4A:
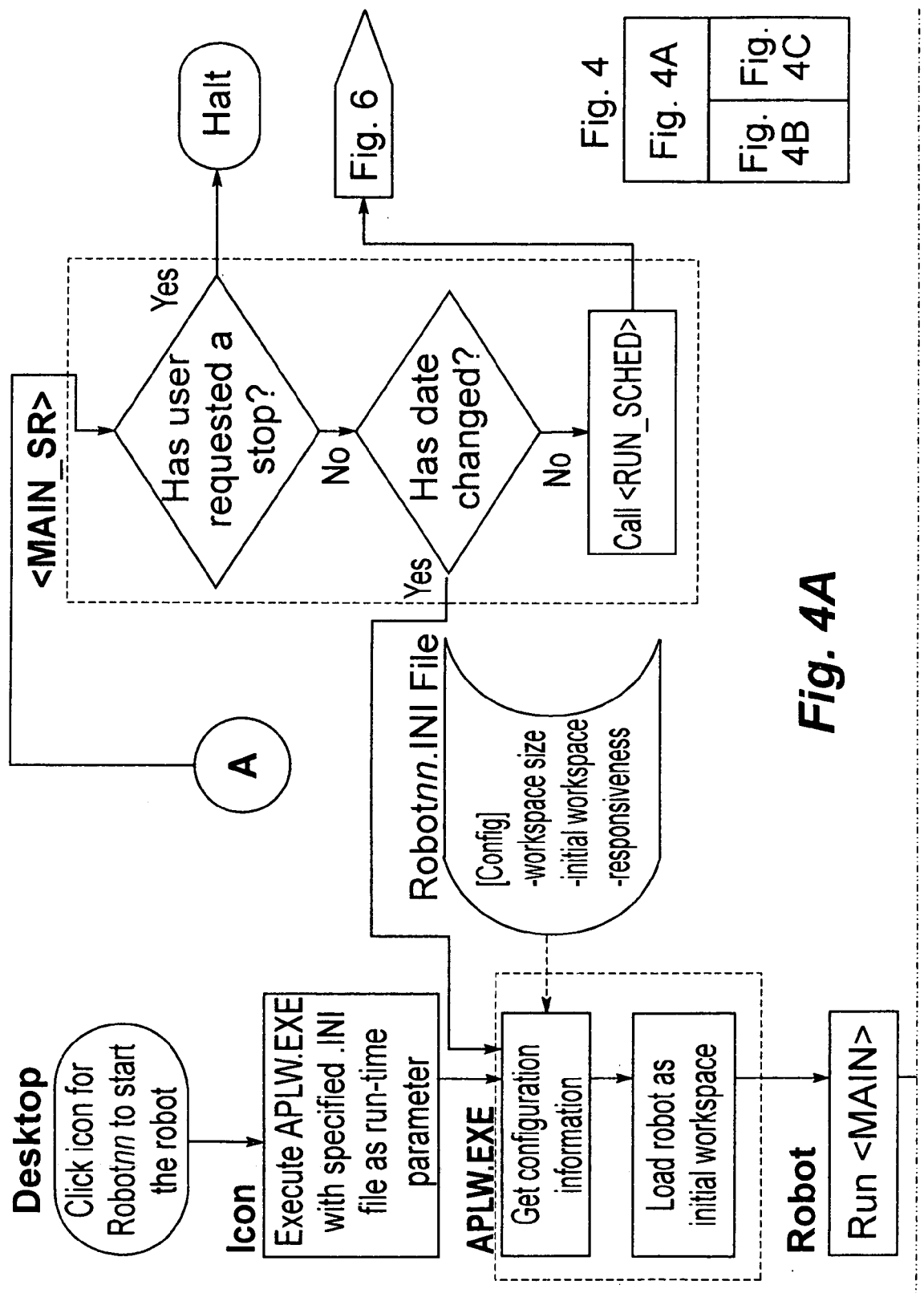
FIG. 4 is a flow chart illustrating robot startup operations within the present system.
Figure 4B:
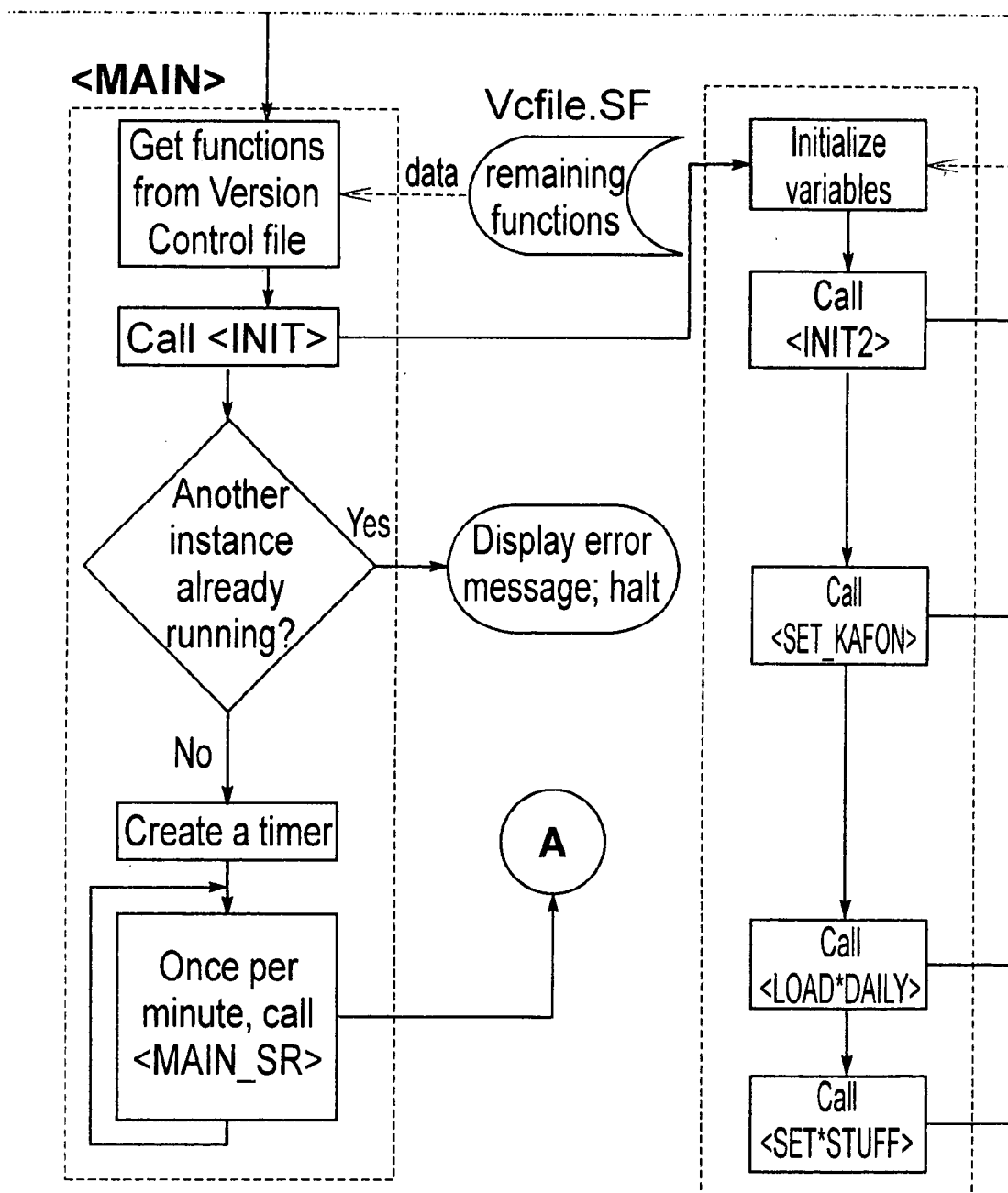
Figure 4C:
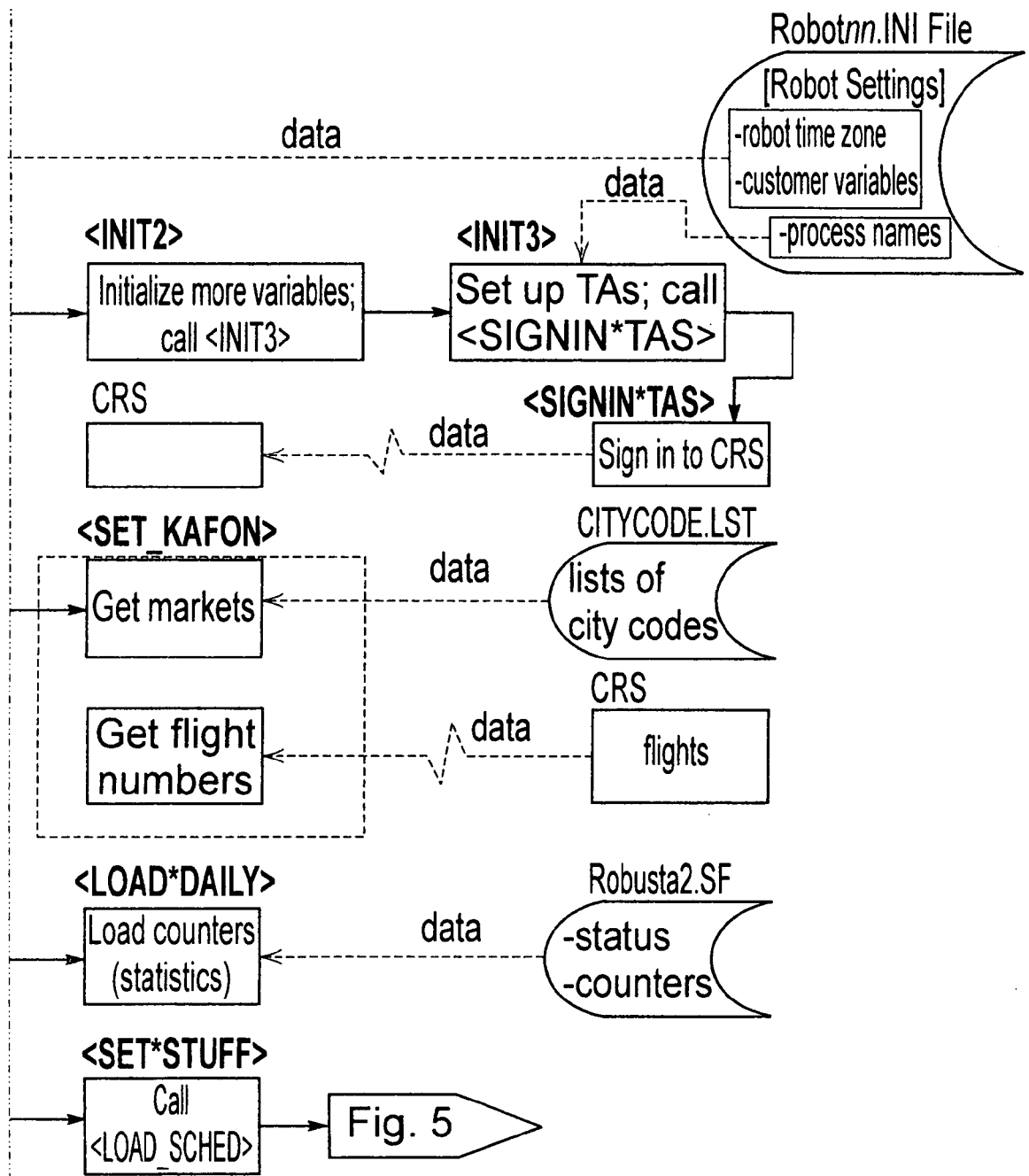
Figure 5:
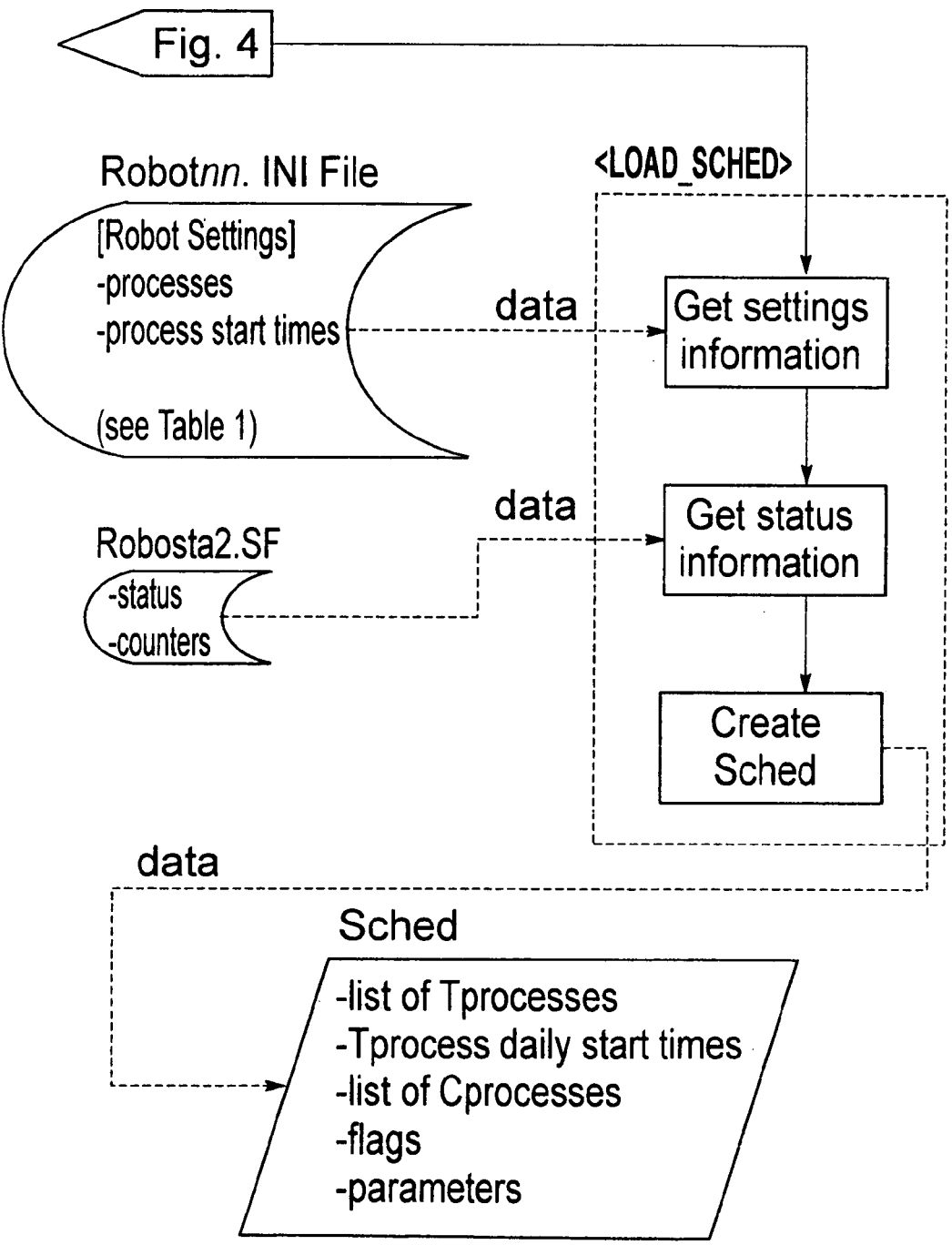
FIG. 5 is a diagrammatical representation of scheduling operations within the present system.
Figures 6, 6A:
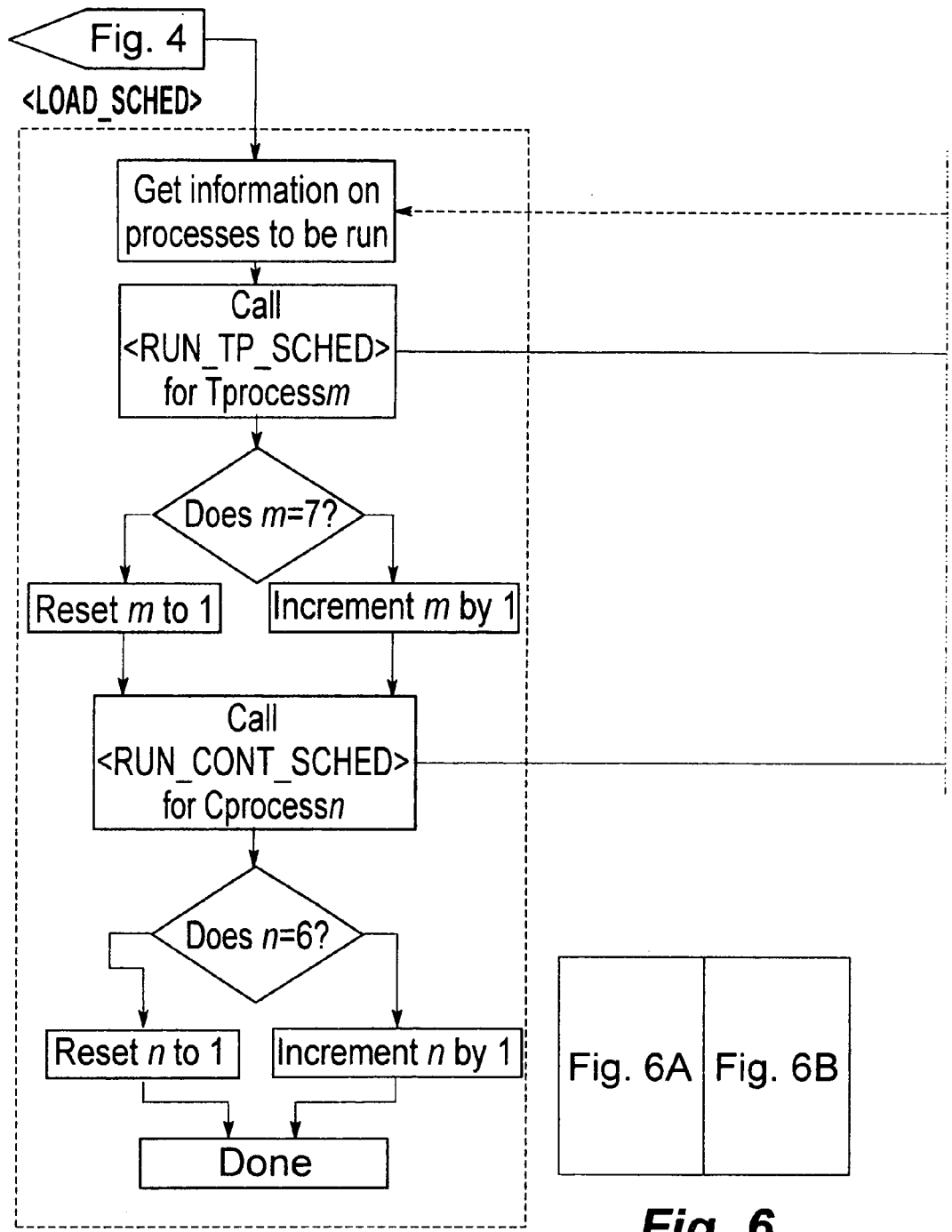
FIG. 6 is a flow chart illustrating the operation or running of the present system.
Figure 6B:
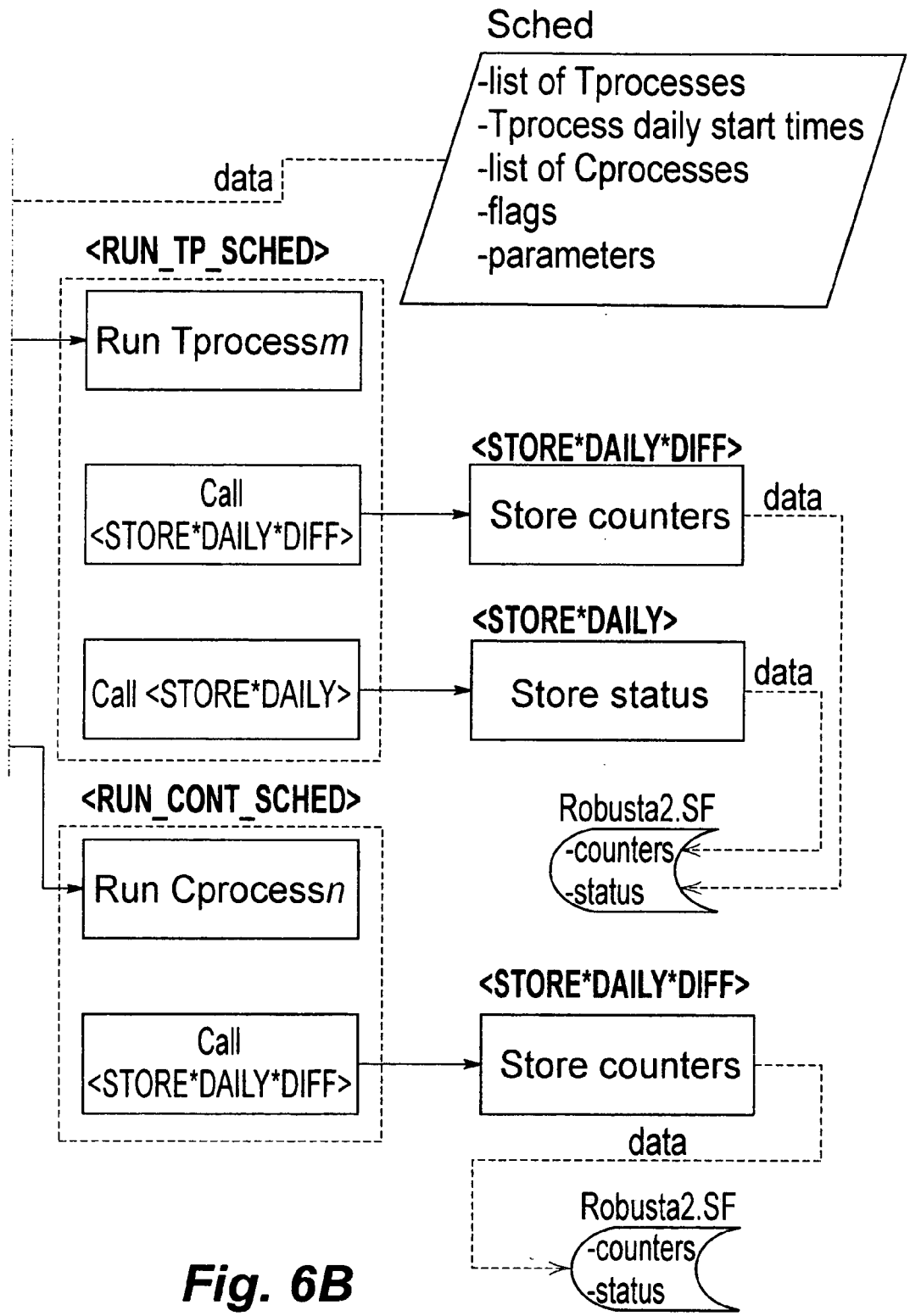
Figure 7B:
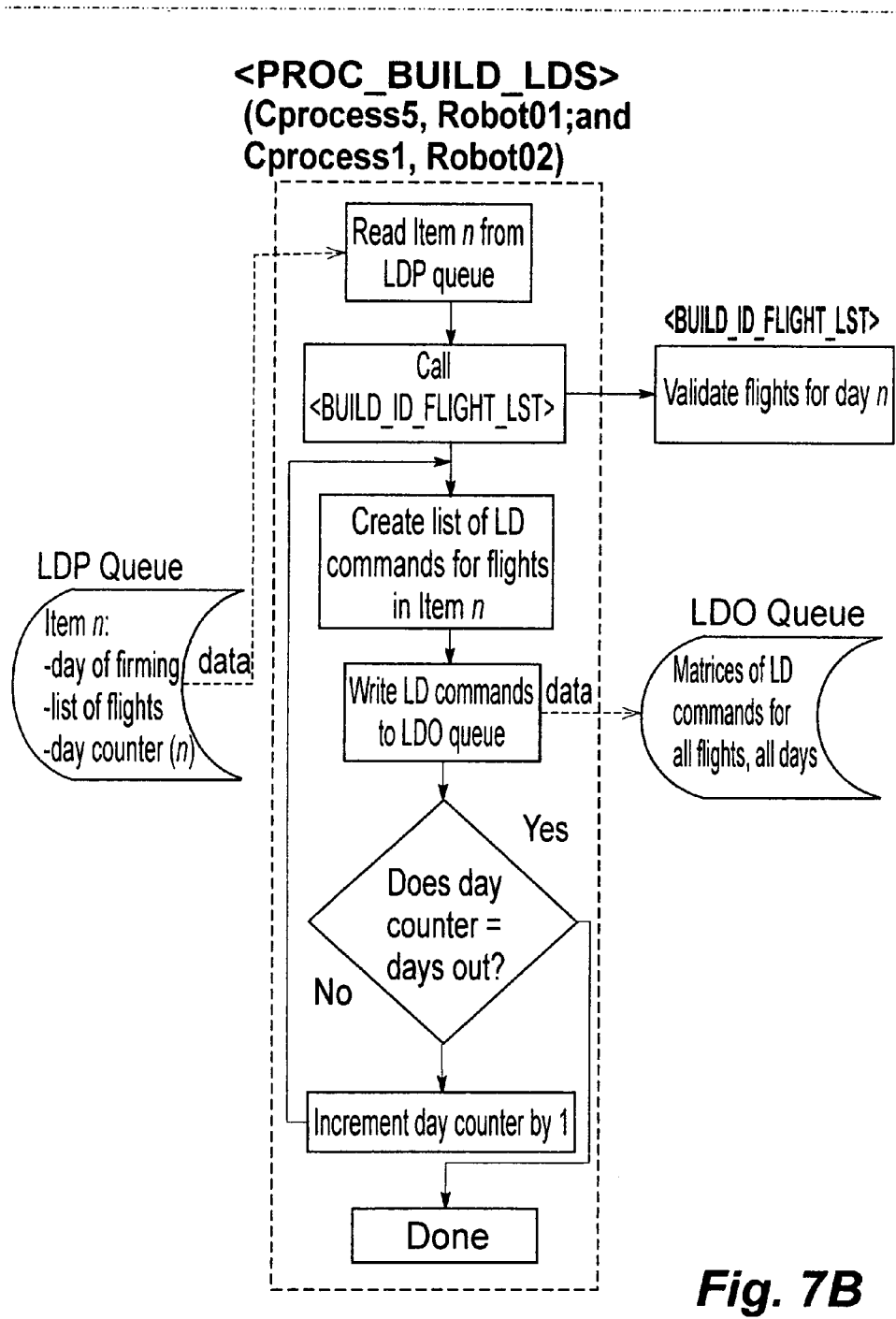
FIG. 7 is a flow chart illustrating operational sequences whereby the system prepares to obtain PNRs.

Again referencing FIGS. 4 through 6 relative to startup procedures, a robot is started by clicking an icon for a given robot on a personal computer PC on which the robot runs. The icon contains:

C:\APL WIN30\aplw.exe h:\robot\admin\family\robot\robot.ini where C:\APL WIN30\aplw.exe is the local copy of the APL application, and h:\robot\admin\family\robot\robot.ini is a run-time parameter pointing to the robot's .INI file on the H: server.

Example: C:\APL WIN30\aplw.exe h:\robot\admin\xal\xal01\xal01.ini

The .INI file contains:
[Config]
Wssize=40M
Initial workspace=24 ROBOT
Responsiveness=200 so APL (aplw.exe) will load '24 robot' as the initial workspace, whose size is 40 Mbytes.

When the robot is loaded, {quad}LX (a system variable) is also loaded in the workspace. {quad}LX contains <MAIN>, which therefore runs.

Once a robot has been started, it continues to operate 24 hours a day unless stopped by an error or by user request.

<MAIN> does the following:
1. Brings in remaining functions from the Version Control file (H:\.Robot\Admin\Vcfile.SF).
2. Calls <INIT>.
3. Attempts to perform an exclusive tie on Flag.HLD for the robot. (If the tie fails, the robot won't continue—this prevents another instance of the robot from starting up when one is already running.)
4. Creates a timer, which calls <MAIN_SR> once per minute.

<INIT> does the following:
1. Initializes customer variables as per .INI file entries; sets the robot's time zone.
2. Calls <INIT2>.
3. Calls <SET_KAFON>.
4. Calls <LOAD*DAILY>
5. Calls <SET*STUFF>

<INIT2> does the following:
1. Initializes more variables.
2. Calls <INIT3>.

<INIT3> does the following:
1. Sets up reservation-agent terminal-address codes and passwords.
2. Calls <SIGNIN*TAS>.

<SIGNIN*TAS> does the following:
1. Signs in to the CRS to establish communications (just as reservation agents would).

<SET_KAFON> does the following:
1. Gets the markets to be worked from the robot family's Citycode.LST file.
2. Gets the flight numbers for the markets from the CRS.

<LOAD*DAILY> does the following:
1. Gets the counters (statistics from previous runs) from the robot's Robosta2.SF file.

<SET*STUFF> does the following:
1. Calls <LOAD_SCHED>.

<LOAD_SCHED> does the following:
1. Gets the robot's processes and their daily start times from the .INI file.
2. Gets status information from the Robosta2.SF file.
3. Creates a variable Sched, containing a list of the robot's Tprocesses and their daily start times, Cprocesses, flags, and associated parameters.

<MAIN_SR> does the following:
1. Checks for a user-requested stop (user has clicked the STOP button in the robot's display window). If so, the robot halts.
2. Checks to see if the date has changed since the last time it was called.
   • If so, the robot restarts.
   • If not, calls <RUN_SCHED>.

With continued reference to FIGS. 4 through 6, running of the robots can further be described wherein it becomes necessary to understand that a Tprocess is any process which starts on a daily time schedule and then stops when completed. The schedule for a Tprocess is specified on a daily basis form information contained in the .INI file of the particular robot. A Cprocess is any process not scheduled by time but which is available to be run at any time during which a given robot is "up". A Cprocess should be run for only a small unit of work in order to give other T and C processes adequate time to be run. Cprocesses can be considered to be "cooperative" processes rather than "continuous" processes. According to the invention as now practiced, a maximum of seven Tprocesses and six Cprocesses are available for a robot to use when it is created by a programmer.

<RUN_SCHED> is the main routine for running processes.
It steps in order through each Tprocess and Cprocess, based on the times or flags in Sched, as follows:
1. Gets the information on the processes to be run from Sched.
2. Calls <RUN_TP_SCHED> for the first Tprocess.

3. Increments the T-process counter (unless it equals 7, in which case it resets the counter to 1).
4. Calls <RUN_CONT_SCHED> for the first Cprocess.
5. Increments the C-process counter (unless it equals 6, in which case it resets the counter to 1).
6. Returns to its calling function (<MAIN_SR>).
7. The next time <RUN_SCHED> is called, it calls <RUN_TP_SCHED> for the next Tprocess, and <RUN_CONT_SCHED> for the next Cprocess, as per the counters for each process type.

<RUN_TP_SCHED> runs Tprocesses as per times in Sched.

The function has three arguments:
   Which Tprocess to call (as per the T-process counter).
   Which position (location) in Sched to get parameters for the process from ("position" was defined in <LOAD_SCHED>).
   Where to store status info in Robosta2.SF.

<RUN_CONT_SCHED>—runs Cprocesses as per flags in Sched.

The function has two arguments:
   Which Cprocess to call (as per the C-process counter).
   Which position (location) in Sched to get parameters for the process from ("position" was defined in <LOAD_SCHED>).

When a process ends, it will set a flag signaling one of four events:
   Completely finished.
   Not finished—more to do.
   There was nothing to do.
   User requested a stop.

With continued reference to FIGS. 4 through 6 and further reference to FIGS. 2 and 3, an overview of batching and flight firming processes can be seen as follows:

<PROC_SCHED_LDS> runs as a Tprocess (currently once per day); uses information in INI file to tell other robots what flights (from Kafon and ignore list) and days to work.

<PROC_BUILD_LDS> builds LD commands to query CRS for who is flying on the day being worked.

<PROC_RUN_LDS> takes output of <PROC_BUILD_LDS> and issues commands to CRS to retrieve lists of PNLs, which go to the traffic cop.

<PROC_TRAFFIC_COP> runs as a Cprocess; coordinates (manages) batch-access to queues for the other processes.

<PROC_FIRST_ROUND> calls $1^{st}$-round Flight-Firming processes

<PROC_SECOND_ROUND> calls $2^{nd}$-round Flight-Firming processes

"Queue" refers to a pair of files: filename_CTL.SF (the control file) and filename_QUE.SF (the storage file).

Batch sizes currently range from 60 to 120, and are specified in three .INI file entries for each robot: "RUN LD BATCH SIZE=n", "FIRST ROUND BATCH SIZE=n", and "SECOND ROUND BATCH SIZE=n".

The specifics of batching and flight firming processes are further to be seen as follows:

<PROC_SCHED_LDS> writes a list of flights and a date to LDP queue. LDP queue contains flight lists and dates to be examined by other robots. This essentially starts the process and determines the workload for the day.

<PROC_BUILD_LDS> reads the LDP queue, writes to LDO queue.

LDO contains matrices of LD commands.

<PROC_TRAFFIC_COP> moves data from LDO to LDI queue.

<PROC_RUN_LDS> reads LD commands from LDI, issues the commands to the CRS, receives PNLs from the CRS, and puts PNLs on the CP queue.

<PROC_TRAFFIC_COP> reads the CP queue, compares each PNL against the entries in the 'VALIDPNR' file to check for new PNRs, and puts batches of all new PNRs on the FRI queue.

<PROC_FIRST_ROUND> reads the FRI queue, calls <PROC_PNR> for $1^{st}$-round Flight-Firming processes to be performed on the new PNRs, and puts the results on the FRO queue.

<PROC_TRAFFIC_COP> reads the FRO queue, and updates or appends PNR information to the 'VALIDPNR' file.

<PROC_TRAFFIC_COP> continually checks the 'VALIDPNR' file for expired TTLs. If any are found, a list of their PNLs is created and put on the SRI queue.

<PROC_SECOND_ROUND> reads the SRI queue, gets a list of PNLs, calls <KILL*PNR> for $2^{nd}$-round Flight-Firming processes to be performed on the corresponding PNRs, and puts the results on the SRO queue.

<PROC_TRAFFIC_COP> reads the SRO queue, and updates or appends PNR information to the 'VALIDPNR' file.

With reference to Table VII provided below, terms used herein are defined for ease of comprehension.

TABLE VII

| | |
|---|---|
| Tprocess | A timed process |
| Cprocess | A continuous process |
| LDP Queue | List-Display Parameters queue |
| LDO Queue | LD Commands Out queue |
| LDI Queue | LD Commands In queue |
| CP Queue | Candidate PNRs queue |
| FRI Queue | First-Round Input queue |
| FRO Queue | First-Round Output queue |
| SRI Queue | Second-Round Input queue |
| SRO Queue | Second-Round Output queue |
| CRS | Central Reservation System (for airlines) |
| LD | List Display |
| PNL | PNR Record Locator (6 characters) |
| PNR | Passenger Name Record |
| TTL | Ticket Time Limit |

Figure 20B:
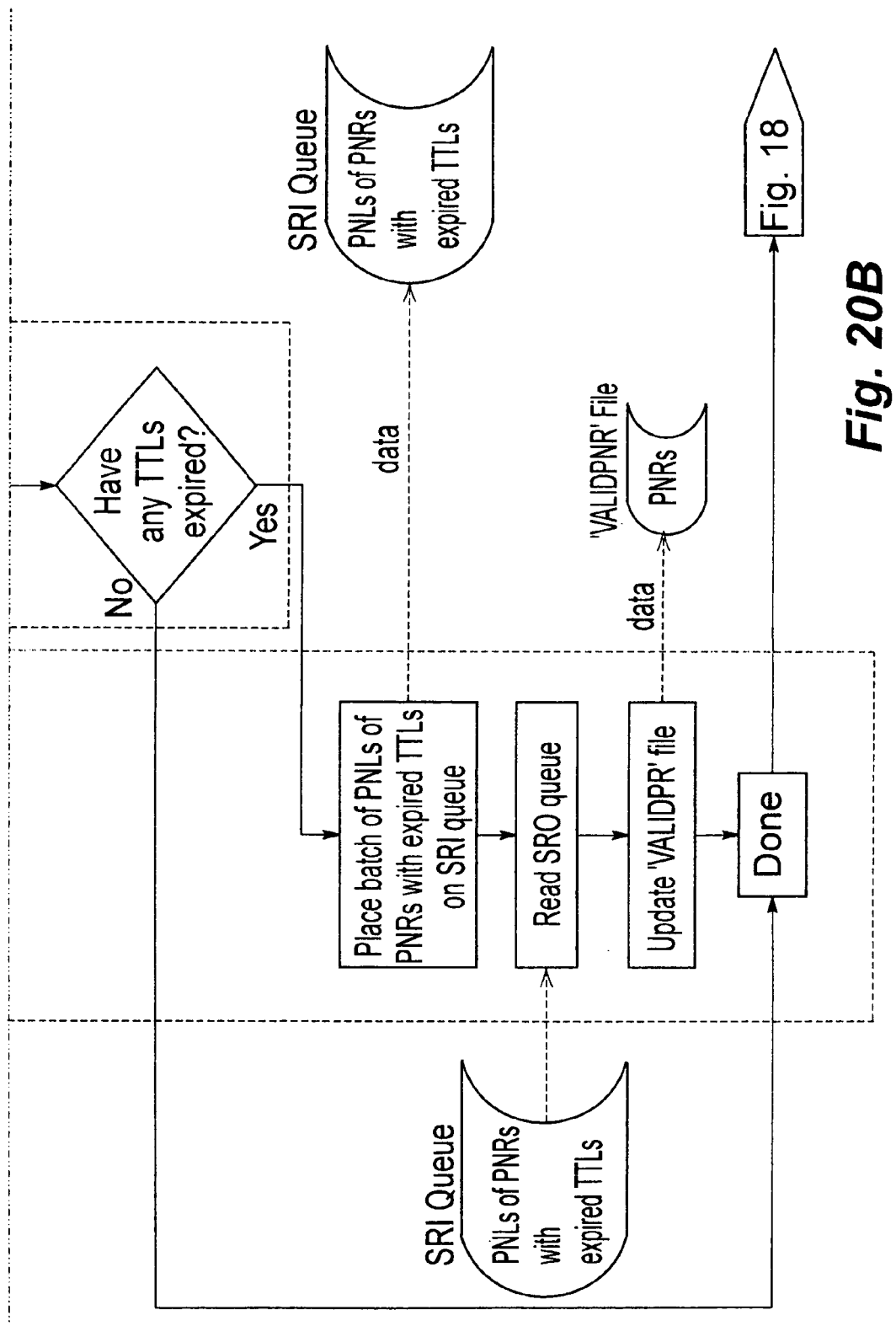
FIG. 20 is a flow chart illustrating operational sequences relating to checking passenger name records or PNRs for expired ticketing time limit conditions.

With further reference to FIGS. 4 through 6, as well as to FIGS. 2 and 3 and also FIG. 20, the processes of obtaining PNRs and identifying new PNRs is provided. Tables VIII and IX referable to Robot01 and Robot02 are now provided to further elucidate robot scheduling as is particularly to be found in FIG. 5. System preparation necessary to obtain PNRs is particularly provided in FIG. 7 while PNRs are obtained with reference to FIGS. 8 and 20. New PNRs are identified with reference to FIGS. 8 and 9.

Figure 9B:
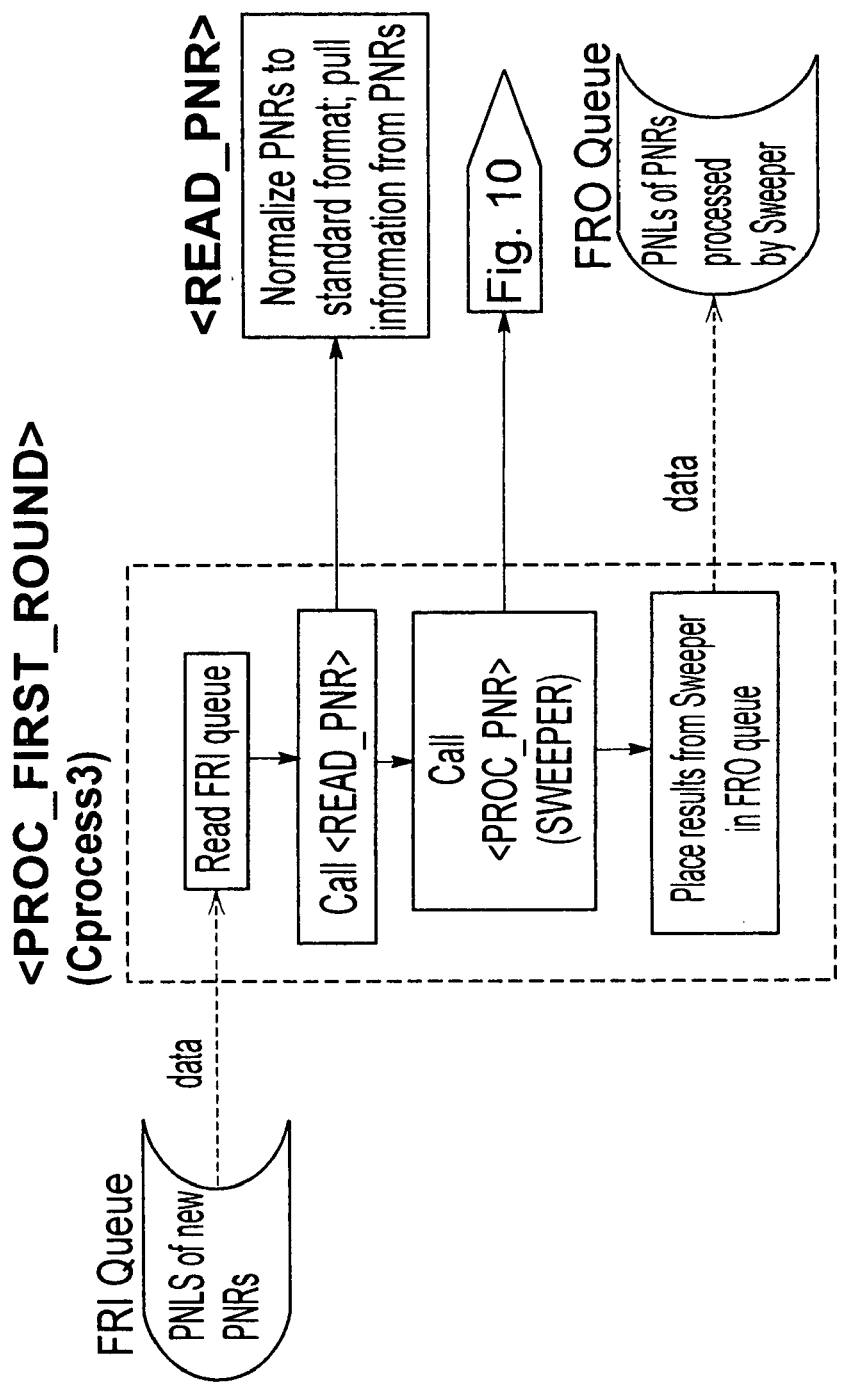
FIG. 9B is a diagrammatical representation related to FIG. 9A relative to first round processing of PNRs.
Figure 10:
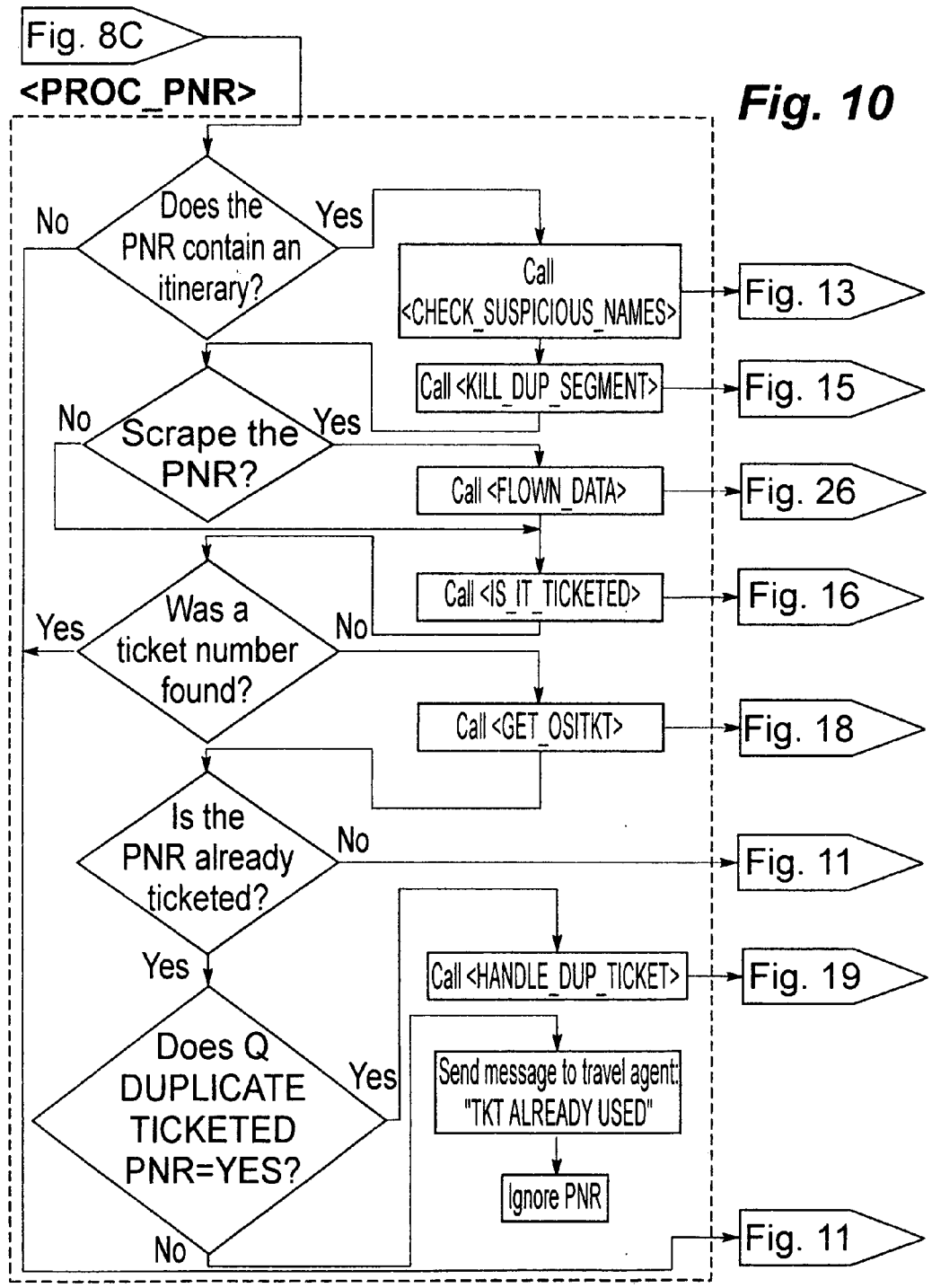
FIG. 10 is a flow chart illustrating first round flight firming processes.
Figure 11B:
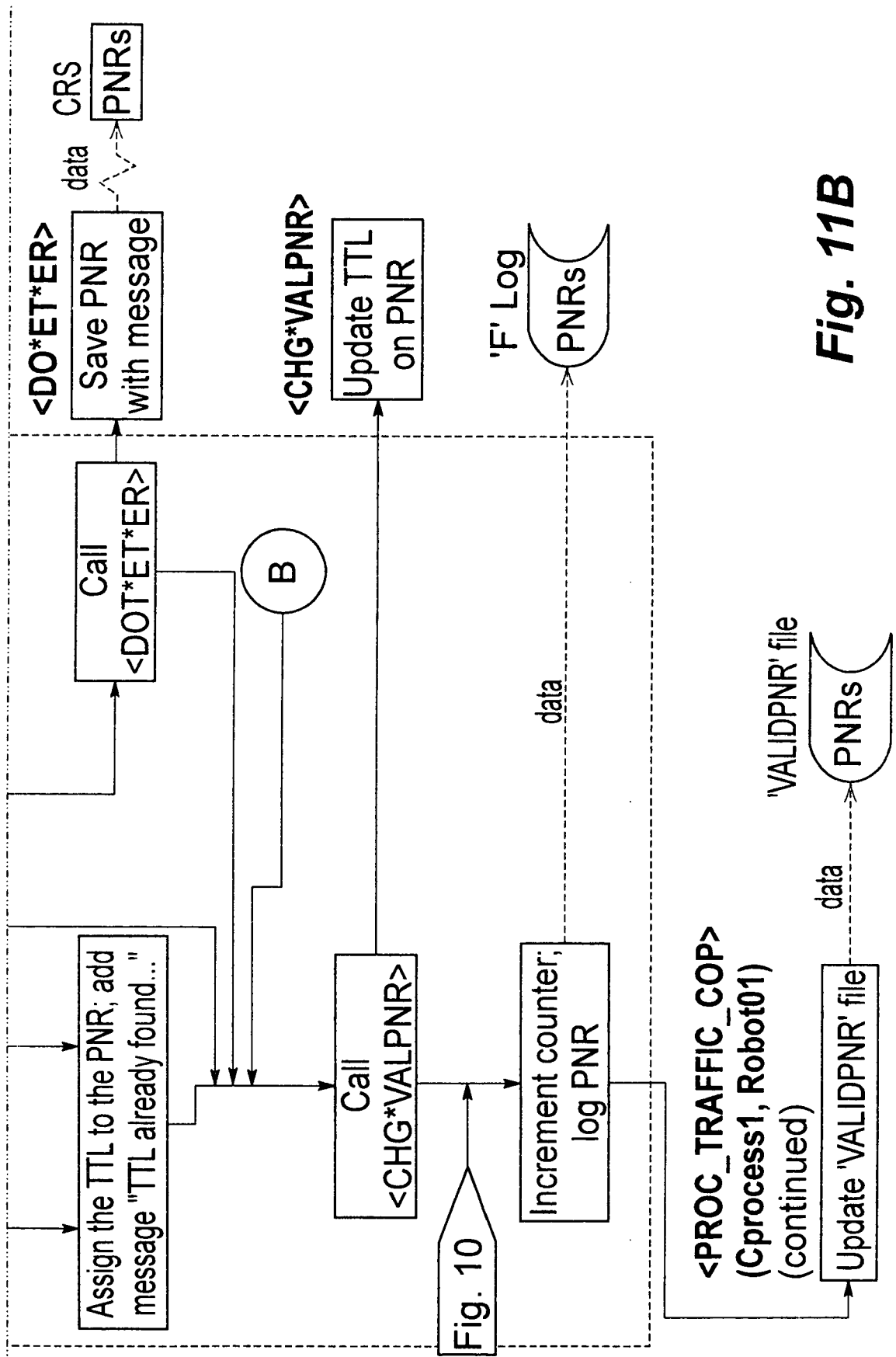
FIG. 11 is related to FIG. 10 and provides further illustration of first round flight firming.
Figure 12:
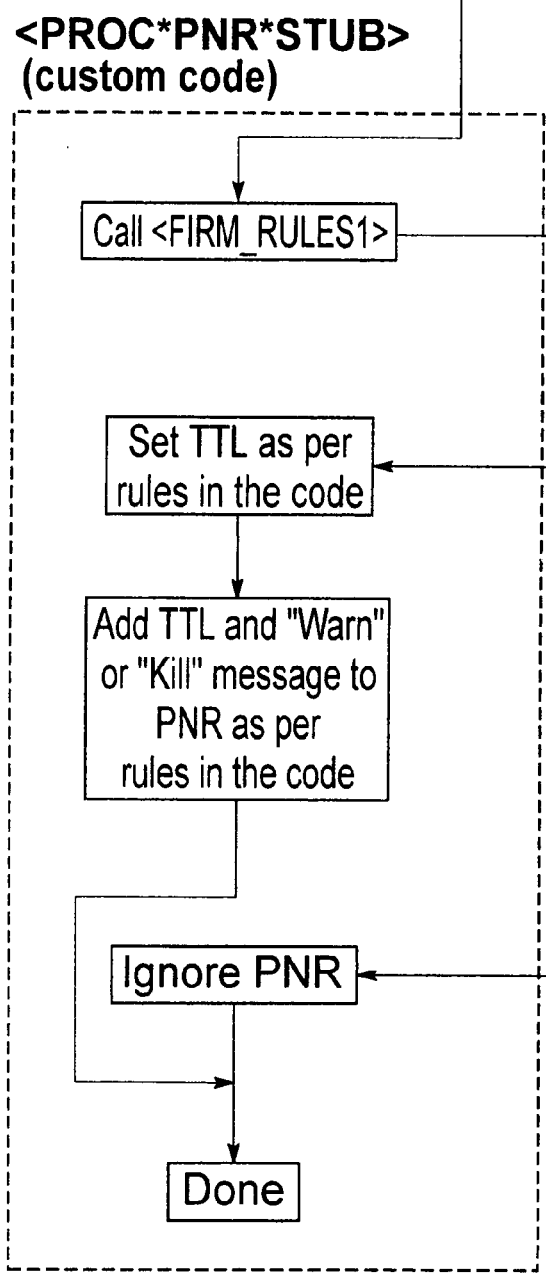
FIG. 12 is related to FIGS. 10 and 11 and provides further operational information relative to first round flight firming.

FIGS. 10, 11 and 12 are provided for illustration of the function of the Sweeper robot as referred to hereinabove in performing first round flight firming functionality. FIGS. 10 through 12 are parts of a whole and are further linked directly to FIG. 9 as well as being linked out to each other and also to FIGS. 13, 15, 26, 18 and 19.

TABLE VIII

Robot01

[Robot Settings]

| | |
|---|---|
| RUN LD BATCH SIZE = 300 | TPROCESS2 = PROC_SCHED_LDS 'DAILY FULL SCAN' |
| FIRST ROUND BATCH SIZE = 100 | |
| SECOND ROUND BATCH SIZE = 100 | |
| | TPROCESS2-MON TIME = 08:00 |
| CPROCESS1 = PROC_TRAFFIC_COP | TPROCESS2-TUE TIME = 08:00 |
| CPROCESS2 = PROC_RUN_LDS | TPROCESS2-WED TIME = 08:00 |
| CPROCESS3 = PROC_FIRST_ROUND | TPROCESS2-THU TIME = 08:00 |
| CPROCESS4 = PROC_SECOND_ROUND | TPROCESS2-FRI TIME = 08:00 |
| CPROCESS5 = PROC_BUILD_LDS | TPROCESS2-SAT TIME = 11:00 |
| | TPROCESS2-SUN TIME = 11:00 |
| TPROCESS1 = Top_Of_Day | |
| | DAILY FULL SCAN-MON = 0 60 |
| TPROCESS1-MON TIME = 00:01 | DAILY FULL SCAN-TUE = 0 60 |
| TPROCESS1-TUE TIME = 00:01 | DAILY FULL SCAN-WED = 0 60 |
| TPROCESS1-WED TIME = 00:01 | DAILY FULL SCAN-THU = 0 60 |
| TPROCESS1-THU TIME = 00:01 | DAILY FULL SCAN-FRI = 0 60 |
| TPROCESS1-FRI TIME = 00:01 | DAILY FULL SCAN-SAT = 0 60 |
| TPROCESS1-SAT TIME = 00:01 | DAILY FULL SCAN-SUN = 0 60 |
| TPROCESS1-SUN TIME = 00:01 | |

TABLE IX

Robot02

[Robot Settings]

| | |
|---|---|
| FIRST ROUND BATCH SIZE = 100 | |
| SECOND ROUND BATCH SIZE = 100 | |
| | |
| CPROCESS1 = PROC_BUILD_LDS | |
| CPROCESS2 = PROC_RUN_LDS | |
| CPROCESS3 = PROC_FIRST_ROUND | |
| CPROCESS4 = PROC_SECOND_ROUND | |
| TPROCESS1 = EMAIL_SUSPICIOUS_NAMES | TPROCESS2 = ADD_CANCELS_TO_DB" |
| TPROCESS1-MON TIME = 00:01 | TPROCESS2-MON TIME = 00:02 |
| TPROCESS1-TUE TIME = 00:01 | TPROCESS2-TUE TIME = 00:02 |
| TPROCESS1-WED TIME = 00:01 | TPROCESS2-WED TIME = 00:02 |
| TPROCESS1-THU TIME = 00:01 | TPROCESS2-THU TIME = 00:02 |
| TPROCESS1-FRI TIME = 00:01 | TPROCESS2-FRI TIME = 00:02 |
| TPROCESS1-SAT TIME = 00:01 | TPROCESS2-SAT TIME = 00:02 |
| TPROCESS1-SUN TIME = 00:01 | TPROCESS2-SUN TIME = 00:02 |

In flight firming processing as occurs in the first iteration thereof, <PROC_PNR> does the following:
1. Applies rules to each new PNR:
   Ignores PNR if no itinerary.
   Calls <CHECK_SUSPICIOUS_NAMES> to compare names on PNR with known fictitious names.
   Calls <KILL_DUP_SEGMENTS> as per INI file entry, to check for duplicate segments
      Various .INI file entries determine the processing of duplicate segments, starting with whether or not duplicate segments will be killed.
   Calls <FLOWN DATA> to scrape PNR if required by customer.
   Calls <IS_IT_TICKETED> to look for any ticket numbers
   If no ticket number was found, calls <GET_OSITKT> to see if a ticket number is in the OSI section of the PNR.
   If the PNR has a ticket number, processes as per customer rules, and checks for duplicate ticket number
   If the PNR does not have a ticket number, checks for an existing TTL on the PNR
   If the PNR has a TTL, either uses it or one 48 hours from today, whichever is later; includes message "TTL already found";
   If the PNR does not have a TTL, calls <PROC*PNR*STUB> to do the following:
      call <FIRM_RULES1> to determine if the PNR should be worked or ignored; if worked,
         set TTL as per customer rules;
         send "warn" or "kill" message to TA as per info in .INI file.
      assigns TTL to PNR and save TTL with record locator; if required, calls <DO*QEP> and <DO*ET*ER> to queue the PNR as appropriate to the CRS.
   Checks for TTL; if there is one, log in 'VALIDPNR' file
   Calls
2. Updates internal counters.
3. Logs activities of $1^{st}$-round Flight Firming, and log images of PNRs ('F' log).

Figures 18, 18A:
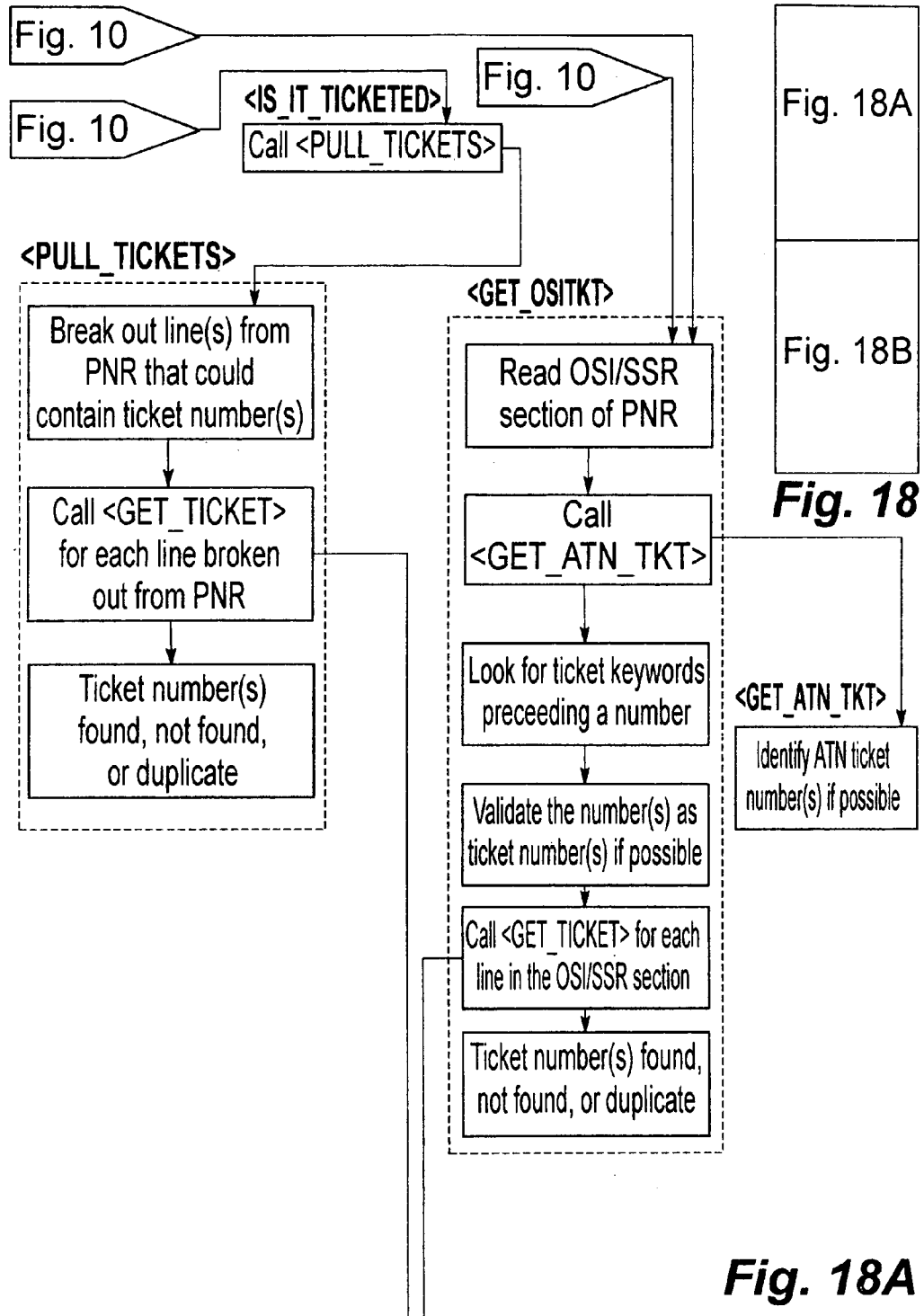
FIG. 18 is a flow chart illustrating the checking of a passenger name record or PNR for existing ticket number(s)
Figure 18B:
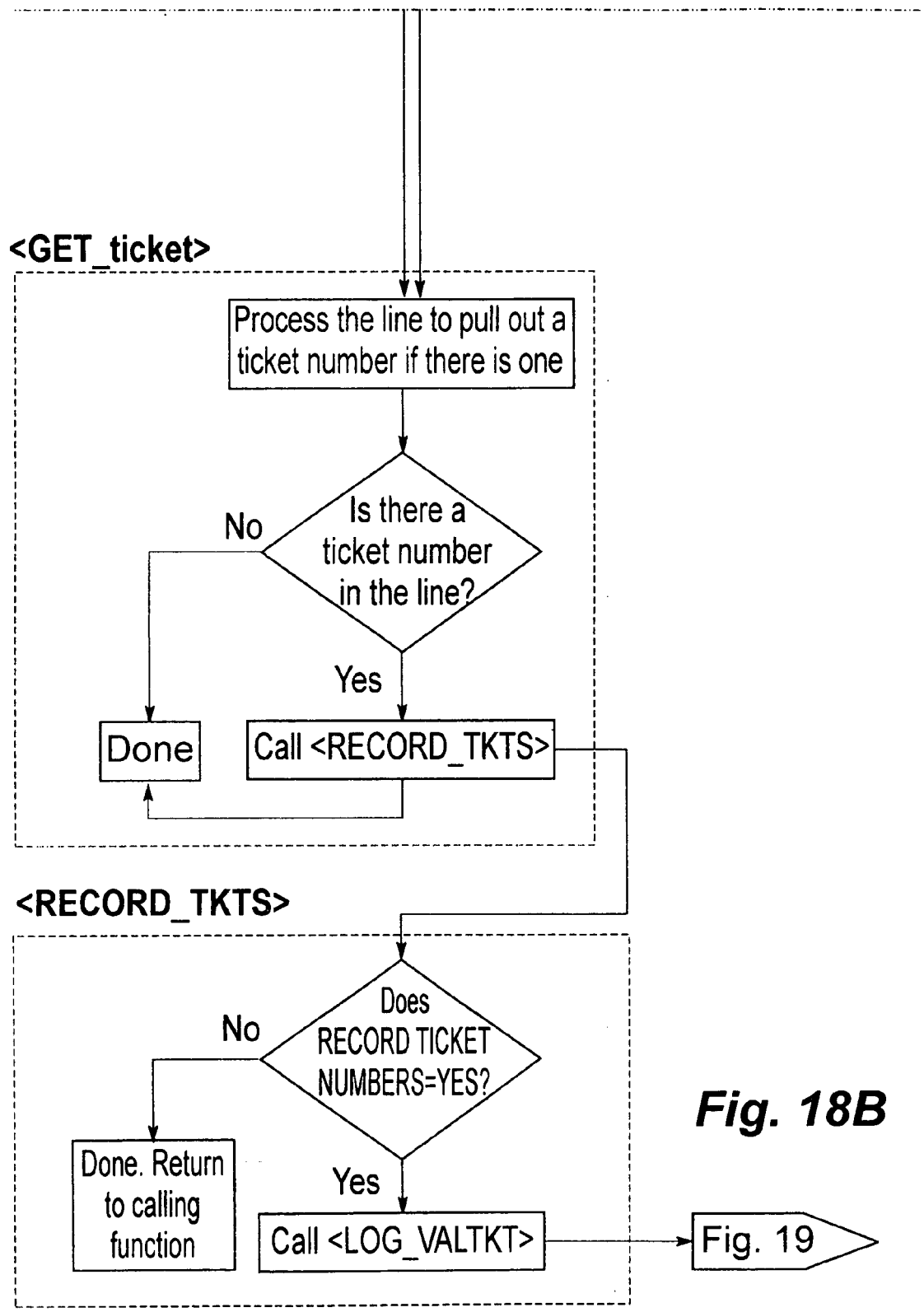
Figure 19:
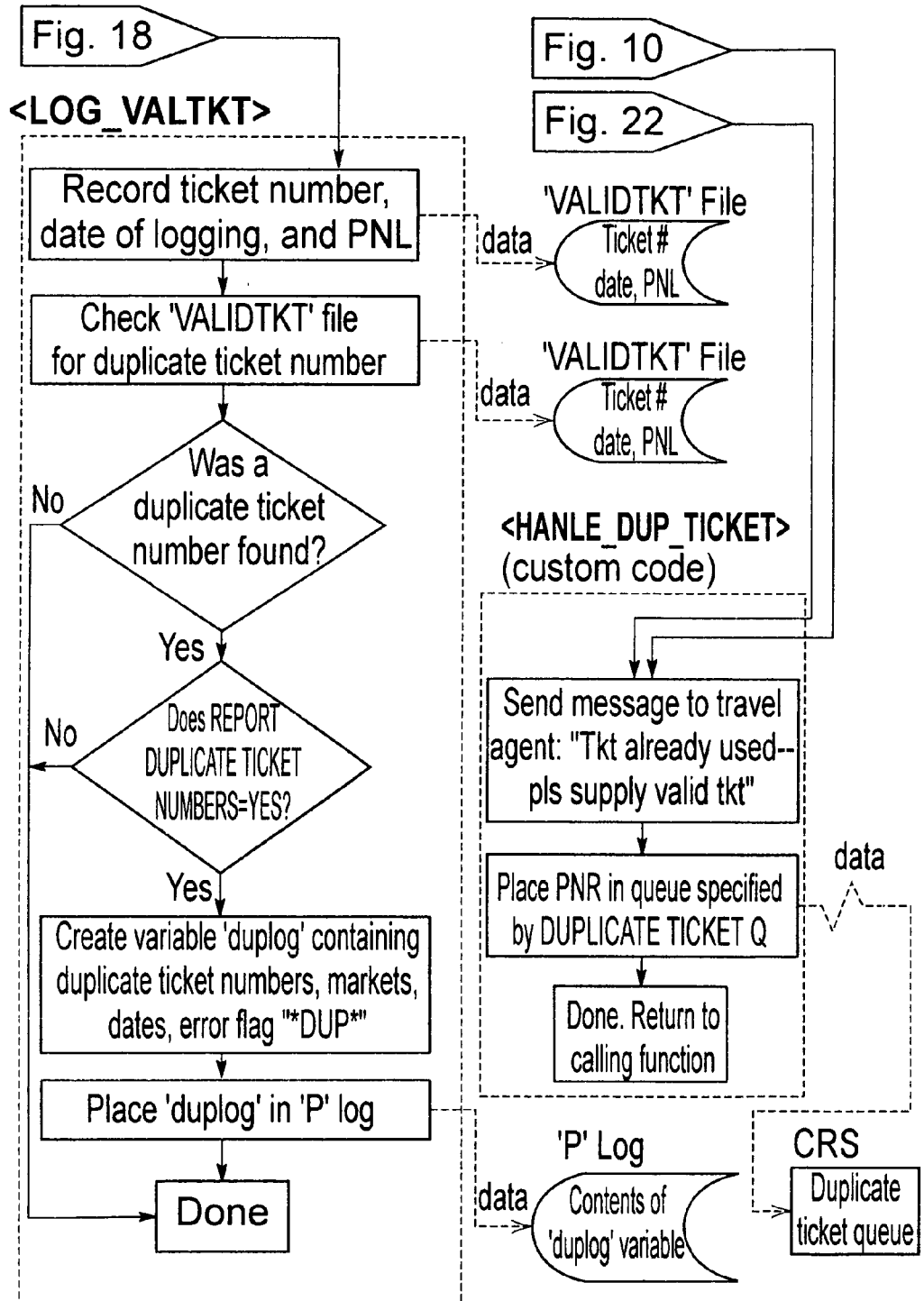
FIG. 19 is a flow chart illustrating operational sequences of the present system for checking for duplicate ticket numbers.
Figure 21B:
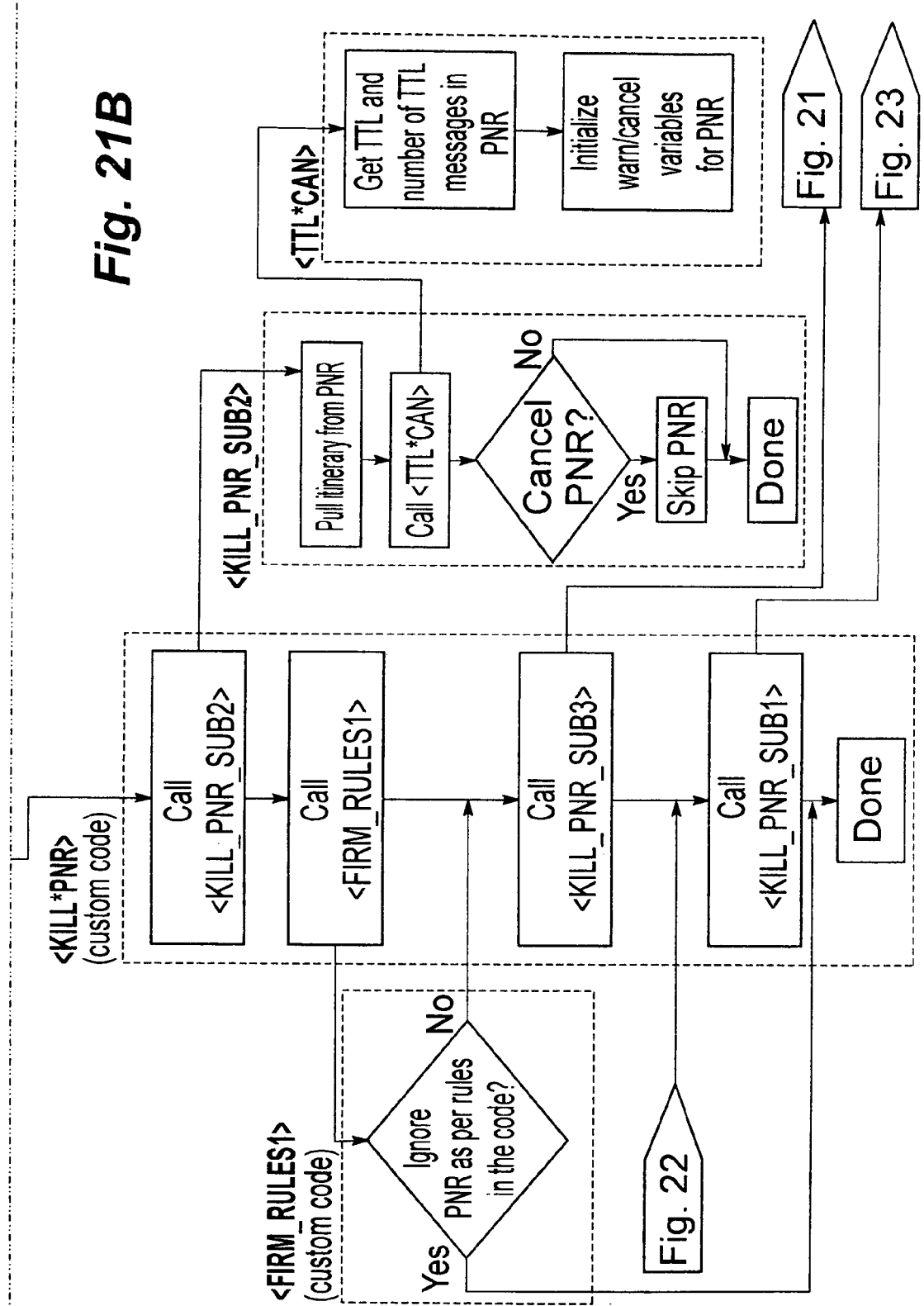
FIGS. 21, 22 and 23 are flow charts illustrating second round flight firming including operational sequences attendant thereto.
Figure 22:
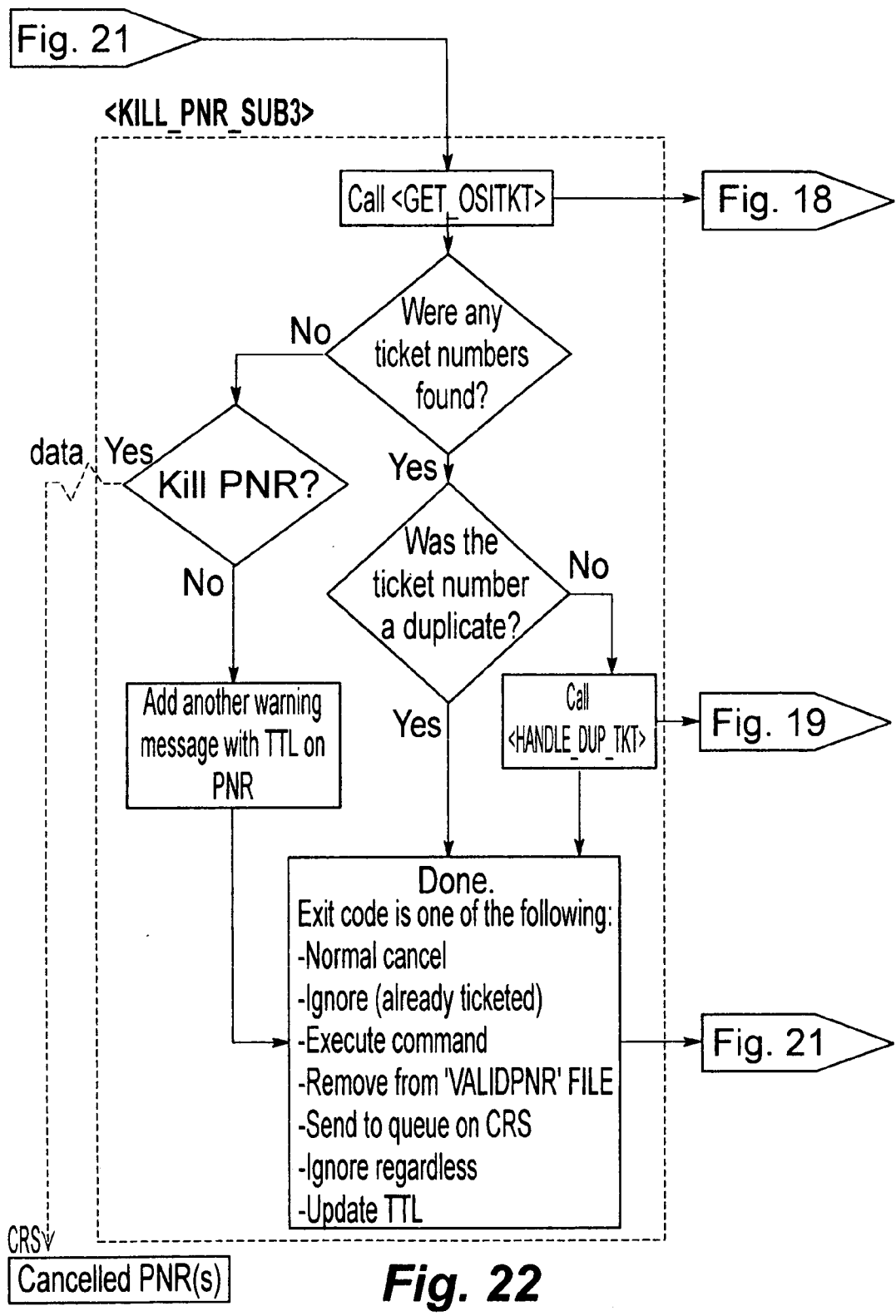
Figure 23B:
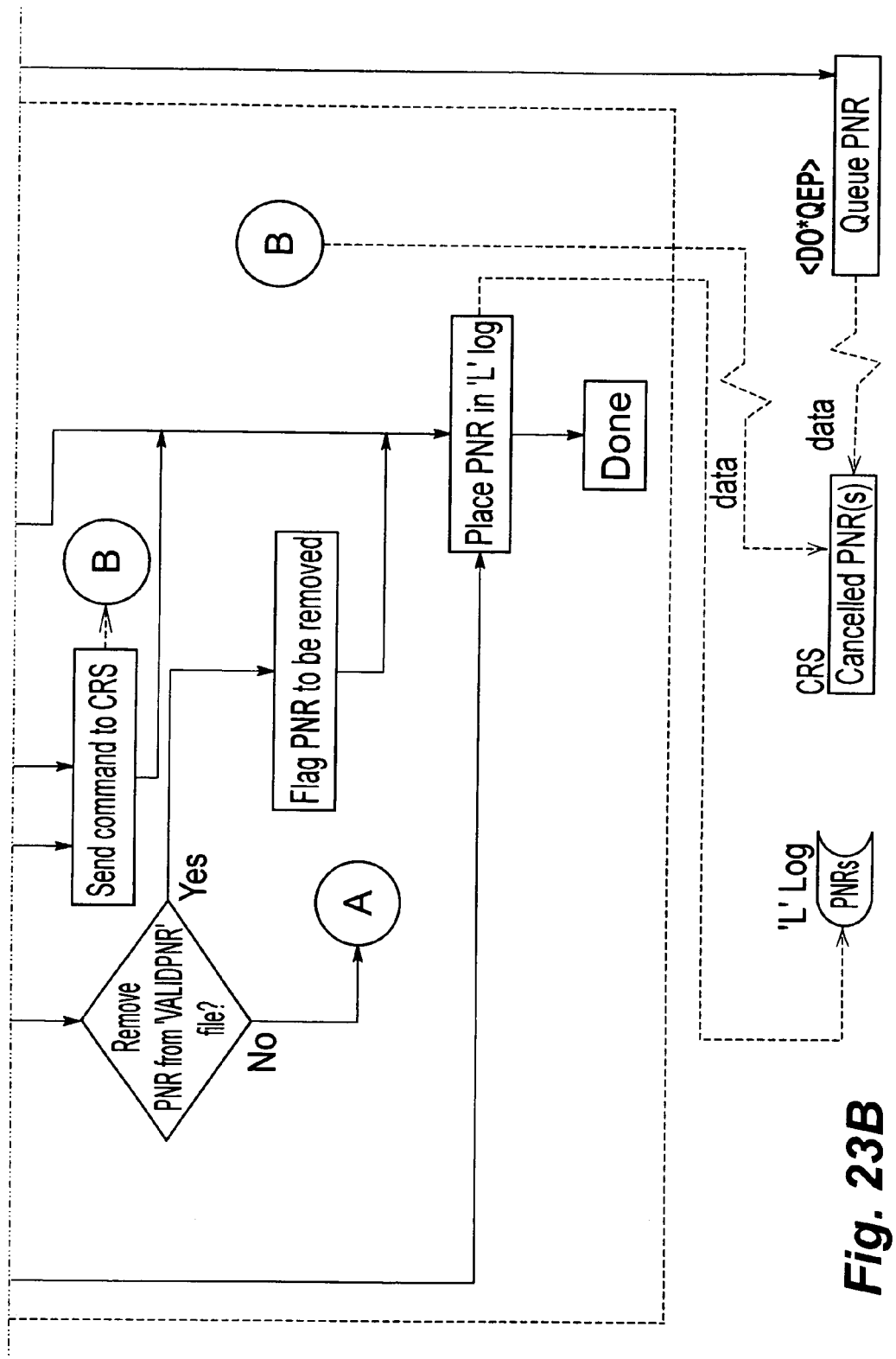

In flight firming processes having a second round such as would be accomplished by the Enforcer robot, reference is made to FIGS. 21, 22 and 23, which Figures are parts of the whole and which further are linked to FIGS. 18 and 19. The robot enforcer proceeds as follows:
<PROC_TRAFFIC_COP> reads the SRI queue, and calls <KILL*PNR>
<KILL*PNR> does the following:
1. Calls <KILL_PNR_SUB2> which reads the TTL on the PNR, sets appropriate variables.

2. Calls <FIRM_RULES1> which decides if PNR is to be ignored as per customer rules.
3. Calls <KILL_PNR_SUB3> to do the following, as per customer rules:
   ignore the PNR if already ticketed;
   if ticket number is a duplicate, ignore or queue PNR, if queued, may put message on PNR re: "duplicate ticket number . . ."
   decide if going to send $2^{nd}$ message or cancel
4. Calls <KILL_PNR_SUB1> which works remaining saved PNRs:
   queue or cancel PNR and send confirmation/action
   send message on PNR to TA as per info in .INI file
   save the record to the CRS The functions thus provided are itemized in Table X as follows:

TABLE X

Custom-Coded Functions

| Function | Description |
|---|---|
| <PROC*PNR*STUB> | Custom rules for $1^{st}$-round Flight Firming. |
| <KILL*PNR> | Custom rules for $2^{nd}$-round Flight Firming. |
| <TOP_OF_DAY> | Custom reports and reality checks to run once per day. |
| <FIRM_RULES1> | Custom rules far both $1^{st}$-round and $2^{nd}$-round Flight Firming. |
| <TOP_OF_DAY> | Custom code for each customer; runs just after midnight. Calls appropriate routines listed below for various activities. |

Figure 15:
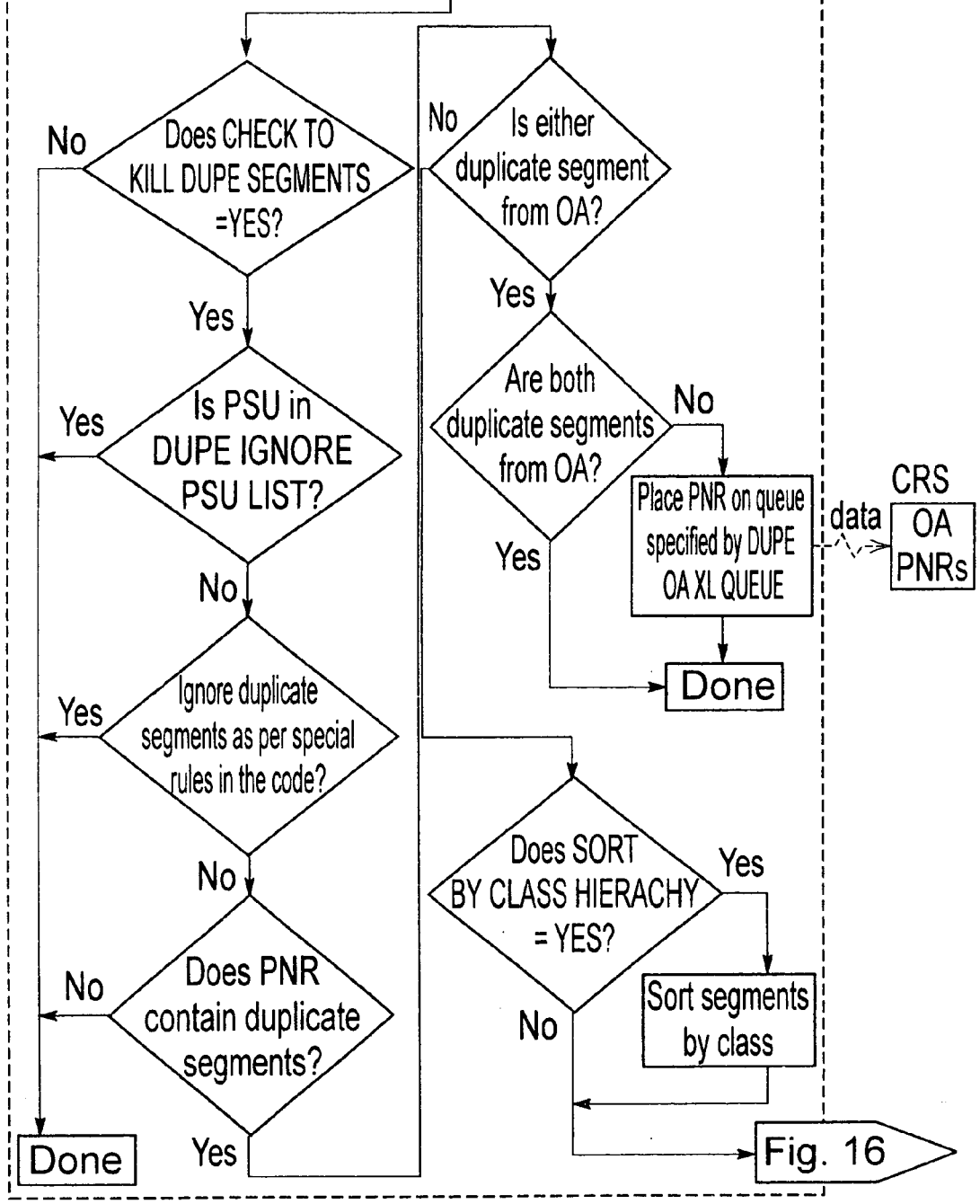
Figure 17B:
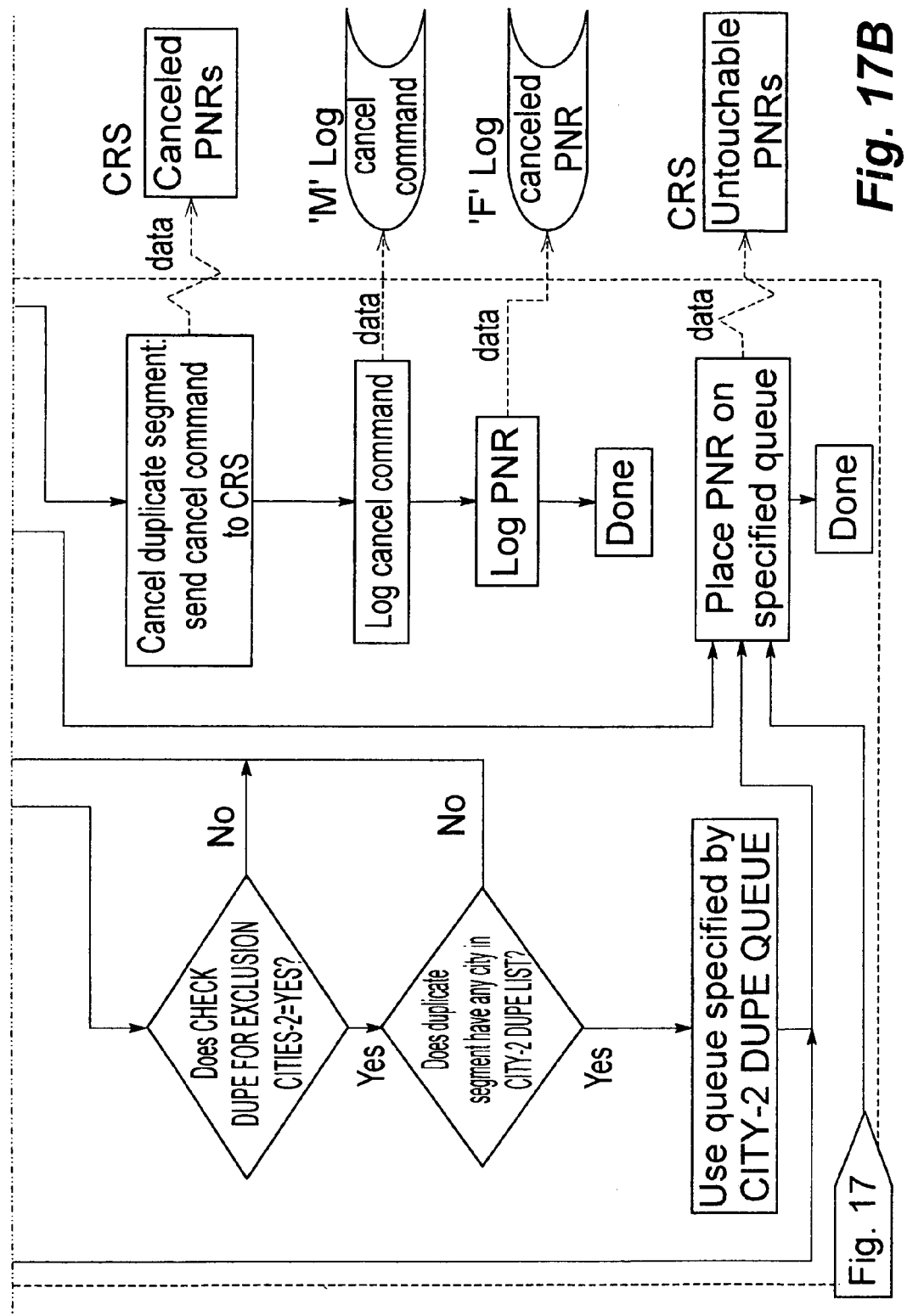

Considering now the functionality for duplicate segment processing relative to typical .INI file entries, Table XI is provided and is referenced to FIGS. 15, 16 and 17 which are parts of a whole and which are linked to each other to provide duplicate segment processing.

TABLE XI

Typical .INI file Entries for Duplicate Segment Processing (DUPE SNOOPER)

| Entry | Description |
|---|---|
| CHECK DUPE FOR CLASS = YES | When working Duplicate Segments, YES means there are class considerations. |
| CHECK DUPE FOR EXCLUSION CITIES-1 = YES | If entry = YES, then if duplicate segment has any city found in CITY-1 DUPE LIST, then queue PNR to CITY-1 DUPE QUEUE and don't do any more dupe checking. |
| CHECK DUPE FOR EXCLUSION CITIES-2 = YES | If entry = YES, then if duplicate segment has any city found in CITY-2 DUPE LIST, then queue PNR to CITY-2 DUPE QUEUE and don't do any more dupe checking. |
| CHECK DUPE FOR EXCLUSION CITIES-3 = YES | If entry = YES, then if duplicate segment has any city found in CITY-3 DUPE LIST, then queue PNR to CITY-3 DUPE QUEUE and don't do any more dupe checking. |
| CHECK TO KILL DUPE SEGMENTS = YES | YES means look for duplicate segments. |
| CITY-1 DUPE LIST = ARN BRU FRA MAD MXP CDG ZRH | See CHECK DUPE FOR EXCLUSION CITIES-1 |
| CITY-1 DUPE QUEUE = QIY1/189 | See CHECK DUPE FOR EXCLUSION CITIES-1 |
| CITY-2 DUPE LIST = LHR LGW BHX MAN GLA | See CHECK DUPE FOR EXCLUSION CITIES-2 |
| CITY-2 DUPE QUEUE = QIY2/189 | See CHECK DUPE FOR EXCLUSION CITIES-2 |
| CITY-3 DUPE LIST = JFK | See CHECK DUPE FOR EXCLUSION CITIES-3 |
| CITY-3 DUPE QUEUE = CRC38/189 | See CHECK DUPE FOR EXCLUSION CITIES-3 |
| DUPE CLASS IGNORE = PFAZXJDIURC | If CHECK DUPE FOR CLASS = YES, these are the Classes that cannot be removed, even if they are duped. |
| Q IF JUST DUPE CLASS IGNORE CLASSES = YES | If CHECK TO KILL DUPE SEGMENTS = YES, and if CHECK DUPE FOR CLASS = YES, and all classes are in DUPE CLASS IGNORE, and this entry = YES, then queue the PNR. |
| Q TO USE IF ALL CLASSES UNTOUCHABLE = CRC110/189 | If CHECK TO KILL DUPE SEGMENTS = YES, and if CHECK DUPE FOR CLASS = YES, and all classes are in DUPE CLASS IGNORE, and if Q IF JUST DUPE CLASS IGNORE CLASSES = YES, and there are not any classes in EXCEPT DON'T QUEUE CLASS list, then this is queue to put the PNR in. |

Duplicate ticket processing functionality can best be appreciated by reference to Table XII as follows:

TABLE XII

INI File Entry Variables for Duplicate-Ticket Checking, by Robot

| Robot | RECORD TICKET NUMBERS | DUPLICATE TICKET QUEUE | QUEUE DUPLICATE TICKETED PNR | REPORT DUPLICATE TICKET NUMBERS |
|---|---|---|---|---|
| Ar01 | YES | CRC465/11 | YES | YES |
| Bwia01 | YES | 244/189 | no | no |
| Bwia02 | YES | 244/189 | no | no |
| Bwia03 | YES | 244/189 | no | no |
| Copa01 | YES | | NO | NO |
| Ff01 | YES | JFK/72 | YES | YES |
| Ff02 | YES | JFK/72 | YES | YES |
| Ff03 | YES | JFK/72 | YES | YES |
| Ff04 | YES | JFK/72 | YES | YES |
| Gu01 | YES | | NO | NO |
| Ha01 | YES | FIR100/11 | YES | YES |
| Lr01 | YES | | NO | NO |
| Mx01 | YES | JFK/72 | YES | YES |
| N701 | NO | | NO | NO |
| N708 | NO | | NO | NO |
| Ta01 | YES | | NO | NO |

Duplicate ticket processing is particularly checked according to the functionality disclosed in FIG. 19 as can be appreciated relative to variables provided in Table XII. FIG. 19 is linked to FIGS. 10, 18 and 22.

In first round flight firming processing, the following steps occur as relates to FIGS. 10 through 12 inter alia:
   <GET_ticket> processes lines in the PNR from <PULL_TICKETS> or <GET_OSITKT> to pull out any ticket numbers. If a ticket number is found, <GET_ticket> calls <RECORD_TKTS>.
   If RECORD TICKET NUMBERS=YES, then <RECORD_TKTS> calls <LOG_VALTKT> to record ticket number, date of logging, and PNL in VALIDTKT file, and checks ticket number against the entries in VALIDTKT for a duplicate (other than itself).

If a duplicate ticket number is found, and REPORT DUPE TICKET NUMBER=YES, then <LOG_VALTKT> creates a variable duplog, containing the duplicate ticket numbers, markets, and dates, with an error flag "*DUP*"; duplog is then placed in the 'P' Log. (Example: *DUP* 1734180867713 WJJASE 28APR00 VS 1734180867713 SRMIHF 27APR00)

If QUEUE DUPLICATE TICKETED PNR=YES, then <PROC_PNR> calls <HANDLE_DUP_TKT>, which sends the message "TKT ALREADY USED PLEASE SUPPLY VALID TKT" to the travel agent and queues the PNR to the DUPLICATE TICKET QUEUE If QUEUE DUPLICATE TICKETED PNR=NO, then <PROC_PNR> sends the message "TKT ALREADY USED" and ignores the PNR Relating to second round flight firming as particularly seen in FIGS. 21 through 23 as aforesaid, the following steps occur:

<KILL_PNR_SUB3> calls <GET_OSITKT> to see if a ticket number is in the OSI section of the PNR.
<GET_OSITKT> calls <GET_ticket>, which processes lines in the PNR from <GET_OSITKT> to pull out any ticket numbers. If a ticket number is found, <GET_ticket> calls <RECORD_TKTS>.

If RECORD TICKET NUMBERS=YES, then <RECORD_TKTS> calls <LOG_VALTKT> to record ticket number, date of logging, and PNL is VALIDTKT file, and checks ticket number against the entries in VALIDTKT for a duplicate (other than itself).

If a duplicate ticket number is found, and REPORT DUPE TICKET NUMBER=YES, then <LOG_VALTKT> creates a variable duplog, containing the duplicate ticket numbers, markets, and dates, with an error flag "*DUP*"; duplog is then placed in the 'P' Log. (Example: *DUP* 1734180867713 WJJASE 28APR00 VS 1734180867713 SMRIHF 27APR00)

If the ticket number was a duplicate, <KILL_PNR_SUB3> calls <HANDLE_DUP_TKT>, which sends the message "TKT ALREADY USED—PLEASE SUPPLY VALID TKT" to the travel agent and queues the PNR to the DUPLICATE TICKET QUEUE <KILL_PNR> calls <KILL_PNR_SUB1> to process the PNR according to whether it is to be ignored, removed from 'VALIDPNR' file, queued on the CRS, or have its TTL updated; PNR is then placed in the 'L' log.

Relative to Q-files and functions, descriptions and design considerations can be taken from comments to be found relative to definitions provided in <Q_QUEUE>. Essentially, A queue is a pair of files. For each pair, one file is named qqqqqq_QUE, and the other is qqqqqq_CTL.

This is a dual-file mechanism for inter-robot communication.
  Blocks of "work" are appended to the _QUE file.
  A companion file—the _CTL file—is used as a "control" file to keep track of which block of work is to be de-queued next.

The format of each component in the _QUE file is:
1 The robot that queued the data.
2 The robot that de-queued the data. Empty indicates waiting to be de-queued.
3 The time the data was queued.
4 The time the data was de-queued.
5 The time the robot finished working on the data.
6 The data being queued to the robot (completely arbitrary).

This file is never held by anybody.

The "handle" returned as a result is the component number in the _QUE file. (Calling functions should pretend not to know that. In other words, no direct references to these files should be made by calling functions.)

There is one component in the _CTL file. It contains a short vector:

[1] Integer identifying the next component available to be worked. If this equals the second element of {quad}FSIZE on the _QUE file then there is no data to be worked in the queue.

[2] Highest component number in the range of contiguous worked items.

[3 . . . ] Subsequent positions represent components that are currently being worked or recently worked. Positive numbers are components being worked; negative numbers represent components that have been worked. (Negative numbers are eventually removed and reflected in position 2.)

The component in the control file must be small, because this file will be held and things must happen fast or there will be contention for the file. Also, a "critical write" strategy must be used so that the file is not left in some intermediate state when/if an error occurs.

Globals used:
  TNC_qqqqqq Tie number of control file.
  TNQ_qqqqqq Tie number of queue file.

All manipulations of the queue files should be through the Q_ functions, which are:

| | |
|---|---|
| <Q_CREATE> | Creates a queue by creating the required pair of files and initializing them. |
| | R - The queue name. |
| <Q_CLEAR> | Empties a queue. (Logical empty, not physical erase. Works with share tie. Does not recover lost space.) |
| | L - Must be the scalar character 'S' to indicate you are sure. |
| | R - The queue name. |
| <Q_ERASE> | Physically erases the queue files. |
| | L - Must be the scalar character 'S' to indicate you are sure. |
| | R - The queue name. |
| <Q_OPEN> | Ties the files associated with the queue. A separate open function is implemented because tying the files seems to be when most of the overhead and complications occur. Could be called from <INIT>. |
| | R - The queue name. |
| <Q_CLOSE> | Unties the two queue files. |
| | R - The queue name. |
| <Q_QUEUE> | Queues some data to be worked by some process. |
| | L - The data to be queued. |
| | R - The queue name. |
| | Z - The handle to identify the queue element. Zero indicates failure. |
| <Q_DEQUEUE> | Retrieves a block of data to be worked. |
| | R - The queue name. |
| | Z - 1 data if successful; 0 ' ' no data is on the queue. |
| <Q_WORKED> | Marks a queue elerpent as being worked. |
| | L - The handle of the item to be marked. |
| | R - The queue name. |
| | Z - 0 ' ' indicates no items on queue. |
| <Q_ITEMS> | Returns a count of how many un-worked, worked and "in progress" items are on the queue. (If "in progress" gets larger than the number of processors servicing the queue, then item(s) have probably been lost.) |
| | R - The queue name. |
| | Z - Number of items un-worked, worked, in progress. |

-continued

| | |
|---|---|
| <Q_READ> | Re-reads a queue item. (Note that <Q_DEQUEUE> reads the item.) This function is called if a queue item needs to re-read for some reason. Presumably re-reads from the _QUE file should be kept to a minimum to reduce contention on this shared file.<br>L - the handle to be read.<br>R - the queue name.<br>Z - 1 item retrieved if successful; 0 ' ' if no data is on the queue. |
| <Q_MINE> | Returns a list of handles that are currently shown as being worked by the robot calling this function. Useful for restart situations, maybe.<br>R - the queue name.<br>Z - Handles to identify the queue element. Empty indicates none. |
| <Q_CLEAN> | Removes worked components from the queue files. (Don't use this frequently. It can cause contention.)<br>L - number of worked items to retain. If 0, or not supplied, remove all possible contiguous worked items.<br>R - the queue name.<br>Z - 0 ' ' indicates no items on queue. |
| <Q_REPORT> | Reports on items being worked. Used to track down lost items (if that ever happens). This does not modify the queue in any way.<br>R - The queue name—essentially a file-name prefix (qqqqqq).<br>Z - Summary data pulled from the in-progress items: 'QUEUER', 'DEQUBUER', 'QUEUED AT', 'DEQUEUED AT', 'WORKED AT', 'DATA SHAPE'<br>To make sure <Q_REPORT> doesn't impact performance of other functions, this function is left unprotected against other processes manipulating the data while it is looking. So use this as a manual diagnostic and don't embed it into code that requires 100% accurate results. (Technically there should be a hold on the _CTL file throughout the time of reading the _QUE file. But that could be a lot of overhead if reading a lot of big components out of the _QUE file.) |

Referencing the traffic copy functionality of the Sweeper robot, that is,

<PROC_TRAFFIC_COP>, the following can be appreciated.

The Traffic Cop runs as a continuous function on one robot of the family.

It's the only process that ties/updates the VALIDPNR File and it determines the workload of other processes.

Result: Z—1=nothing done; 0=something done

Z will be set to zero many places below (anywhere we do any sort of work).

The traffic copy spools off stuff for these other processes to do:
  PROC_BUILD_LDS (Formerly part of PROC_PNRS) A process to identify the flights to be firmed and construct the LD commands to be done. This process builds a matrix of LD commands for some other process to actually run.
  PROC_RUN_LDS (Formerly part of PROC_PNRS). A process that runs the LD commands and returns a list of record locators. The only processing it does on the record locators is simple de-duping. The traffic cop will then do further de-duping against the master list and determine which record locators are new.
  PROC_FIRST_ROUND (Formerly part of PROC_P-NRS) First round flight firming.
  PROC_SECOND_ROUND (Formerly PROC_TTL_QUEUE) Second round flight firming.

Every section must be tolerant of restarting. Some guidelines:
  Obviously nothing must be marked as "worked" until it has been definitely passed on to the next stop along the way. This usually means that the call to Q_WORKED follows the call to Q_QUEUE.
  Be careful where you call POST*MSG. Remember that it can QLOAD. It shouldn't be called at points where we don't want a restart.
  Be careful about calling functions that might provoke QLOADS. Since we don't talk to a CRS in this function, we should be able to avoid most QLOADS (the file covers can also QLOAD though, due to file/network problems).
  Keep this function isolated from the CRS. Don't talk to the CRS here.

The QN_ variables are the names of the various queues.

THR_variables are the "threshold" for queues we are feeding. When the number of un-worked items on the queue falls below this threshold it means we want to supply more work. We try to put off building new work until the last minute because that usually helps us achieve efficiency by batching.

OPEN_FF_QUEUES

'TRAFFIC COP STARTING'
  BUILD_LDS to US.
  US to RUN_LDS.
  RUN_LDS to US.
  US to FIRST_ROUND.
  FIRST_ROUND to US.
  US to SECOND_ROUND.
  SECOND_ROUND to US.

GLBL 'RUN LD BATCH SIZE'

GLBL 'FIRST ROUND BATCH SIZE'

GLBL 'SECOND ROUND BATCH SIZE'

FTIE '35 TRAFFIC'
  Component 1—PNRs that are in progress in first round
  Component 2—PNRs that are in progress in second round
  Component 3—PNRs that need to be retried in first round
  Component 4—PNRs that need to be retried in second round Tell PROC_BUILD_LDS what to do, in this implementation PROC_BUILD_LDS decides what to do based on his old parameters. In the future we could have multiple instances of PROC_BUILD_LDS each building LDS for the days (ranges) we tell them to.

Pass the results of PROC_BUILD_LDS on to instances of PROC_RUN_LDS.

'BUILDING LDS QUEUE'

See if we have anything to work from a restart.
  '—REWORKING INTERUPTED BATCHES ON LDO'
  '—WORKING NEW QUEUE ITEMS ON LDO'

Process the results of PROC_FIRST_ROUND guys by updating the VALIDPNR file. We do this before sending new stuff to the first round guys so that the VALPNR will be as up to date as possible (that's probably not strictly necessary because we have the record locators in progress noted somewhere).

See if we have anything to work from a restart.

'PROCESSING FIRST ROUND OUTPUT QUEUE'
   '—REWORKING INTERUPTED BATCHES ON FRO'
   '—WORKING NEW QUEUE ITEMS ON FRO'

Action=0 means we didn't work PNR

'—UPDATING VALID PNR FILE'

Merge new VPNR entries into VALIDPNR file.

'—MARKING ITEMS AS WORKED ON FRO'

Note: We record the in-progress record locators below in TRAFFIC. We're going to keep getting stuff from the RUN_LDS guy while these PNRs are being processed and they won't go into the VALPNR file until they are processed. And we will need to "un-note" them in the code above. Eventually we are going to record this information in the VALIDPNR file.

Pass new record locators to PROC_FIRST_ROUND. When the first round guys get short on work take the results of PROC_RUN_LDS and send them to the first round guys. We build the batches such that record locators in the same "bucket" are grouped together. So that the batches can be most effectively organized, we don't do this until the queue of unprocessed work is running low. We build the batches such that record locators in the same "bucket" are grouped together.

'BUILDING FIRST ROUND INPUT QUEUE'

Number of new PNRs to pull off queue at a time.

We can cache this until we start adding to it below.

See if we have anything to work from a restart.
   '—REWORKING INTERUPTED BATCHES ON CP'
   '—WORKING NEW QUEUE ITEMS ON CP'

Guessing that 1 in 5 PNRS will be new.

C Flags new PNRs.

Note that we've checked for "in-progress" PNRs above.

C Flags new PNRs.

'P' LOG_DATA 'TRAFFIC COP NEW PNRS:'

'P' LOG_DATA PNRS,'*'

Group by buckets.

We now have all new candidate PNRs in PNRS and a bunch of queue elements in progress.

FOR THE MOMENT WE ARE JUST THROWING THE RETRIES AWAY

'—QUEUING TO FRI'

'—MARKING ITEMS WORKED ON CP'

Process the results of PROC_SECOND_ROUND guys by updating the VALIDPNR file.

Process the results of PROC_FIRST_ROUND guys by updating the VALIDPNR file.

We do this before sending new stuff to the first round guys so that the VALPNR will be as up to date as possible. (That's probably not strictly necessary because we have the record locators in progress noted somewhere.)

See if we have anything to work from a restart.

'PROCESSING SECOND ROUND OUTPUT QUEUE'
   '—REWORKING INTERUPTED BATCHES ON SRO'
   '—WORKING SRO'

Action=0 means we didn't work PNR

'—UPDATING VALIDPNR FILE'

Merge new VPNR entries into VALIDPNR file.

'—MARKING ITEMS WORKED ON SRO'

Pass record locators with expiring time limits to PROC_SECOND_ROUND. So that the batches can be most effectively organized, we don't do this until the queue of unprocessed work is running low. We build the batches such that record locators in the same "bucket" are grouped together.

'BUILDING SECOND ROUND INPUT QUEUE'

GET_EXPIRING_TTLS BASE_TIME

PNRs in progress and therefore blocked from being worked

PNRs in need of retrying

FOR NOW WE ARE JUST THROWING RETRIES AWAY (THEY WILL HAPPEN QUITE OFTEN IN SECOND ROUND ANYWAY)

'R' LOG_DATA 'RETRIES OF SECOND ROUND PNRS:'

'R' LOG_DATA C

Comments provided relative to the several processes of the present methodology are to be found in Table XIII as follows:

TABLE XIII

Comment Lines from Processes

| Process | Comment Lines |
|---|---|
| ADD_CANCELS_TO_DB (Tprocess) | Cover function for AddCancelsToDB (so it can be run as a TProcess) ARG:<br>R[1]- BEGINNING DATE (IN JULIAN FORMAT)<br>*NOTE: IF EMPTY, USE DEFAULT OF YESTERDAY<br>R[2]- ENDING DATE (EMPTY IF ONLY FOR ONE DAY)<br>RESULT:<br>Z - ⁻1 TO KEEP THE SCHEDULER RUNNING NORMALLY |
| ADD_ITIN_FROM_HIST | GET FLOWN LEGS OF ITINERARY AND ADD BACK INTO PNR<br>ARG:<br>R - [1] PNR<br>    [2] NUMBER OF LINES NAME TAKES UP<br>L - HIST (IF GIVEN)<br>RESULT:<br>RECREATED PNR |
| ADD_TO_ITIN | ADD MORE FIELDS OF INFORMATION TO AN R (THAT CAN BE DEDUCED)<br>ARG:<br>R - R<br>RESULT:<br>(64 ϑ R), LEG INDICATOR, LEG #, O + D |

TABLE XIII-continued

Comment Lines from Processes

| Process | Comment Lines |
|---|---|
| AddCancelsToDB | Insert cancel information for the date(s) given into the CANCEL.MDB database<br>ARG:<br>R[1]- BEGINNING DATE (IN JULIAN FORMAT)<br>R[2]- ENDING DATE (EMPTY IF ONLY FOR ONE DAY)<br>RESULT:<br>$^-$1 (TO KEEP SCHEDULER RUNNING NORMALLY) |
| BUILD_1D_FLIGHT_LST | RETURN A LIST OF FLIGHTS OPERATING ON 1 (OR MORE) DAYS. |
| BUILD_SCRAPE_REC | BUILD A RECORD CONTAINING TONS OF STUFF SCRAPED FROM A PNR<br>ASSUMES A BAZILLION VARIABLES<br>ARG:<br>R - [1]- NameList<br>    [2]- TICKETS<br>    [3]- FFN<br>RESULT:<br>A LONG VECTOR IF ONLY 1 NAME; OR A WIDE MATRIX IF MULTIPLE NameList |
| CHASE_DIVIDED | GO THROUGH A PNR AND IF THERE IS A DIVIDED RECORD INDICATED, GO TO ITS PARTNER AND GET MORE INFORMATION, DEPENDING ON THE OPERATION ASKED FOR<br>OP = 1; Finds the original number in party for a PNR if it has been divided<br>OP = 2; Stop the first time you find a paid TK for A class<br>OP = 3; Stop the first time you find a Stored Fare (*WS)<br>*** WARNING ***<br>BECAUSE THIS FUNCTION SENDS DISPLAY COMMANDS TO THE CRS, IT MAY LEAVE YOU IN A DIFFERENT STATE THAN YOU EXPECT - I.E. YOU MAY NEED TO REDISPLAY THE PNR YOU STARTED WITH IF YOU PLAN ON RUNNING SUBSEQUENT COMMANDS<br>ARG:<br>R[1]- OP<br>R[2]- PNR<br>R[3]- OP = 1; NUMBER IN PARTY FOR CURRENT PNR (USUALLY GLOBAL 'NP')<br>    OP = 2; INDEX OF WHICH ITIN TO USE<br>L - LIST OF RECORD LOCATORS TO SKIP<br>RESULT:<br>Z - DEPENDS ON OP<br>OP = 1; ORIGINAL NUMBER IN PARTY<br>OP = 2; 1 = THERE WAS A PAID UPGRADE ELSE 0<br>OP = 3; (*WS) IF ONE FOUND; ELSE EMPTY |
| CHECK_SUSPICIOUS_NAMES | Check for suspected ficticious names in the current PNR and log them if found.<br>* NOTE: This function depends on globals 'BadNames' and 'NBadNames'. |
| CHECK_TICKETED | CHECK SOME ASPECT OF PNR EVEN THOUGH IT HAS BEEN TICKETED. |
| CHG*VALPNR | LOOKUP A PNL IN OUR LIST OF VALIDS AND CHANGE ITS TTL TIME<br>ARG:<br>R - PNL<br>L[1]- LATEST KNOWN ITIN DATE (CAN BE PURGED AFTER THIS DATE)<br>L[2]- TICKET TIME LIMIT<br>L[3]- PASS<br>L[4]- COUNTER<br>RESULT:<br>VECTOR OF 1 = CHANGED OK, OR 0 = NOT |
| DO*ET*ER | DO EITHER AN 'ET' OR 'ER' COMMAND TO SAVE A Pnr. |
| DO*QEP | DO A 'QEP' COMMAND TO SAVE A Pnr. |
| EMAIL_SUSPICIOUS_NAMES (Tprocess) | Compiles then emials suspicious name report to customers<br>RESULT:<br>Z - $^-$1 TO INDICATE COMPLETION OF TPROCESS TO SCHEDULER |
| EXCEL_REPORT | Create statistics Excel report based on template for the dates given.<br>ARG:<br>R[1] - START DATE<br>* IF R IS EMPTY THEN PROMPT<br>R[2]- END DATE<br>* IF 1 = ρR THEN IT IS MONTH TO DATE<br>RESULT:<br>Z - FULL PATH TO XLS REPORT FILE CREATED |
| EXPAND_ITIN_N7 | EXPAND (IF APPROPRIATE) A THRU FLIGHT INTO SMALLER LEGS<br>ARG:<br>L - BRD, OFF (THIS WILL GIVE YOU THE CLUE THAT THE ITINERARY NEEDS EXPANDING)<br>R - ITIN<br>RESULT:<br>[1] NEW ITIN<br>[2] NEW DAYS<br>EX: LET'S SAY THE ITIN SHOWED LAX-MDW, BUT L SHOWS LAX-LAS (OR LAS-MDW) NEED TO ADD A LAX-LAS LEG AND CHANGE LAX-MDW TO LAS-MDW<br>NOTE: THE ADDED LEG WILL INHERIT EVERYTHING, WHICH MAKES NO SENSE FOR TIMES<br>MORE NOTE: THIS ASSUMES LAS IS THE ONLY HUB CITY |

TABLE XIII-continued

Comment Lines from Processes

| Process | Comment Lines |
|---|---|
| FIRM_RULES1 (custom coded for each customer) | DO SOME FIRMING RULES; CALLED BY PROCΔPNRΔSTUB AND KILLΔPNR. ARG: R - PROCESS NAME RESULT: 0 = OK; 1 = NEEDS TO BE SKIPPED |
| FLOWN_DATA | RIP A PNR APART THAT WAS IN THE VCR QUEUE ARG: R - PNR HIST L - RESULT: HUGE SCRAPED RECORDS OF ALL YOU WOULD EVER WANT TO KNOW ABOUT A PNR |
| FLOWN_FF_TABLE2 | LOOK UP DEFAULT FREQUENT FLYER CREDIT WHEN OTHER PROCESSES WOULDN'T GET IT FOR US ARG: L - CLASS OF SERVICE R - ORIG, DEST RESULT: FREQUENT FLYER POINTS |
| FLOWN_FP_TABLE2 | LOOK UP DEFAULT FARE WHEN OTHER PROCESSES WOULDN'T GET IT FOR US ARG: L - CLASS OF SERVICE R - ORIG, DEST RESULT: FARE AMOUNT |
| GATHER_PNRCTR | GATHER UP ALL THE OPERATIONAL COUNTERS. ARG: R - DATE TO DO IT FOR L = 1 - DO ALL ROBOTS WITHIN THIS CUSTOMER; ELSE JUST ONE THAT'S RUNNING RESULT: COUNTERS FOR ALL ROBOTS ADDED TOGETHER |
| GET_ATN_TKT | TRY TO FIND AN ATN TYPE TICKET NUMBER ARG: R - SECTION OF PNR TO LOOK IN L - HOW MANY DIGITS TO ACCEPT IF NOT A WELL FORMED ATN RESULT: TICKET NUMBER |
| GET_EXPIRING_TTLS | CHECK FOR EXPIRED TIME LIMITS ARG: R - TIME LIMIT TO CHECK AGAINST (PACKED DATE DDDDDHHHH) RESULT: LIST OF VALIDPNR FILE ENTRIES |
| GET_FIRST_PNR_DATE | GET FIRST TIME/DATE FROM PNR START FROM TOP AND STOP FIRST TIME GET A LEGIT TIME/DATE NOTE: THERE SHOULD BE A TIME ON THE 2ND LINE OF HISTORY |
| | ARG: R - TIME ZONE TO CHANGE IT TO L - [1] 1 = USE AN ALTERNATE WAY TO GET DATE [2] 1 = INCLUDE ALL CARRIERS SEGMENTS RESULT: Z[1]- DATE Z[2]- TIME |
| GET_NAMES3 | Return party names as a matrix with one party (not individual) name per row. ARG: R - PNR L - 1 = ACCEPT CORPORATE NAMES RESULT: [1]- NAMES [2]- NUMBER OF PARTY [3]- LAST LINE OF NAME SECTION IN PNR NAME - A matrix of party names as found in the R (use COMBINEΔ NAMES to get individual names rather than party names). We retain the title, if any was specified. Callers should note that it is common for the title to be missing the blank ahead of it. Example of PNR name section is: n. 2LAST/FIRST1/FIRST2* CO41/ 2.2CHR n + 1.1LAST/NAME MR 1SMITH/POCAHANTAS n. 1PERKINS/MARLIN Name section ends when one of the following is encountered: A line with no "/". A line where the party member count doesn't equal the number of slashes. ASSUME DROP_MSG_PNR HAS BEEN RUN |
| GET_OSITKT | ARG: R - PNR. IF R IS NESTED; THEN IT'S SPECIAL CASE OF JUST OSI LINES. L[1]- HOW MANY TICKETS EXPECTED. L[2]- HOW MANY DIGITS TO LOOK FOR. L[3]- 1 = SKIP KEYING OFF OF TOKEN ONLY IN A RANDOM SEARCH. L[4]- 0 = LOOK FOR TKT AND 10 DIGIT IF ALL ELSE FAILS 1 = DON'T RIP A PNR APART TO GET TICKET NUMBERS. RESULT: (RC) (TKT NOS OR ERROR MSG) (TKT NOS IF RC = 1^ HAVE REAL TICKETS, BUT SOMETHING WRONG). RC = 1; SUSPECT OR REAL TKT NO. IF 2ND ITEM IS MATRIX; THEN REAL TKT NOS; ELSE WHY IT'S A SUSPECT. RC = 2; VIOLATED SOME RULE. RC = 3; ERROR. |

TABLE XIII-continued

Comment Lines from Processes

| Process | Comment Lines |
|---|---|
| GET_SECTION | GET A SECTION OF A PNR BASED UPON A SECTION NAME<br>ARG:<br>R - PNR TO LOOK IN<br>L - SECTION NAME<br>RESULT:<br>CHAR MATRIX OF SECTION OR EMPTY IF NOT FOUND |
| GET_ticket | LOOK FOR TICKET NUMBER IN ONE LINE OF TEXT<br>ARG:<br>R - LINE WITH TICKET NUMBER ON IT (WE HOPE)<br>L[1]- HOW MANY TICKETS TO EXPECT; IF =0, TAKE WHATEVER WE FIND<br>L[2]- NUMBER OF DIGITS THRESHOLD TO EVEN CONSIDER IT BEING A TKT NBR<br>L[3]- 1 = LOOK FOR WORDS 'TKT' OR LIKE AND 10 DIGIT NUMBER, IF ALL ELSE FAILS<br>RESULT:<br>[1] RETURN CODE 1 = OK<br>[2] TICKET NUMBER OR ERRMSG |
| GET_TICKETS | GET THE TICKET NUMBERS OUT OF A SABRE MULTI-HOST PNR (I.E. IT WILL ONLY WORK FOR HA)<br>ARG:<br>R - PNR TO STRIP<br>RESULT:<br>CHAR MATRIX OF TICKET NUMBERS |
| GET_TOURAMT | IS THERE A TOUR PACKAGE AMOUNT<br>ARG:<br>R - PNR TO CHECK OUT<br>RESULT:<br>[1] 1 = YES<br>[2] = AMOUNT |
| GLBL | Using modified code from INISection to not use nesting.<br>New GLBL using INIString and INISection.<br>Reads entries out of an ini file.<br>RESULT: ↑↑<br>Default ini file name: subadminlib, robot, '.ini'.<br>Default section: [Robot Settings].<br>Default not-found result: ' '. This is returned if the file, section, or R are not found.<br>All results are UPPERCASE.<br>Syntax: L GLBL R<br>ARG:<br>R (char string) is the setting to read. If the R is '*', the entire section is read and all non-blank lines not beginning with ';' are returned with leading blanks removed.<br>Optional left argument (L, char string): L has the form: 'file.ini[section]{not-found result}'.<br>Any chars before the first '[' are read as the ini file name and path. If nothing appears before the first 'C', the ini file defaults to: subadminlib, robot, '.ini' |
| | The section name is the chars between '[ ]'. If no 'C' appears, the section defaults to [Robot Settings]. The not-found result is the chars between '{ }'. If no '{' appears, the not-found result defaults to ' '. Note: case does not matter in any of the arguments.<br>Example: 'c:\windows\aplw30.ini[config] GLBL 'wssize' returns the wssize = setting in the [config] sections of the c:\windows\aplw30.ini file. |
| HANDLE*MSG | WRITE OUT MESSAGE TO DIFFERENT PARTS OF SCREEN. |
| HANDLE_DUP_TKT | WHAT TO DO WHEN YOU HAVE DUPLICATE TICKET NUMBERS<br>ARG:<br>R - ROBOT NAME<br>RESULT:<br>1 = L16a (FINISH SENDING PNR)<br>2 = L16ae (Q IT)<br>3 = L16x (DON'T WANT TO SEE IT AGAIN) |
| INIT | CREATE/SETUP A WHOLE BUNCH OF STUFF. |
| INIT2 | INITIALIZE GLOBAL VARIABLES. |
| INIT3 | SIGNIN TO RESERVATION SYSTEM. |
| IS_IT_TICKETED | DOES A PNR HAVE THE TICKETING FIELD FILLED IN. |
| KILL*PNR | PROCESS A PNR BECAUSE OF TIME LIMIT EXCEEDED. SABRE - tower.<br>ARG:<br>R - IF SIMPLE; PNR TO PROCESS. IF COMPLEX (PNR Hist RecLoc Pnl).<br>L[1]- TTL. |
| KILL_DUP_SEGMENTS | REMOVE DUPLICATE SEGMENTS.<br>A DUPLICATE IS DEFINED AS:<br>1. SORT ITIN BY FLIGHT TIME.<br>2. THEM ANY IDENTICAL O/D THAT OVERLAP IN TIME. |
| KILL_PNR_SUB1 | DO BOTTOM PORTION OF A KILL_PNR.<br>ARG:<br>R[1]- BRANCH POINT INDICATOR OF WHERE TO GO.<br>R[2]- (IF PRESENT) TTL TO SET AFTER QING (IF APPLICABLE).<br>L - WHERE TO QUEUE, IF GOING TO. |
| KILL_PNR_SUB2 | COMMON SUBROUTINE TO KILL_PNR.<br>ARG:<br>R - ARC PASSED IN FROM KILL_PNR.<br>RESULT:<br>0 = CONTINUE;<br>1 = DON'T LOOK AT AGAIN;<br>2 = CHANGE TTL. |
| KILL_PNR_SUB3 | DO COMMON LINES FOR KILL_PNR.<br>ARG:<br>R - LEFT ARG TO KILL_PNR (CURRENT TIME AT HDQ). |

TABLE XIII-continued

Comment Lines from Processes

| Process | Comment Lines |
|---|---|
| | RESULT: POINTER INDICATING WHERE TO GO AFTER EXECUTION (LABELS SHOULD MATCH). |
| LOAD*DAILY | LOAD DAILY DATA. RESULT: CONTENTS FROM COMPONENT (IN THE CASE THAT THE COMPONENT IS 9 (COUNTERS) THEN THE RESULTS FOR THE MIRROR COUNTERS WILL BE RETURNED AS WELL - ρZ WILL BE 2 INSTEAD OF 1. USE CURRENT ROBOTSTA2 IF NOT EXPLICITLY REQUESTED OTHERWISE. |
| LOAD_SCHED | SET UP SCHEDULING PARAMETERS. |
| LOG_DATA | PUT DATA INTO A LOG FILE. ARG: L - WHAT TYPE OF LOG FILE - SINGLE CHAR. R - CHAR MATRIX OF WHAT TO LOG. |
| LOG_VALTKT | RECORD A TICKET NUMBER IN OUR LIST OF VALID TICKETS ARG: R - TICKET L - 1 = REPORT BACK THAT IT ALREADY HAS BEEN STORED RESULT: 1 = A TICKET NUMBER HAS PREVIOUSLY BEEN STORED |
| MAIN | TRAPS ALLOWING INTERRUPTS TO BE CAPTURED, REQUEST CONTINUE OR RETURN TO PREVIOUS SAFE POINT, STOP AT THAT POINT, OR DISPLAY ANY OTHER ERROR THAT HAS OCCURRED. |
| MAIN_SR | TRAPS ALLOWING INTERRUPTS TO BE CAPTURED, REQUEST CONTINUE OR RETURN TO PREVIOUS SAFE POINT, STOP AT THAT POINT, OR DISPLAY ANY OTHER ERROR THAT HAS OCCURRED. MAIN ROUTINE FOR WHEN FORM TIMES OUT - WHERE THE WORK IS DONE. |
| MAKE_CITYCODE | MAKE UP A LIST OF VALID CITIES AND OTHER NICE STUFF. ARG: R[1] = 1 LOOK FOR NEW CITIES THAT MIGHT NOT BE IN CITYCODE.LST IF R[1] = 1 AND R[2] = 1, THEN PUT NEW ENTITIES BACK IN CITYCODE.LST RESULT: [1] BRD(3) [2] OFF(3) [3] TIME ZONE (4) [4] DOM/INT (1) [5] FIRMING RULE (4+) [6] FLTS(4) OR EMPTY IF NO COLUMN [7] DEPARTURE DATE(S) OR EMPTY IF NO COLUMN CityCode NEEDS TO BE LOCAL AND UNDEFINED; USED IN BUILD_1D_FLIGHT_LST |
| PROC*PNR*STUB | DO FIRST ROUND FIRMING - SABRE. ARG: R - TIME OF BOOKING L - RESULT OF GETΔ OSITKT RESULT: 1 - DO A SAVE AFTER RETURN 2 - JUST RECORD AND MOVE ON AFTER RETURN 3 - IS AN OSI TKT NUMBER 4 - SEND TO ERROR 0 SINCE THERE IS NOT TTL, THEN WE HAVE TO PUT ONE ON. LOOK TO HANDLE SPECIAL RULES. MOST ARE INTERNATIONAL, BUT THERE IS AT LEAST 1 DOMESTIC. RULES SHOULD BE PRETTY WELL MUTUALLY EXCLUSIVE. |
| PROC_BUILD_LDS (Cprocess) | BUILD A COMPLETE SET OF LD COMMANDS FOR FLIGHTS WE WANT TO WORK. RESULT: Z = ¯1 - NOTHING DONE Z = 0 - SOMETHING DONE Z = 1 - USER REQUESTED STOP Z = 2 - COMPLETE SET HAS BEEN DONE, TIME TO START OVER |
| PROC_FIRST_ROUND (Cprocess) | DO FIRST ROUND FLIGHT FIRMING (SETTING TTLS, ETC.) THIS SHOULD BE A T PROCESS THAT DOES NOT RUN ACROSS MIDNIGHT. RESULT: Z = ¯1 - NOTHING DONE Z = 0 - SOMETHING DONE Z = 1 - USER REQUESTED STOP |
| PROC_PNR | PROCESS A PNR; ULTIMATELY TRYING TO GET IT TICKETED ARGS: R - IF SIMPLE, PNR TO PROCESS; IF COMPLEX (PNR Hist RecLoc) L[1] 1 = LOG SCRAPED DATA |
| PROC_RUN_LDS (Cprocess) | RUN A BATCH OF LD COMMANDS AND ISOLATE RECORD LOCATORS. RESULT: Z = ¯1 - NOTHING DONE Z = 0 - SOMETHING DONE Z = 1 - USER REQUESTED STOP Z = 2 - COMPLETE SET HAS BEEN DONE, TIME TO START OVER |
| PROC_SCHED_LDS | TELL THE BUILD LD ROBOTS WHAT TO DO. R is a character string that we use to construct the keyword for the INI file to retrieve our parameters. If R is "FULL SCAN" we would catenate on todays day of the week and look for the keyword FULL SCAN-MON for example to retrieve our parameters. Our parameters are as follows: * A list of dates means we work only those dates. Individual dates may be |

TABLE XIII-continued

Comment Lines from Processes

| Process | Comment Lines |
|---|---|
| | separated by spaces. Date ranges may be specified by separating two dates by a dash. If no year is specified in a date we work that date every year. Examples: 19MAY 21MAR2000 02JUL–07JUL<br>* A vector of two or three numbers means we use the first as an offset from today, the second specifies how far out we go in days, the third (optional) specifies an interval (4 would mean work every 4th day). These parameters make the "shotgun" mechanism obsolete. It is no longer supported.<br>Also PNR OFFSET and PASSES are now obsolete.<br>Later we'll add a way to specify the flights/markets to be worked also.<br>RESULT:<br>THE USUAL RUN_SCHED STUFF, WE ALWAYS RETURN 0 AT THE MOMENT.<br>Z =  ¯1 - NOTHING DONE<br>Z =   0 - SOMETHING DONE<br>Z =   1 - USER REQUESTED STOP |
| PROC_SECOND_ROUND (Cprocess) | DO SECOND ROUND FLIGHT FIRMING (CANCELING EXPIRED TTLS, ETC.)<br>THIS SHOULD BE A T PROCESS THAT DOES NOT RUN ACROSS MIDNIGHT.<br>RESULT:<br>Z =  ¯1 - NOTHING DONE<br>Z =   0 - SOMETHING DONE<br>Z =   1 - USER REQUESTED STOP |
| PROC_TRAFFIC_COP (Cprocess) | The Traffic Cop runs as a continuous function on one robot of the family. It's the only process that ties/updates the ValidPnr File and it determines the workload of other processes.<br>RESULT:<br>Z =  ¯1 - NOTHING DONE;<br>Z =   0 - SOMETHING DONE<br>The traffic cop spools off stuff for these other processes to do:<br>* PROC_BUILD_LDS<br>A process to identify the flights to be firmed and construct the LD commands to be done. This process builds a matrix of LD commands for some other process to actually run.<br>* PROC_RUN_LDS<br>A process that runs the LD commands and returns a list of record locators. The only processing it does on the record locators is simple de-duping. The traffic cop will then do further de-duping against the master list and determine which record locators are new.<br>* PROC_FIRST_ROUND<br>First round flight firming.<br>* PROC_SECOND_ROUND<br>Second round flight firming. |
| PULL_ITIN | USE THE STANDARD WAY TO GET ITINERARY FROM A PNR<br>RESULT:<br>1 = GOOD<br>2 = NO ITINERARY<br>3 = GROUP |
| | REMEMBER: ANY CALLING ROUTINE MUST HAVE ALREADY RUN THE FOLLOWING LINES<br>(Cit Zones FLGTTL)←CityCode[1 3 4]<br>DomCitTtl←(FLGTTL^.= (¯1↑ρFLGTTL)↑ 'D')–/Cit Zones←basetz, [1]Zones ADD ON DEFAULT TD←CURRENT_DATE |
| PULL_SABRE_WP | GET ALL OF THE PIECES NEEDED TO BUILD A WP<br>ARG:<br>R -   PNR TO WORK ON<br>L -   1 = GO CHASE DIVIDED PNRS FOR THE *WS<br>RESULT:<br>Z[1]   1 = OK<br>       0 = NOT<br>Z[2]-  AMOUNT OF TICKET<br>Z[3]-  WP TO PRICE<br>Z[4]-  BASE AMOUNT PER PERSON<br>Z[5]-  STORED FARE IMAGE<br>Z[6]-  ITIN<br>Z[7]-  TICKETED DATE<br>Z[8]-  DAYS |
| PULL_TICKETS | PULL THE TICKETS OUT OF A PNR<br>ARG:<br>R -   CHAR MATRIX OF PNR TO CHECK<br>RESULT:<br>(RC; 0 = NO TKTS, 1 = RELIABLE TKTS, 2 = UNRELIABLE TKTS, 4 = TKTS SEEN BEFORE) (TKTS)<br>*** NOTE *** WE DON'T KNOW HOW TO REALLY PULL TICKET, SO FIGURE IT OUT IF YOU NEED TO |
| READ_PNR | READ IN A PNR AND DO NECESSARY TRANSLATION INTO A CONSISTENT FORM<br>ARG:<br>R -   EITHER COMMAND TO EXECUTE OR A PNR<br>L -   IF EXIST; THEN TA TO ISSUE CMD - OTHER-WISE IS A PNR<br>RESULT: UNIFIED PNR<br>THE GENERALIZED PNR HAS THESE IN THESE POSITIONS:<br>CA - 4, 5<br>FLT # - 5 thru 9<br>CLASS - 10<br>DATE - 11 thru 16<br>RESERVED - 17 INDICATOR THAT DATE IS GUARANTEED TO BE IN PAST<br>BRDOFF - 19 thru 25<br>STATUS - 27, 28<br>DEPT - 31 thru 36<br>ARR - 37 thru 41 |
| READ_SABRE_LINEAR | READ THE LINEAR AND RETURN FARE, XF, FARE BASIS; SO FAR THIS WORKS ONLY FOR CASES THAT FOLLOW<br>NOTE: IT NOW WORKS FOR NEARLY EVERYONE, WITH SPECIAL SECTIONS FOR APOLLO THERE ARE MORE COMPLICATED CASES OF CONNECTIONS THAT HAVEN'T BEEN SEEN/TRIED YET |

TABLE XIII-continued

Comment Lines from Processes

| Process | Comment Lines |
|---|---|
| | ((2 3ρ'MDWLAS') ca |
| | 2) READ_SABRE_LINEAR |
| | 'MDW ca LAS133.34 ca |
| | MDW133.33KR14NR 266.67 END |
| | ZPMD W2LAS2 XFMDW3LAS3' |
| | ((2 3ρ'SEASJC') ca |
| | 2) READ_SABRE_LINEAR |
| | 'SEA ca SJC100.93K ca |
| | SEA137.96YF 238.89 END |
| | ZPSEA2SJC2 XFSEA3SJC3' |
| | ((4 3ρ'SEASJCLASRNO') ca |
| | 4) READ_SABRE_LINEAR |
| | 'SEA ca SJC98.91K/MCS29 ca |
| | LAS98.00K/MCS29 ca X/RNO ca |
| | SEA130.64K0/MC529 327.55 END |
| | ZPSEA2SJC2LAS2RNO2 |
| | XFSEA3SJC3LAS3RNO3' |
| | ((2 3ρ'LASMDW') ca |
| | 1) READ_SABRE_LINEAR |
| | 'LAS ca MDW180.56Q14NR END |
| | ZPLAS2 XFLAS3' |
| | ((2 3ρ'LASMDW') ca |
| | 1) READ_SABRE_LINEAR |
| | 'LAS ca MDW 452.78F7 END |
| | ZPLAS2 XFLAS3' |
| | ((2 3ρ'LASLAX') ca |
| | 2) READ_SABRE_LINEAR |
| | 'LAS ca LAXATV0.00 N7 |
| | LASATV0.00 0.00END' |
| | ((2 3ρ'RDUTPA') ca |
| | 2) READ_SABRE_LINEAR |
| | 'RDU ca TPA Q3.00 54.63LE7NR ca |
| | RDU Q3.00 148.61VE21NN 209.24 |
| | END ZPRDU2TPA2 XFTPA3 |
| | XFTPA3' |
| | ((3 3ρ'LGARDUORF') ca |
| | 3) READ_SABRE_LINEAR |
| | 'LGA ca X/RDU Q3.00 ca |
| | ORF164.36QE14NN/-RDU ca LGA |
| | 03.0063.89WE21PN 234.25 END |
| | ZPLGA2RDU2RDU2 |
| | XFLGA3RDU3RDU3' |
| | ((3 3ρ'LAXNYCLAS') ca |
| | 3) READ_SABRE_LINEAR |
| | 'LAX ca NYC 09.30 04.65 |
| | 138.60K23NR ca LAS236.28HA3 ca |
| | LAX Q9.30 52.09QOW 450.22 |
| | END ZPLAXMDWJFKLAS |
| | XFLAX3JFK3LAS3' |
| | FOLLOWING ARE APOLLO |
| | EXAMPLES |
| | ((2 3ρ'LAXLAS') ca |
| | 2) READ_SABRE_LINEAR |
| | 'LAX ca LAS R32.50KR7NR/CD ca |
| | LAX R32.50KR7NR/CD END FARE |
| | USD 65.00 TAX 6.00XF 5.20US |
| | 4.00ZP TOT USD 80.20' |
| | ((2 3ρ'DFWLAS') ca |
| | 2) READ_SABRE_LINEAR |
| | 'DFW ca LAS R236.28HA3 ca DFW |
| | 04.65 R236.28HA3 END FARE USD |
| | 477.21 TAX 35.79US 6.00XF |
| | 5.00ZP TOT USD 524.00' |
| | ca = 2-CHARACTER CARRIER |
| | CODE FOR AIRLINE |
| | ARG: |
| | L[1] - MATRIX OF CITIES FROM THE ITINERARY |
| | L[2] - CARRIER CODES (MAT) TO BE EXPECTING |
| | L[3] - NUMBER OF SEGMENTS IN ITINERARY |
| | L[4] - CHAR VERSION OF BASE FARE (IF SUPPLIED) |
| | R - CHAR VEC OF LINEAR TO ANALIZE |
| | RESULT: |
| | Z[1 THRU 3] - BOARD CITY |
| | Z[4 THRU 6] - OFF CITY |
| | Z[7 THRU 13] - FARE |
| | Z[14 THRU 17] - ZP |
| | Z[22 THRU ?] - FARE BASIS |
| RECORD_TKTS | RECORD TICKET NUMBERS FOR LATER CHECKING OF DUPLICATES |
| | ARG: |
| | R - LIST OF TICKET NUMBER |
| | RESULT: |
| | 1 = TICKET HAS BEEN USED BEFORE |
| RIP_OUT_ADDRESS | GET THE ADDRESS (IF THERE) FROM A PNR |
| | ARG: |
| | R - PNR TO LOOK IN |
| | RESULT: |
| | CHAR MATRIX OF ADDRESS (OR EMPTY) |
| RIP_OUT_FFN | GET FREQUENT FLYER NUMBERS OUT OF A SABRE RECORD |
| | ARG: |
| | R - R TO WORK ON |
| | L - LIST OF NAMES FROM THE R |
| | RESULT: |
| | MATRIX OF FFN CORRESPONDING TO NAMES (OR BLANK) |
| RUN_CONT_SCHED | RUN A CONTINUOUS PROCESS IN THE SCHEDULER. |
| | ARG: |
| | R[1] - WHICH CONTINUOUS PROCESS (1-N) |
| | R[2] - WHERE IN Sched TO GET RUNNING PARMS |
| RUN_SCHED | RUN SCHEDULED EVENTS |
| RUN_TP_SCHED | RUN A TIMED PROCESS IN THE SCHEDULER. |
| | ARG: |
| | R[1] - WHICH TIMED PROCESS (1-N) |
| | R[2] - WHERE IN Sched TO GET RUNNING PARMS |
| | R[3] - WHERE TO STORE STATUS |
| SET*STUFF | SET STUFF. |
| | ARG: |
| | R - 1 = DO FULL RESET OF PNR PROCESSING VARS |
| SET_CONT_SCHED | SET THE SCHEDULED TIMES FOR 1 CONTINUOUS PROCESS. |
| | ARG: |
| | R - CHAR STRING OF WHICH PROCESS FROM THE INI FILE (CPROCESS1) |
| SET_KAFON | CREATE THE LIST OF FLIGHTS IN THEIR SYSTEM. |
| SET_LINEAR_VARS | SET A BUNCH OF VARIABLES THAT COME FROM THE LINEAR |
| | ARG: |
| | R[1]- LINEAR |
| | R[2]- GROSS AMOUNT FOR TICKET |
| | R[3]- NUMBER OF PARTY |
| | L- ORIG IDEST |
| | RESULT: |
| | RC, BUNCH OF VARS |

TABLE XIII-continued

Comment Lines from Processes

| Process | Comment Lines |
|---|---|
| SET_TP_SCHED | SET THE SCHEDULED TIMES FOR 1 TIMED PROCESS.<br>ARG:<br>R[1]   WHERE IN LOAD_DAILY TO GET STATUS INDICATOR<br>R[2]   HHMM - CURRENT TIME TO COMPARE AGAINST<br>L -    CHAR STRING OF WHICH PROCESS FROM THE INI FILE (TPROCESS1-) |
| SIGNIN*TAS | ASYNC LOGIN TO MULTIPLE TAS<br>ARG:<br>R -    WHICH TAS HANDLES TO SEND TO<br>RESULT: BOOLEAN INDICATING WHICH TA SIGNED IN OK (=1) ALL BUT THE LAST TA SIGNS ON THE SAME |
| SOCKET_CHECK-IN | Checks in with SOCKET_CHECK_IN_SERVER running on the monitor robot.<br>ARG:<br>R[1] - ROBOT NAME<br>R[2] - COMPUTERNAME:IP<br>R[4] - TIMESTAMP |
| STORE*DAILY | STORE DAILY INFORMATION.<br>ARG:<br>L -    DATA TO STORE<br>R[1] - DATE TO STORE UNDER<br>R[2] - CMP OF FILE |
| STORE*DAILY*DIFF | STORE DAILY NUMERIC INFORMATION. IF THE NUMBER HAS CHANGED (I.E. SOMEONE ELSE ALSO STORING) THEN ADD IN THE INCREMENTAL CHANGES.<br>ARG:<br>L -    DATA TO STORE<br>L[1] - ENDING COUNTS<br>L[2] - BEGINNING COUNTS<br>L[3] - ENDING COUNTS (MIRROR COUNTER) ONLY NECESSARY IF USING COMPONENT 9<br>L[4] - BEGINNING COUNTS (MIRROR COUNTER) ONLY NECESSARY IF USING COMPONENT 9<br>R[1] - DATE TO STORE UNDER<br>R[2] - CMP OF FILE<br>RESULT:<br>Z -    TOTAL COUNTS (IN THE CASE THAT THE COMPONENT IS 9 (COUNTERS) THEN THE RESULTS FOR THE MIRROR COUNTERS WILL BE RETURNED AS WELL - ρZ WILL BE 2 INSTEAD OF 1. |
| TOP_OF_DAY (custom coded for each customer) (Cprocess) | RUN AT THE START OF DAY FOR - (2-Character Carrier Code) |
| TTL*CAN | RETRIEVE TICKET TIME LIMIT INFORMATION<br>ARG:<br>R -    PNR TO CHECK<br>L -    1 = ONLY LOOK REMARKS SECTION<br>Z -<br>[1]    0 = NO TTL<br>      1 = IS TTL<br>      2 = IS ROBOT TTL<br>[2]    0 = DEADLINE TYPE TTL OR NEED TO SKIP<br>      N = TIME LIMIT<br>[3]    0 = SUPERVISOR OVERRIDE; OTHERWISE REMARK LINE NUMBERS CONTAINING ROBOT TTL |
| XLS_TO_TXT | Converts an Excel Spreadsheet into a text file of the same name in the same location.<br>ARG:<br>R -    PATH TO EXCEL FILE<br>RESULT:<br>Z -    FULL PATH TO FILE CREATED |

Figure 13:
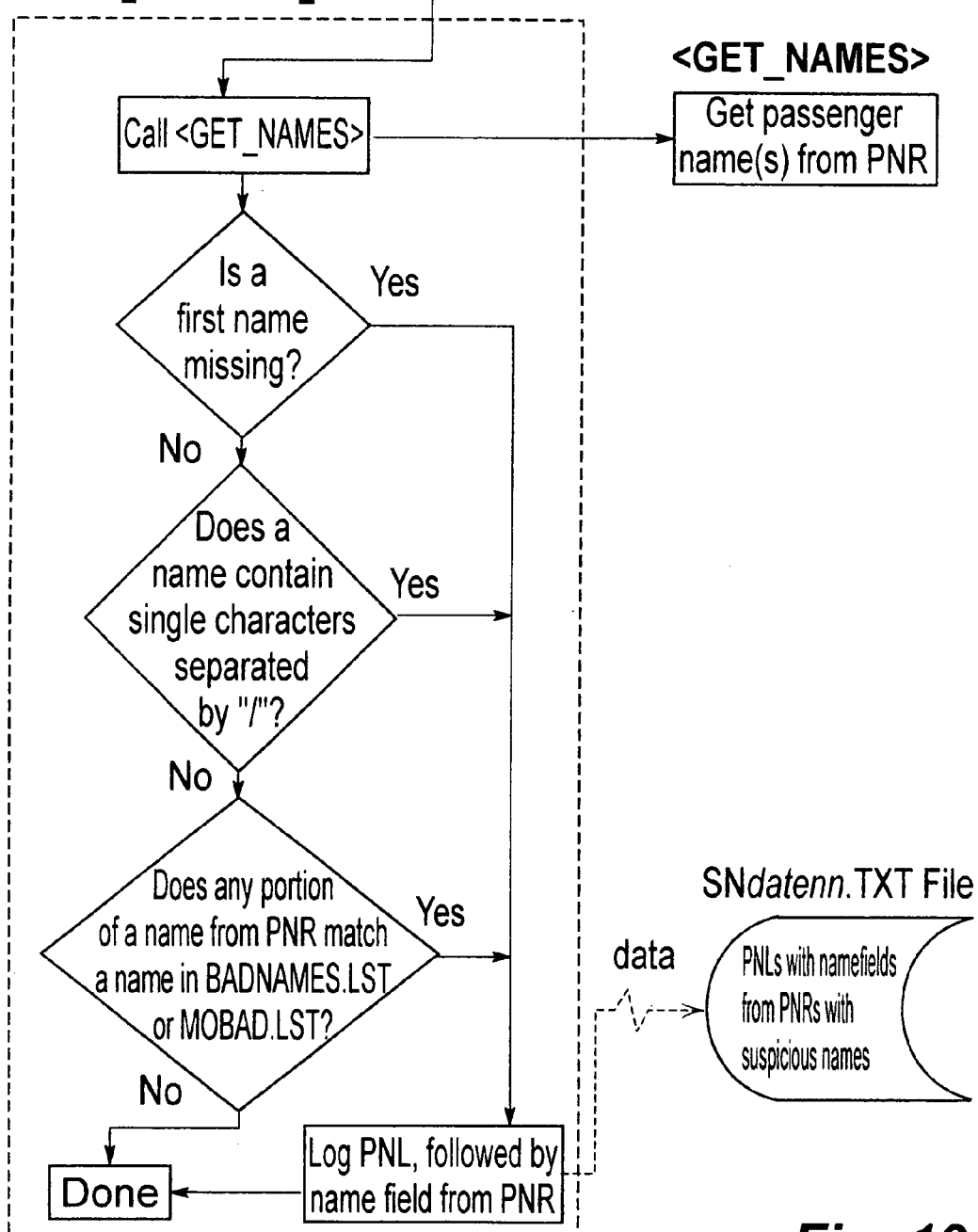
FIG. 13 is a flow chart illustrating operational sequences of the system which check for suspicious names.
Figure 14:
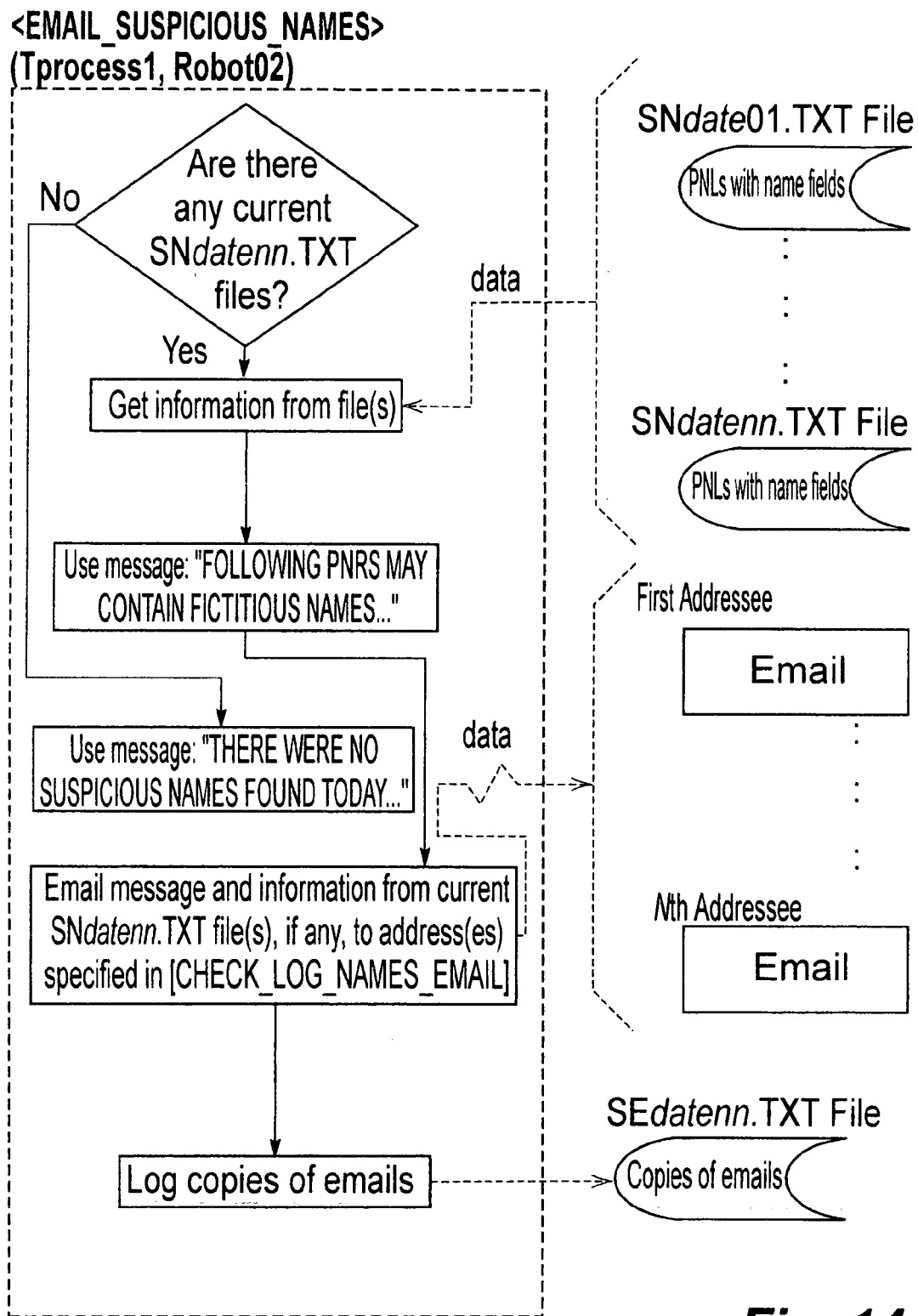
FIG. 14 is related to FIG. 13 and provides additional information relative to checking of suspicious names.

With reference to FIGS. 13 and 14, a robotic application conveniently referred to as Troll checks for suspicious names in order to remove invalid reservations from the reservations system.

Figure 24:
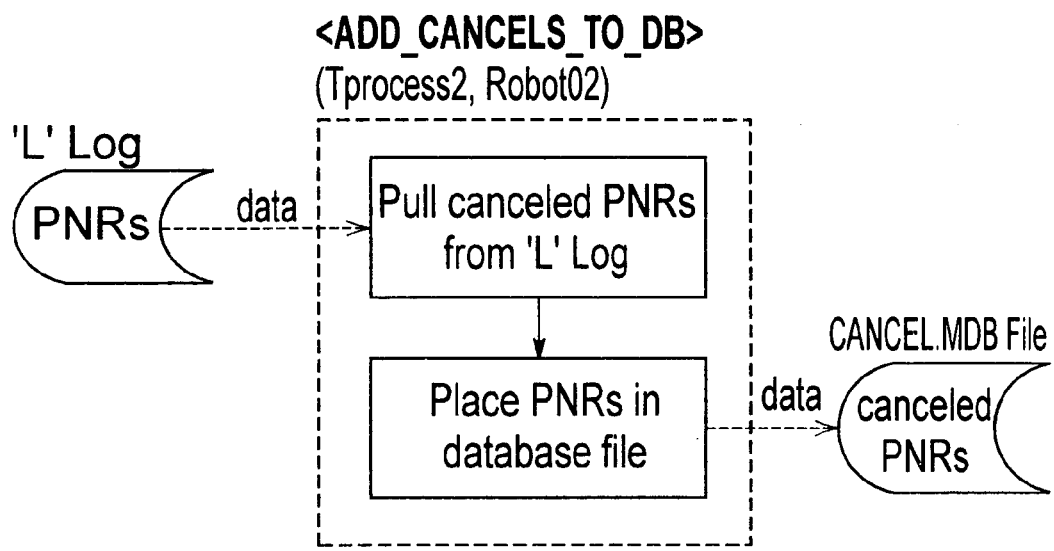
FIG. 24 is a diagrammatical representation of operational sequences of the invention intended for building a database of cancelled passenger name records or PNRs.
Figure 25:
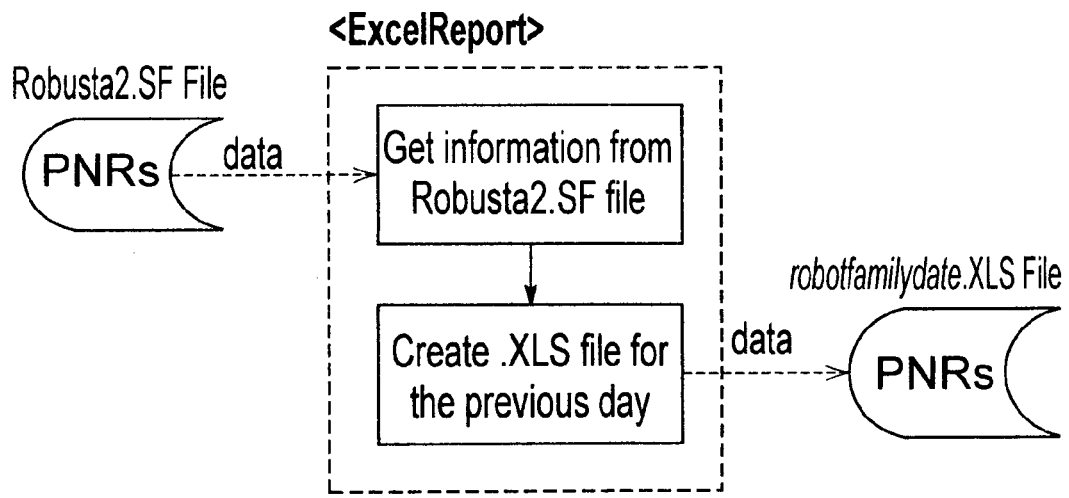
FIG. 25 is a diagrammatical representation of operational sequence routines necessary for establishing top-of-day routines; and, FIGS. 26, 27 and 28 are flow charts illustrating operational sequences related to passenger name record or PNR scraping.
Figures 26, 26A:
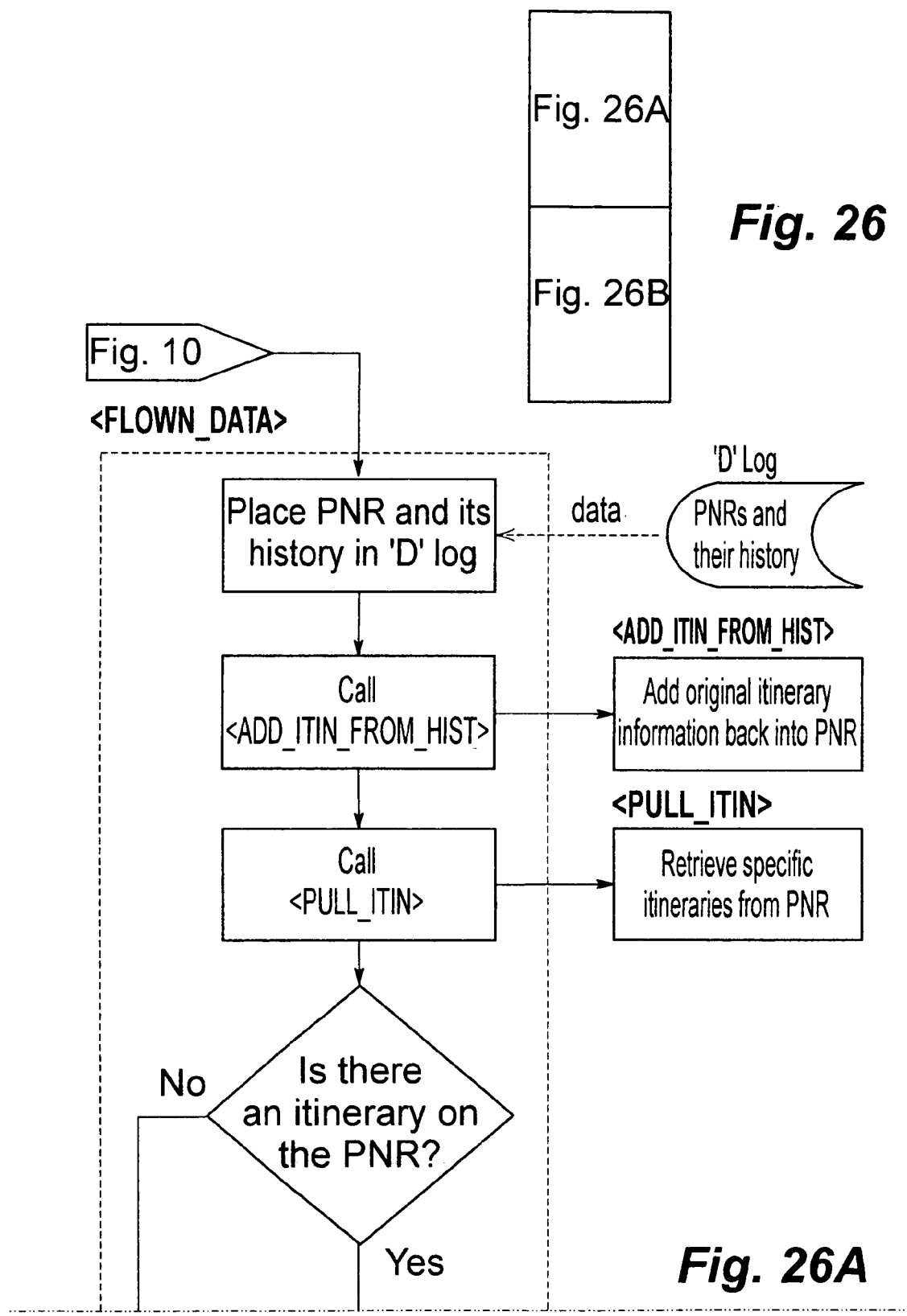
Figure 26B:
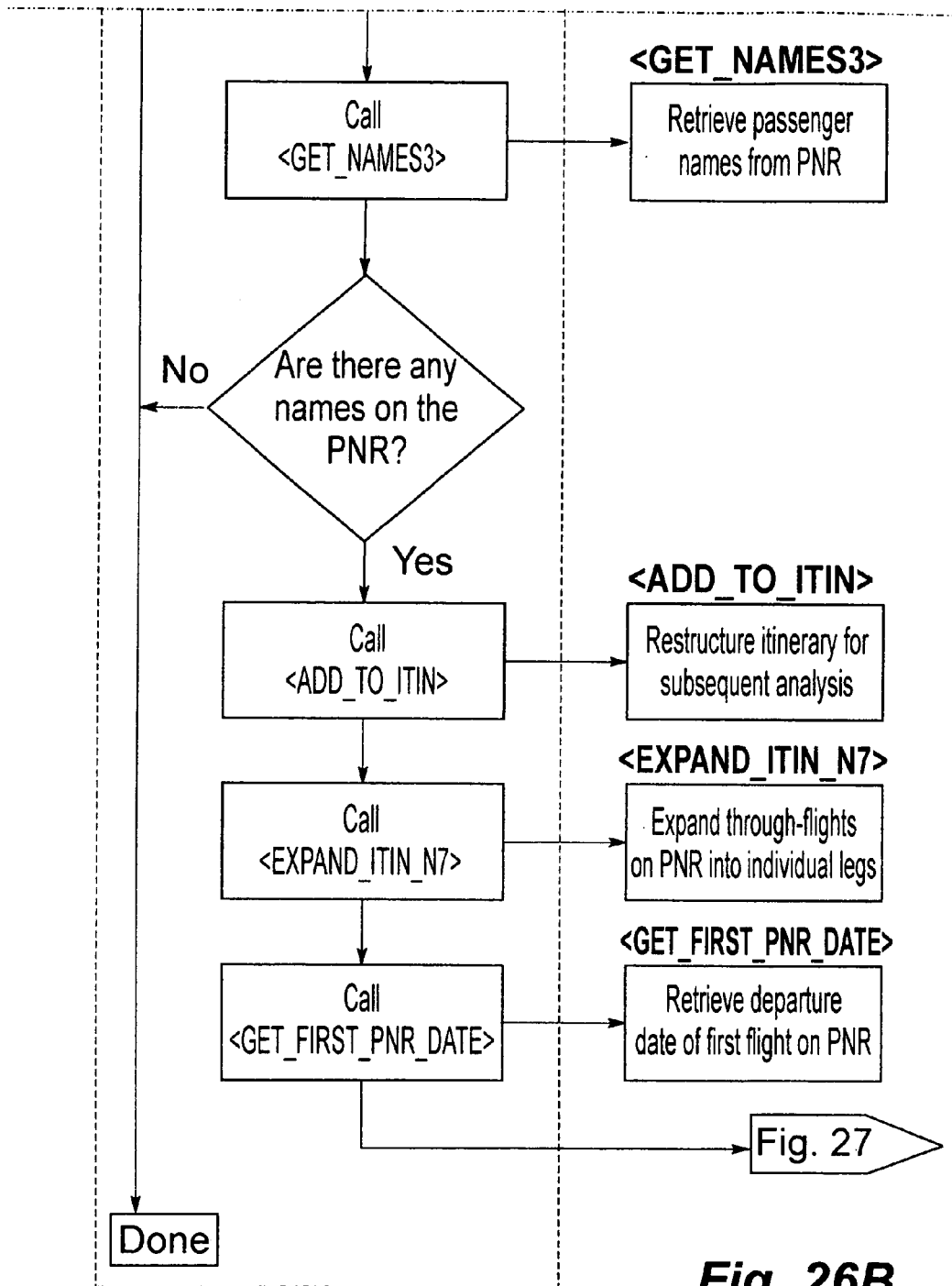
Figure 27B:
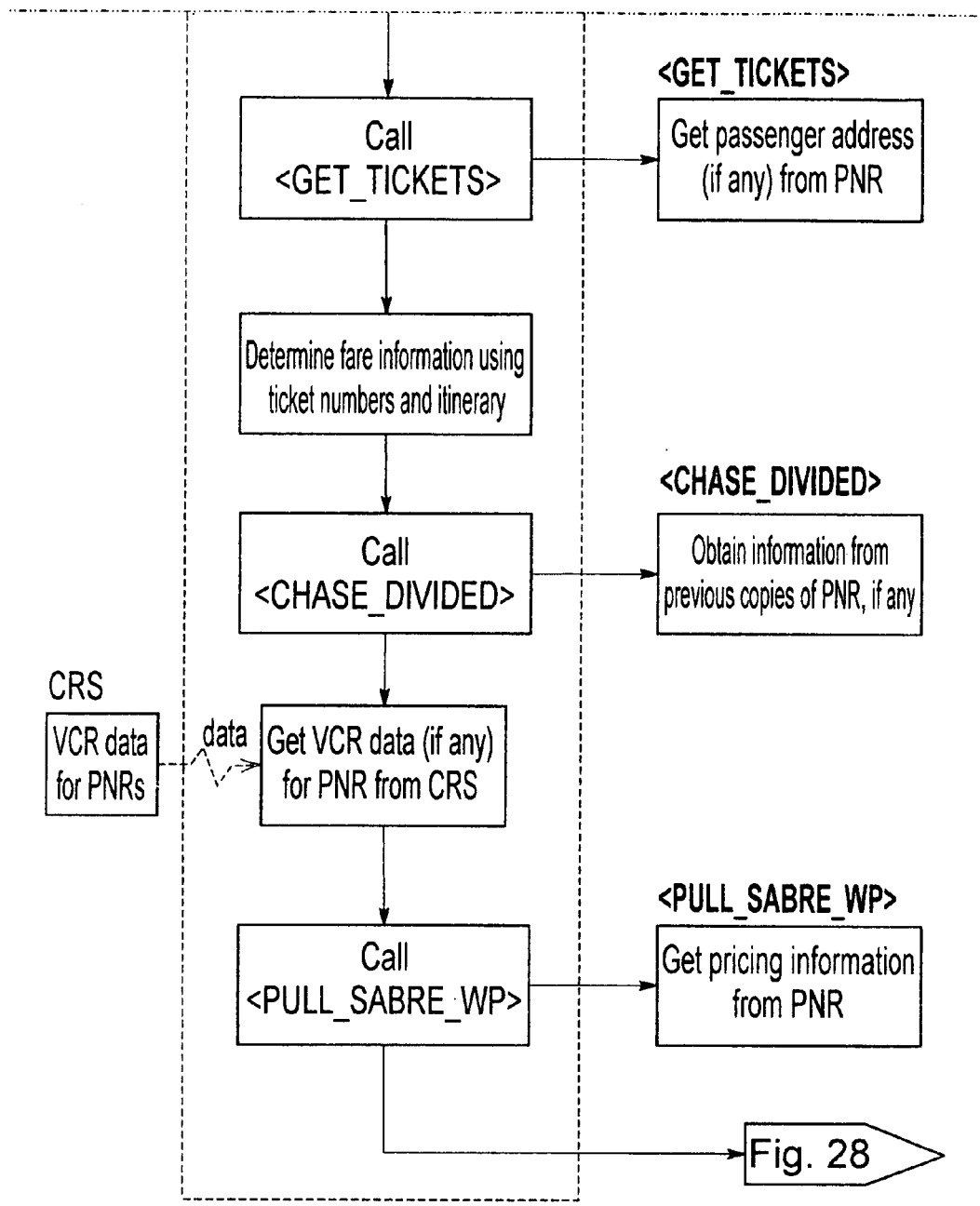
Figure 28A:
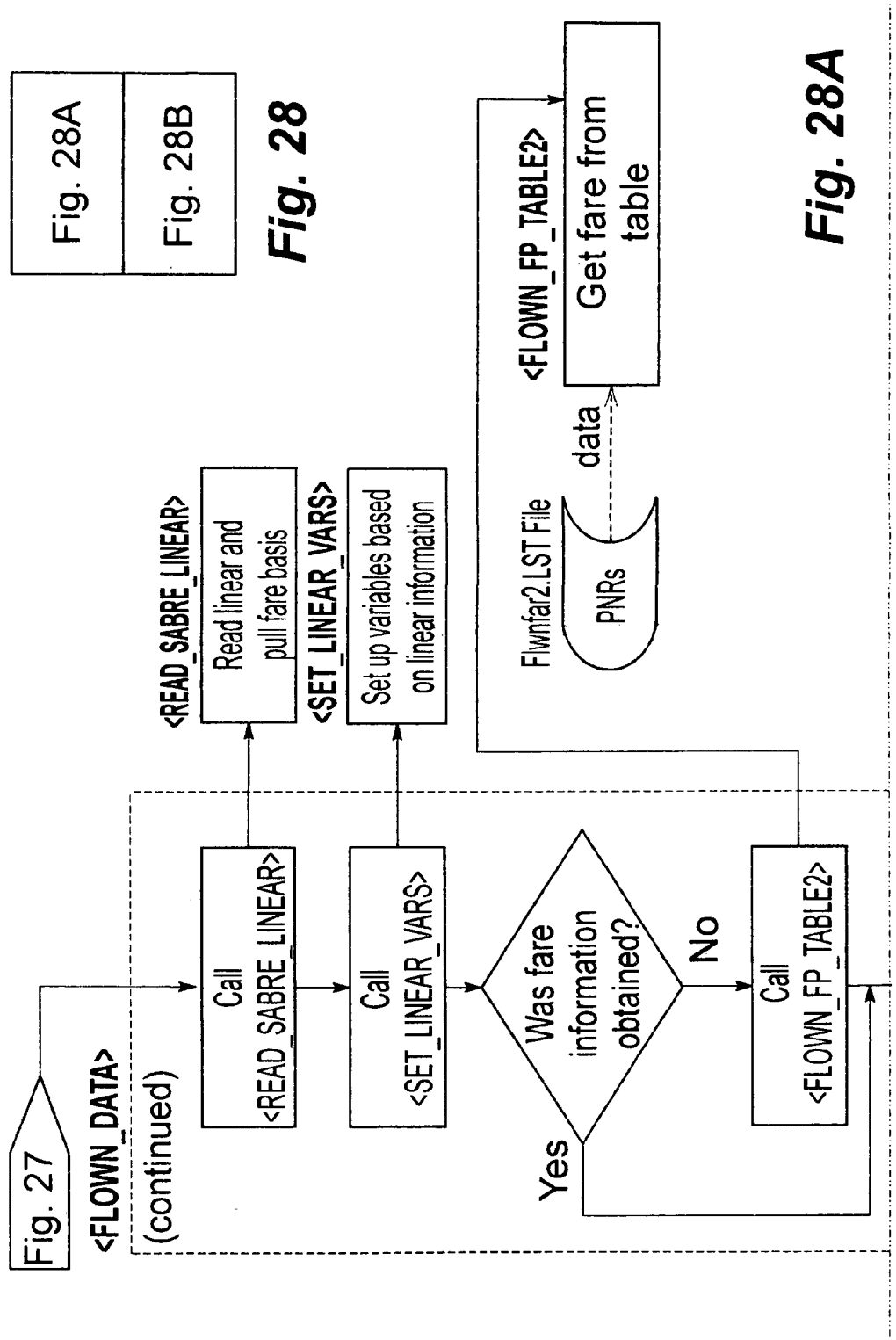
Figure 28B:
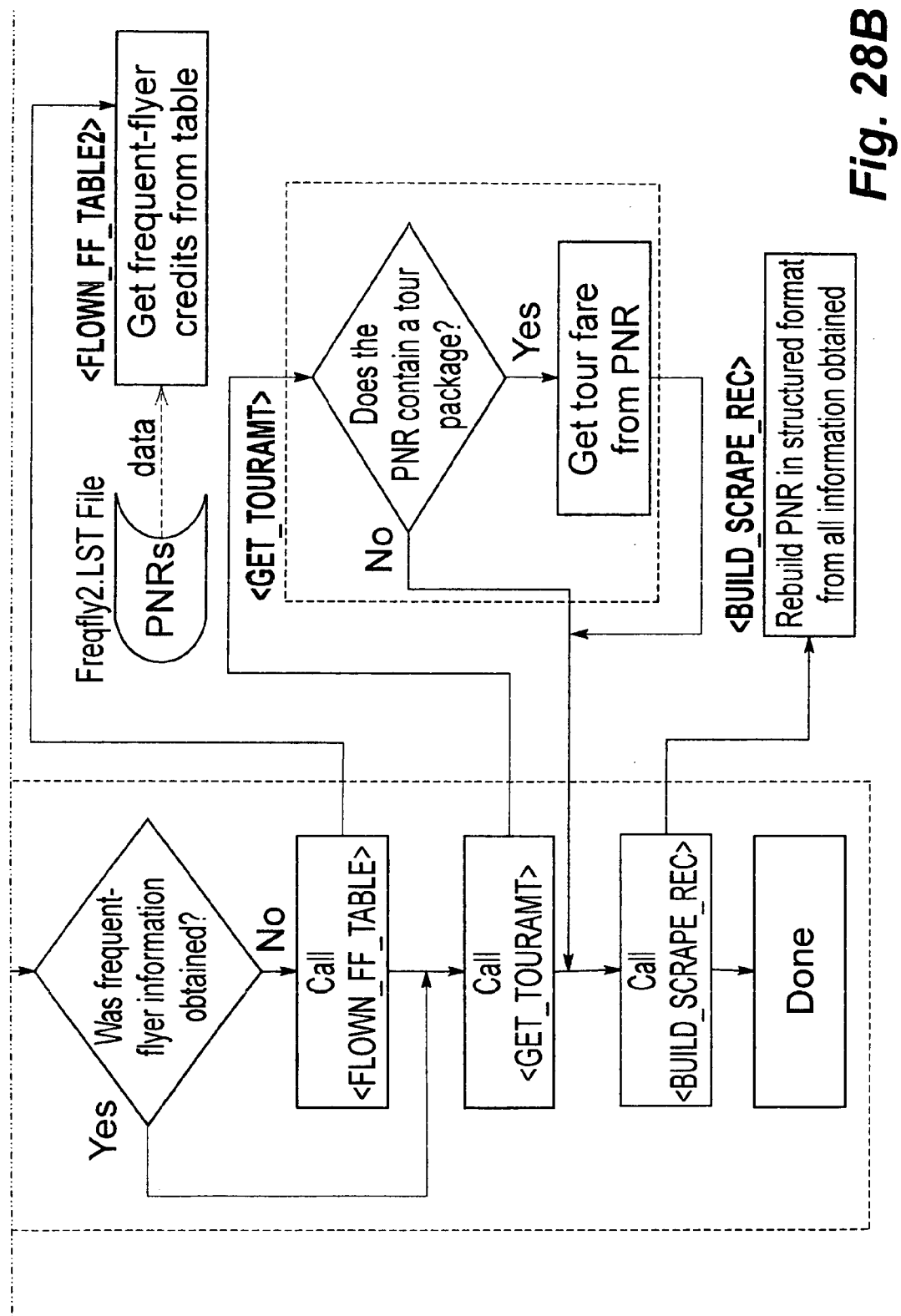

Referring particularly to FIG. 18, functionality is noted for determining whether a ticket number is associated with a given PNR. FIG. 19 provides functionality for checking for duplicate ticket numbers while FIG. 20 provides functionality for checking PNRs for expired TTLs. FIG. 24 provides functionality for building a database of canceled PNRs while FIG. 25 provides top of the day routines. FIGS. 26 through 28 provide functionality for PNR scraping, that is, the removal of a PNR from a reservations system.

For convenience in understanding the relationship of the various drawings, Table XIV is provided:

TABLE XIV

FIGURE TITLES AND INTER-FIGURE LINKS

Figure 8:
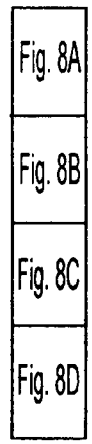
FIG. 8A is a flow chart illustrating sequences and operations by which the present system obtains PNRs.
FIG. 8B is a diagrammatical representation of an operational portion of the present system whereby new PNRs are identified and checked for expired TTLs.
FIG. 8C is a diagrammatical representation of an operational portion of the present system whereby new PNRs are further processed.
FIG. 8D is a diagrammatical representation of an operational portion of the present system whereby new PNRs are further processed.
Figure 8A:
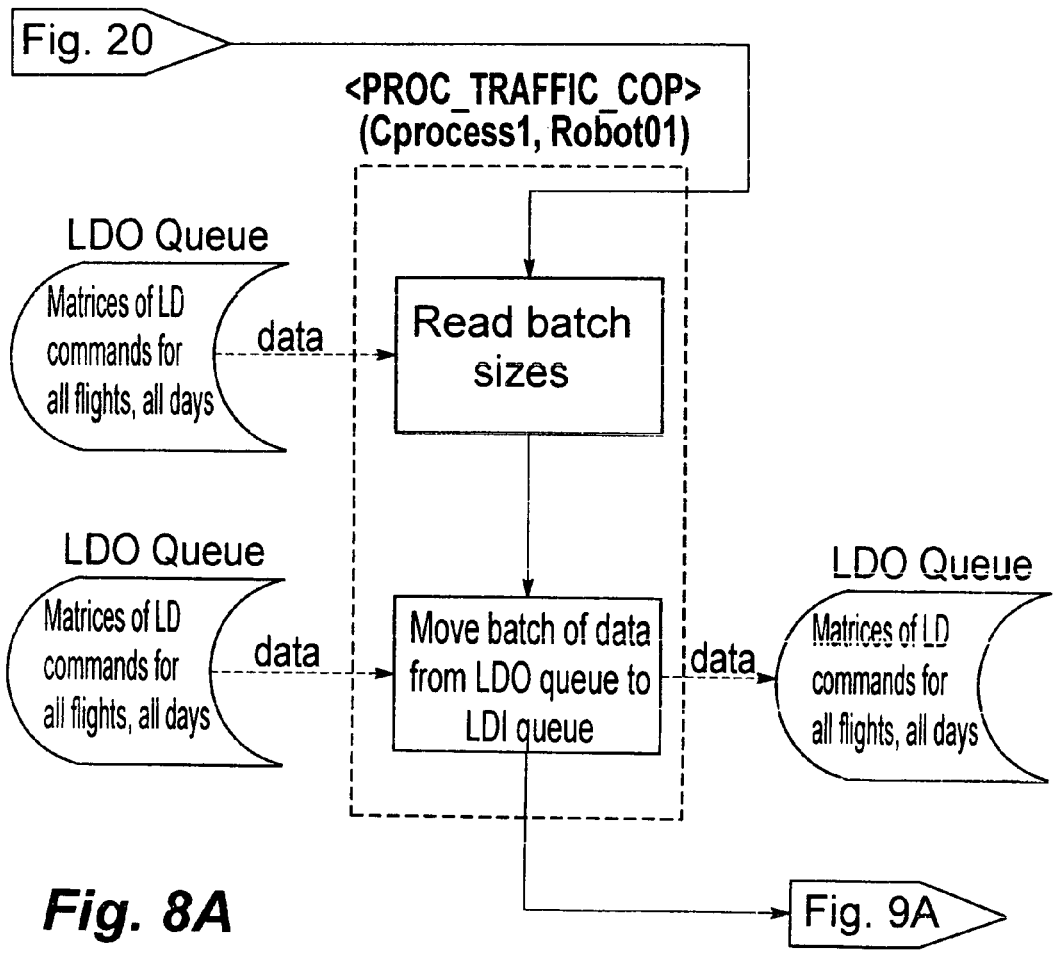
Figure 8B:
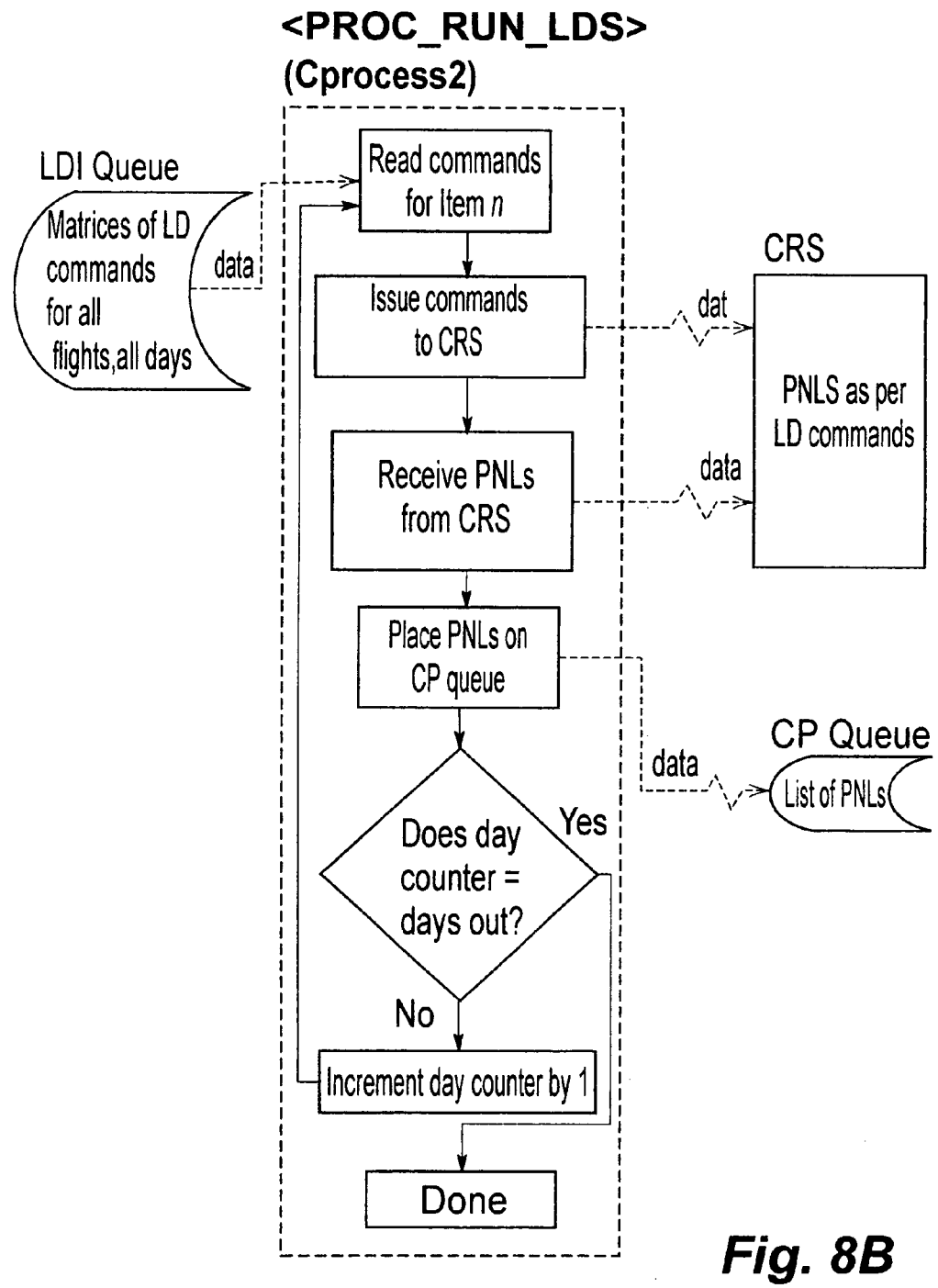
Figure 8C:
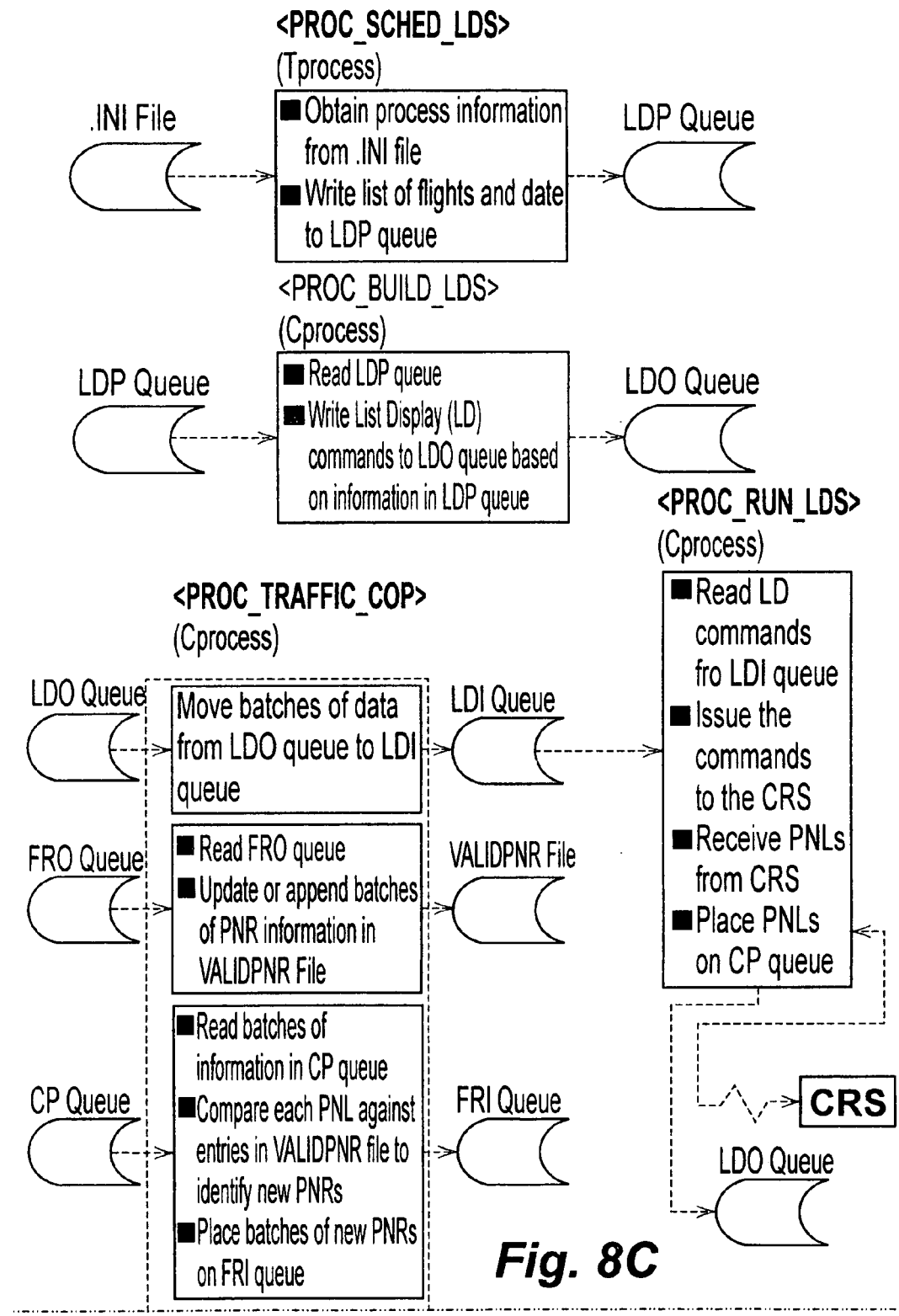
Figure 8D:
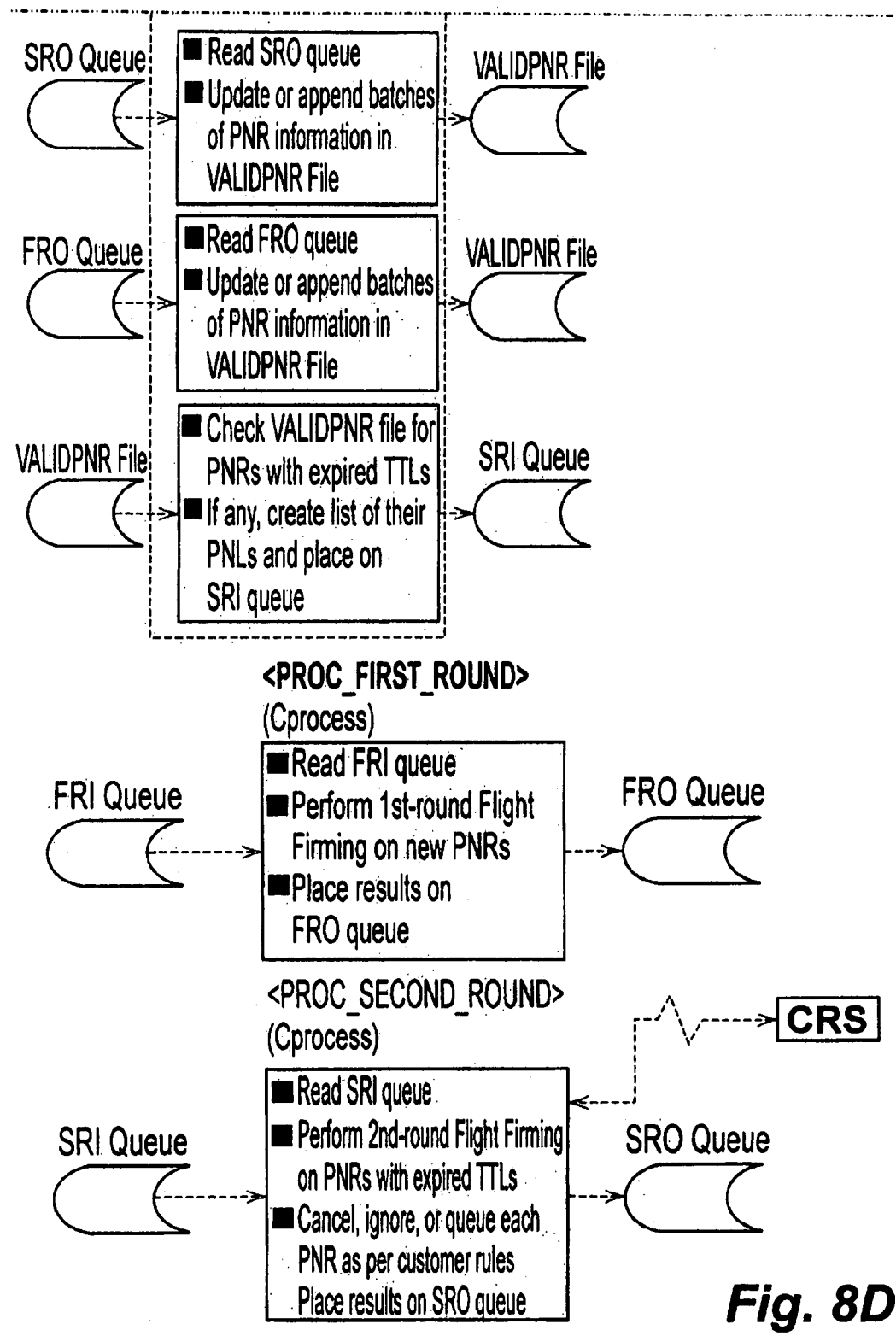

| FIG. | Title | Links In | Links Out |
|---|---|---|---|
| 4 | Robot Startup | | FIG. 4–6<br>FIG. 4–5 |
| 5 | Scheduling | FIG. 4–5 | |
| 6 | Running | FIG. 4–6 | |
| 7 | Preparing to Obtain PNRs | | |
| 8 | Obtaining PNRs | FIG. 20–8 | FIG. 8–9 |
| 9 | Identifying New PNRs | FIG. 8–9 | FIG. 9–20<br>FIG. 9–10 |
| 10 | SWEEPER (1st-Round Flight Firming) * Part 1 of 3 * | FIG. 9–10 | FIG. 10–13<br>FIG. 10–15<br>FIG. 10–26<br>FIG. 10–18<br>FIG. 10–18<br>FIG. 10–11<br>FIG. 10–18<br>FIG. 10–11 |
| 11 | SWEEPER (1st-Round Flight Firming) * Part 2 of 3 * | FIG. 10–11 | FIG. 11–13<br>FIG. 10–11 |

TABLE XIV-continued

FIGURE TITLES AND INTER-FIGURE LINKS

| FIG. | Title | Links In | Links Out |
|---|---|---|---|
| 12 | SWEEPER (1st-Round Flight Firming) * Part 3 of 3 * | FIG. 11–12 | |
| 13 | TROLL (Check for Suspicious Names) * Part 1 of 2 * | FIG. 10–13 | |
| 14 | TROLL (Check for Suspicious Names) * Part 2 of 2 * | | |
| 15 | DUPE SNOOPER (Duplicate Segment Processing) * Part 1 of 3 * | FIG. 10–15 | FIG. 15–16 |
| 16 | DUPE SNOOPER (Duplicate Segment Processing) * Part 2 of 3 * | FIG. 15–16 | FIG. 16–17 |
| | | | FIG. 16–17 |
| 17 | DUPE SNOOPER (Duplicate Segment Processing) * Part 3 of 3 * | FIG. 16–17 | |
| | | FIG. 16–17 | |
| 18 | Is There a Ticket Number on the PNR? | FIG. 10–18 | FIG. 18–19 |
| | | FIG. 22–18 | |
| | | FIG. 10–18 | |
| 19 | Checking for Duplicate Ticket Numbers | FIG. 18–19 | |
| | | FIG. 10–19 | |
| | | FIG. 22–19 | |
| 20 | Checking PNRs for Expired TTLs | FIG. 9–20 | FIG. 20–8 |
| 21 | ENFORCER (2nd-Round Flight Firming) * Part 1 of 3 * | FIG. 22–21 | FIG. 21–22 |
| | | | FIG. 21–23 |
| 22 | ENFORCER (2nd-Round Flight Firming) * Part 2 of 3 * | FIG. 21–22 | FIG. 22–18 |
| | | | FIG. 22–19 |
| | | | FIG. 22–21 |
| 23 | ENFORCER (2nd-Round Flight Firming) * Part 3 of 3 * | FIG. 21–23 | |
| 24 | Building Database of Canceled PNRs | | |
| 25 | Top-of-Day Routines | | |
| 26 | PNR Scraping * Part 1 of 3 * | FIG. 10–26 | FIG. 26–27 |
| 27 | PNR Scraping * Part 2 of 3 * | FIG. 26–27 | FIG. 27–28 |
| 28 | PNR Scraping * Part 3 of 3 * | FIG. 27–28 | |
| 2 | Data Flow | | |
| 3 | Sequences of Operations Involving Queues | | |

A process figure list is provided is provided in Table XV to reference processes to figure numbers.

TABLE XV

PROCESS FIGURE LIST

| Process | FIG. # |
|---|---|
| ADD_CANCELS_TO_DB | 24 |
| ADD_ITIN_FROM_HIST | 26 |
| ADD_TO_ITIN | 26 |
| AddCancelsToDB | See ADD_CANCELS_TO_DB |
| BUILD_ID_FLIGHT_LST | 7 |
| BUILD_SCRAPE_REC | 28 |
| CHASE_DIVIDED | 27 |
| CHECK_SUSPICIOUS_NAMES | 13 |
| CHECK_TICKETED | |
| CHG*VALPNR | 11 |
| DO*ET*ER | 11 |
| DO*QEP | 11 |
| EMAIL_SUSPICIOUS_NAMES | 14 |
| EXCEL_REPORT | |
| EXPAND_ITIN_N7 | 26 |
| FIRM_RULES1 (custom coded for each customer) | 11, 21 |
| FLOWN_DATA | 26, 27, 28 |
| FLOWN_FF_TABLE2 | 28 |
| FLOWN_FP_TABLE2 | 28 |
| GATHER_PNRCTR | |
| GET_ATN_TKT | 18 |
| GET_EXPIRING_TTLS | 20 |
| GET_FIRST_PNR_DATE | 26 |
| GET_NAMES3 | 13, 26 |
| GET_OSITKT | 18 |
| GET_SECTION | 27 |
| GET_ticket | 18 |
| GET_TICKETS | 27 |
| GET_TOURAMT | 28 |
| HANDLE_DUP_TKT | 19 |
| INIT | 4 |
| INIT2 | 4 |
| INIT3 | 4 |
| IS_IT_TICKETED | 18 |
| KILL*PNR | 21 |
| KILL_DUP_SEGMENTS | 15, 16, 17 |
| KILL_PNR_SUB1 | 23 |
| KILL_PNR_SUB2 | 21 |
| KILL_PNR_SUB3 | 22 |
| LOAD*DAILY | 4 |
| LOAD_SCHED | 5 |
| LOG_VALTKT | 19 |
| MAIN | 4 |
| MAIN_SR | 4 |
| PROC*PNR*STUB | 12 |
| PROC_BUILD_LDS | 7 |
| PROC_FIRST_ROUND | 9 |
| PROC_PNR | 10, 11 |
| PROC_RUN_LDS | 8 |
| PROC_SCHED_LDS | 7 |
| PROC_SECOND_ROUND | 21 |
| PROC_TRAFFIC_COP | 8, 9, 11, 20 |
| PULL_ITIN | 26 |
| PULL_SABRE_WP | 27 |
| PULL_TICKETS | 18 |
| READ_PNR | 9, 21 |
| READ_SABRE_LINEAR | 28 |
| RECORD_TKTS | 18 |
| RIP_OUT_ADDRESS | 27 |
| RIP_OUT_FFN | 27 |
| RUN_CONT_SCHED | 6 |
| RUN_SCHED | 6 |
| RUN_TP_SCHED | 6 |
| SET*STUFF | 4 |
| SET_CONT_SCHED | 5 |
| SET_KAFON | 4 |
| SET_LINEAR_VARS | 28 |
| SET_TP_SCHED | 5 |
| SIGNIN*TAS | 4 |
| SOCKET_CHECK-IN | |
| STORE*DAILY | 6 |
| STORE*DAILY*DIFF | 6 |
| TOP_OF_DAY (custom coded for each customer) | 25 |
| TTL*CAN | 21 |

After a PNR image has been obtained as aforesaid, certain techniques are used in the code to retrieve desired information. Since a wide variation can exist in the appearance of one PNR as compared to another, most of the following parsing techniques have been empirically developed. In general, a function will scan a PNR image and look for something unique such as keywords or positions in order to identify a section of the PNR. Table XVI provides examples of keywords.

TABLE XVI

| Keywords | Meaning |
|---|---|
| #.# | Identifies a passenger name |
| # flight date board off | Identifies the pattern for an itinerary |
| CHECK, CK | Keywords for forms of payment |
| CASH, CK | |
| CC | |
| FREQUENT TRAV | Keywords for frequent-traveler section (Sabre) |

Table XVII provides examples of positions and keywords.

TABLE XVII

Examples of Positions and Keywords

| Section names that could directly follow the itinerary section | Keywords For Phone-Number Section | Keywords For Form-Of-Payment Section | CRS/GDS |
|---|---|---|---|
| BAGGAGE VCR COUP GENERAL TICKETIN TKT/TIME REMARKS PHONES SEATS/BO RECEIVED FARE-P FREQUENT ca FACTS (where ca is Carrier Code) | PHONES | REMARKS | SABRE, SABRESTIN |
| FONE- TKT-T GEN FAX- TLT- | FONE- | | SHARES |
| FONE- *** | FONE- | FOP:- | APOLLO |
| AP TK SSR | AP | FP | AMADEUS |
| P-1 T-1 A-1. | P-1 | FOP- | WORLDSPAN |
| HA FAX- FONE- RMKS- TKT- | FONE- | | DELTAMATIC |

When the desired section has been found, information in the section is then utilized or processed as required such as via the following processing steps:
1) Find PNR by passenger name
2) Obtain record locator for PNR
3) Log the information
4) Use fax number or email address to send a message
5) Process information in the PNR by IATA
6) Evaluate frequent-flyer information
7) Check for existence of ticket numbers for TTL assignments
8) Check for duplicate ticket numbers
9) Check for valid passenger names (lastname/firstname or initial)
10) Check for fictitious passenger names
11) Match PNRs for TTR processing
12) Evaluate booking source (do not assign TTL to host-generated booking)
13) Evaluate itinerary for TTL assignments
14) Evaluate linear for pricing information (this is the only place that price-per-segment information can be found)

A PNR example is particularly provided in Table XVIII:

TABLE XVIII

PNR Example

| Contents of PNR | Entries | Explanation |
|---|---|---|
| 1P-2L4OI3 | 1P-2L4OI3 | GDS code (Worldspan) PNL (Record locator) |
| 1.1DASH/ MEENAKSHI@*ADT | 1.1DASH/ MEENAKSHI@*ADT | Group#.Person# Passenger last name/ First name ? |
| 1 N7 100H 18APR T MDWLAS HK1 815A 1015A/O A | 1 N7 100H 18APR T MDWLAS HK1 815A 1015A/O A | First leg Carrier (National) Flight number Class Day Month Day of week (Tuesday) Market Status (Holding confirmed) Total in party Departure time (8:15 AM) Arrival time (10:15 AM) ? |
| 2 N7 306B 20APR T LASMDW HK1 330P 905P/O A | 2 N7 306B 20APR T LASMDW HK1 330P 905P/O A | Second leg Carrier (National) Flight number Class Day Month Day of week (Tuesday) Market Status (Holding confirmed) Total in party Departure time (3:30 PM) Arrival time (9:05 PM) ? |
| 3 TVL ZZ MK1 MI 0OCT00/AN-THANK YOU FOR CHOOSING CINTAS TRAVEL P- 1.7JX513-573-4153-FAX | | New Section—Phone (fax) |
| 2.7JXVERIFY SPELLING OF NAME************************ T- 1.TA W/62/13APR// OK.TKTLESS | | New Section—Ticket Information |
| A-CA300100 A-CM5*$C50.00 A-1.CB CINTAS*DEL. DATE 2.CB PERSON WHO MADE RES AND LOCATION 1.CD CINTAS CORPORATION 2.CD 6800 CINTAS BLVD 3.CD CINCINNATI OHIO 45262-5737 TKG FAX-AUTO PRICED FARE TYPE EX | | New Section |
| | | New Section—Ticketing Facts |
| FQ-4PQ | | New Section—Fare Quote |

TABLE XVIII-continued

PNR Example

| Contents of PNR | Entries | Explanation |
|---|---|---|
| FARE QUOTED 13APR BY AGT-40/7JX | | |
| ADT CHI N7 LAS 238.14N7 CHI 284.65USD522.79END N7 ZPMDWLAS XF MDW3LAS3 BF-522.79 TX-50.21 TTL-573.00 HA3*B TOTAL BF-522.79 TX-50.21 TTL-573.00 USD | | Linear |
| *** DI ITEMS EXIST *** | | |
| FOP-1.CCAX37-nnnnnnnn11777 | | New Section—Form of Payment (Credit Card) |
| 2. /EXP12-02 | | (Expiration date) |
| G- 1.OSI YY CVG CONTACT 513-573-4034 HEIDI MARIE OR MARY | OSI | New Section—General Other Special Instructions |
| 2.SSRADTK1PPLZ SEND TKT NO IN OSI/SSR FIELD BY 1700/17APR PST | | Robot-generated message to travel agent |
| M- 1./CINTAS CORPORATION 2./6800 CINTAS BLVD 3./CINCINNATI OH 45262 8.DK/DP301 9.MK-01 11.DK/AS94 13.DK/FF763.00*A/ LF573.00 | | New Section |
| **** ITEMS SUPPRESSED ****/ CN/ML/U/EDT/QF/DR | | |

Table XIX further provides a linear example of a round trip of a typical type.

TABLE XIX

Linear Example
Round trip—Los Angeles (LAX) to Las Vegas (LAS) and return

| Linear | LAX N7 LAS R32.50KR7NR/CD N7 LAX R32.50KR7NR/CD END FARE USD 65.00 TAX 6.00XF 5.20US 4.00ZP TOT USD 80.20 |
|---|---|
| Code: | Meaning: |
| LAX | Board City |
| N7 | Carrier for first segment |
| LAS | Off City; Board City |
| R32.50 | Fare for first segment |
| KR7NR/CD | Fare Basis with Discount |
| N7 | Carrier for second segment |
| LAX | Off City |
| R32.50 | Fare for second segment |
| KR7NR/CD | Fare Basis with Discount |
| END | End of fare calculation |
| FARE USD | Fare is in US Dollars |
| 65.00 | Total Fare |
| TAX | Tax |
| 6.00 | Amount of tax ($6.00) |
| XF | Fee |
| 5.20 | Amount of XF fee ($5.20) |
| US | Fee |
| 4.00 | Amount of US fee ($4.00) |
| ZP | Fee (none charged) |
| TOT USD | Total is in US Dollars |
| 80.20 | Total Fare (including fees) |

As indicated hereinabove, the following Table provides terms and abbreviations which facilitate an understanding of the invention:

TABLE XX

Terms and Abbreviations

Airline Industry:

A

| ACT | Actuals capacity |
|---|---|
| Actuals | Number of passengers who were on a flight |
| AD | Advanced Departure (leg is next day after trip starts) |
| ADT | Auditor |
| ADTK | Advise ticket number (request for TKNN) |
| ARC | Travel agent's ID code (U.S.) |
| ARNK | Arrival Unknown (how passenger got to the flight is not known) |
| Arr | Arrival time |
| ATAC | Automated Ticket Agent Checkout; Sabre report of day's activity of each employee |
| ATN | Automatic Ticket Notification (from GDS to CRS when travel agent issues ticket) |
| AUT | Authorized capacity |

B

| Board | City where passenger gets on board aircraft |
|---|---|

C

| C20 | Sabre report showing which employees were active on a given day for a given station # |
|---|---|
| CA | Cash payment |
| CC | Credit Card payment |
| CK | Check payment |
| Class | Level of luxury of flight accommodations |
| Confo | Confirmation |
| CPN | Coupon |
| CRS | Central Reservation System (for airlines) |

D

| Dept | Departure time |
|---|---|
| Direct Market | Non-stop flight |

E

| E-Tkt | E-ticket (electronic ticket) |
|---|---|

F

| FFS | Frequent Flyer System for National (points for $, not miles—unlike most others) |
|---|---|
| FLN | Flown |
| Flt | Flight |
| FOP | Form of Payment |

G

| GDS | Global Distribution System (for travel agents) |
|---|---|
| GMT | Greenwich Mean Time (Coordinated Universal Time; Zulu time) |
| Go-show | Passenger who shows up to board with a reservation but no ticket |
| Group | Parties of (usually) 10 or more on a PNR |

H

| HA | Host Airline |
|---|---|
| HL | On wait list |
| HK | Holding confirmed reservation |
| Host | The airline issuing the ticket |

I

| IATA | Travel agent's ID code (international) |
|---|---|
| Indirect Market | Flight with intermediate stops |

J, K, L

| LD | List Display (display a PNR) |
|---|---|
| Leg | The part of a flight between stops (term used by operations; also see Segment) |
| Linear | Info on a ticket that shows the flow of the flight, start to end, with pricing and fees |

TABLE XX-continued

Terms and Abbreviations

M

| | |
|---|---|
| MKT | Market (board city/off city) (Example: LASLAX = Las Vegas/Los Angeles) |
| MM | Meal Moocher (employee: free ticket) |

N

| | |
|---|---|
| NFL | New (schedule change) |
| NN | Need seat(s) |
| No-show | Passenger who has a ticket but fails to show up |
| NON-REV | Non Revenue (free ticket) |

O

| | |
|---|---|
| O&D | Origin and Destination (complete itinerary) |
| OA | Other Airline |
| Off | City where passenger gets off aircraft |
| OSI | Other Special Instructions |
| OTHS | Others ????????????????? |
| OW | ???? |

P

| | |
|---|---|
| Passive | ???? |
| PAX | Passenger |
| PDC | Post-Departure Checkout |
| PK | Passive booking (??????????? |
| PNL | PNR Record locator (6 characters) |
| PNR | Passenger Name Record |
| PTC | Passenger Type Code |

Q

| | |
|---|---|
| Queue | A location on a CRS or GDS for data to be stored |
| QR | ???? |

R

| | |
|---|---|
| RT | ???? |

S

| | |
|---|---|
| Segment | The part of a flight between stops (term used by planners/schedulers; also see Leg) |
| Skd | Schedule |
| SSR | Special Service Request |

T

| | |
|---|---|
| TA | Travel Agent; Ticket Agent; Terminal Address |
| TBM | Ticket by Mail |
| TD | Table Driven (no fare info available—default table used as source for fare info) |
| TKNN ### . . . | Ticket number is ############ (response to ADTK) |
| TKNO | Ticket Number |
| Tkt | Ticket |
| TOD | Ticket on Departure (?????????) |
| TTL | Ticket Time Limit (based on time zone of a city—usually airline's home base) |
| TTR | Teletype Reject (problem with communication between GDS and CRS) |

U

| | |
|---|---|
| UC | Unavailable |
| UFL | Update (schedule change) |
| UN | Unavailable |
| UTC | Coordinated Universal Time (Greenwich Mean Time; Zulu time) |

V

| | |
|---|---|
| VCR | Virtual Coupon Record (an e-ticket) |
| VIPC | Advanced booking data (?) |

W, X, Y, Z

| | |
|---|---|
| WP | Will you Price (?) |
| XFL | Cancel (schedule change) |
| XLD | Cancelled |
| ZFL | Equipment or time (schedule change) |

Airline Automation, Inc.

| | |
|---|---|
| AAI | Airline Automation, Inc. |
| APARS ™ | Automated Postal Air-Res System |
| CMP | Component (In a *.sf file, a "drawer" that can contain anything) |
| CPN | Coupon; Coupon file (*.cpn) |
| Cprocess | Continuous process (cooperative process) |
| CSV | Comma Separated Variables file (*.csv) (for spreadsheet compatibility) |
| C/Y | Current Year (may be defined several ways, as appropriate) |
| Dupe Snooper | A service of AAI that searches for duplicate bookings and process them according to customer's rules |
| EDI | Electronic Data Interchange (used in APARS) |
| Enforcer | The second round of Flight Firming. Processes PNRs with expired TTLs but no tickets, as per the customer's rules (cancel, warn again, ignore, etc.) |
| ERR | Error; Error file (*.err) |
| ETKT | E-ticket (electronic ticket) |
| Flight Firming | A service of AAI that enforces an airline carrier's ticketing time limits (TTL's) |
| FLN | Flown file (*.fln) |
| FTP | File Transfer Protocol (used when transferring files over the Internet) |
| FTS ™ | Frequent Traveler System |
| FSAS ™ | Flight Schedule Automation System |
| HLD | Hold file (*.hld) (for file locking) |
| INI | Initialization file (*.ini) |
| Ign, Ignr | Ignore |
| LAN | Local Area Network |
| LOG | Log file (*.log) |
| MBS | Access Database file (*.mbs) |
| NPC | National Processing Company (processes commission payments to TAs); NPC file (*.npc) |
| OSG | Open Systems Gateway (Sabre Gateway for NT) |
| OSP | Open Systems Platform (Sabre communications infrastructure) |
| OUT | Out file (*.out) (for NPCs) |
| PARM | Parameter (used to pass a value from INI file to a process) |
| PDC | Pdc file (*.pdc) ???????????? |
| PK | Passive Booking |
| Predator ™ | Family of AAI's modules and robotic applications |
| PRN | Print file (*.prn) |
| PUR | Pur file (*.pur) ???????????? |
| P/Y | Prior Year (may be defined several ways, as appropriate) |
| Q | Queue |
| Queue | A pair of files, one of which contains items to be worked, the other contains tracking information about the items |
| RPT | Report; Report file (*.rpt) |
| SAFIRE ™ | System Automation for Intelligent Rate Efficiency |
| Scraping | A service of AAI that reproduces a PNR in a standard format from historical and other information associated with the PNR over its lifetime. The term "scraping" comes from the concept of obtaining an image of the PNR as scraped off the screen on which it is displayed. |
| SF | An APL file (*.sf) "cabinet" whose "drawers" are called "components" |
| Sweeper | The first round of Flight Firming. Determines if new PNRs need a TTL set; if so, sets a TTL and informs the booking agent that a ticket is needed before the TTL expires |
| Tie | To open a file for use ("exclusive tie"—file is unavailable to any other process; "share tie"—file may be accessed on a limited basis by other processes) |
| TBR | Ticket by Robot |
| TMS ™ | Tour Management System |
| Tprocess | Timed process (runs at specific times of day) |
| Troll | A service of AAI that searches for suspicious names in PNRs processed by Sweeper, and alerts the customer by email |
| TXT | Text file (*.txt) |
| UNB | Unb file (*.unb) ???????????? |
| VCR | Virtual Coupon Record (an e-ticket); Vcr file (*.vcr) |
| W3 | APL code file (*.w3) |
| WAN | Wide Area Network |

TABLE XX-continued

Terms and Abbreviations

Time Zones:

| | | |
|---|---|---|
| US1 | EST/EDT Eastern Standard/Daylight Time | |
| US2 | CST/CDT Central Standard/Daylight Time | |
| US3 | MST/MDT Mountain Standard/Daylight Time | |
| US3A | MST (no daylight saving) Arizona (also robot time) | |
| US4 | PST/PDT Pacific Standard/Daylight Time | |

Days of the Week:

Airlines

| 1 | M | Monday |
| 2 | T | Tuesday |
| 3 | W | Wednesday |
| 4 | Q | Thursday |
| 5 | F | Friday |
| 6 | J | Saturday |
| 7 | S | Sunday |

AAI's APL code

| 0 | | Monday |
| 1 | | Tuesday |
| 2 | | Wednesday |
| 3 | | Thursday |
| 4 | | Friday |
| 5 | | Saturday |
| 6 | | Sunday |

GDS/CRS Codes:

GDS

| IA | Amadeus |
| IV | Apollo |
| IG | Galileo |
| IS | System One |
| IP | Worldspan |
| SA | SabreSTIN (Sabre Travel Information Network) |

CRS

| AA (SAB) | Sabre (OSG1: 56K) (OSG2: 256K) (OSG3: 256K) Mexicana Centauro EDS Shares |
| SHR | Shares |
| MAR | Marsha |
| DLT | Deltamatic |
| MBB | Magic Black Box |

Commands:

Signout

| SO | Sabre, SabreSTIN |
| BSO | Shares |
| SOF | Apollo |
| JO | Amadeus |
| DSO | Deltamatic |

Other

| AAA xxx | Change sign-in location of terminal to xxx (where xxx = HDQ, XTM, citycode, pseudo city code, etc.) |

Codes

| HDQ | Headquarters (location of terminal for most communications) |
| XTM | Centralized Ticket by Mail—Texas (location of terminal for ticket by mail) |

Airline Carrier Codes:

| 6Y | Nica (Grupo Taca) |
| AA | American Airlines (includes: Aadom, Aaeuro, Aajpn, Aalary, Aalat, Aamex, Aatar, Aauk, Aausa) |
| AR | Aerolinas Argentina |
| AS | Alaska |
| BD | British Midlands |
| BW | BWIA (British West Indies) |
| CM | COPA |
| DL | Delta |
| FF | Tower |
| GU | Aviateca (Grupo Taca) |
| HA | Hawaiian |
| JI | Midway |
| KP | Kiwi |
| LR | LACSA (Grupo Taca) |
| MX | Mexicana |
| N7 | National |
| QQ | Reno |
| TA | Taca (Grupo Taca) |
| TZ | American Trans Air (ATA) |
| WN | Southwest Airlines |
| YX | Midwest Express |
| YY | All carriers (used in messages) |

Although the present method and system have been particularly described relative to flight firming processes, it is to be understood that the invention could be configured to provide other services of a similar nature. Within flight firming itself, it is to be understood that certain functionalities can be practiced other than as explicitly described herein. Still further, certain functionalities can be dropped from the methodology altogether, one example being the traffic cop function referred to herein. A system without such a function would simply look at all PNRs rather than only new PNRs. Such a system would require a greater amount of time for processing all PNRs within a reservations system. However, the intended function could be provided. Accordingly, it is to be understood that the scope of the invention is not to be limited by the description of a particular embodiment of the invention but is to be limited only by the recitations of the appended claims.

What is claimed is:

1. In a flight firming process for automated firming of flight reservations made by a reserving entity for services which are to be confirmed by payment for said services prior to delivery of the services, which reservations are listed in a central database of reservations, the database being accessed with a computer operated by a computer program having a set of limiting standards to be applied to each reservation determined to be unconfirmed, the reserving entity being informed in an automated manner in accordance with the set of limiting standards of the need to confirm the reservation before expiration of time limitations established by the set of limiting standards, the improvement comprising:
   coordinating access to the database to acquire data for operations therewith and scheduling said operations;
   returning the data to the database after operations are performed thereto to a predetermined location within the database, to thereby update the database, all steps being accomplished by the computer program; and,
   assigning a new reservation to a robot, the robot assigning all or any portion of the limiting standards to the new reservation according to limitations imposed by the standards and issuing a warning message to the reserving entity in the event the reservation is not confirmed.

2. In the process of claim 1 wherein the predetermined location is a queue and the data is present in the form of a multiplicity of batches.

3. In the process of claim 2 wherein the improvement further comprises the step of increasing sizes of the batches in response to increasing levels of process activity.

4. In the process of claim 1 wherein confirming of a reservation comprises the step of issuing a ticket for the services.

5. In the process of claim 1 wherein the improvement comprises checking of reservations by the computer program for expired limiting standards and assigning of the reservation to a second robot which checks the reservation to determine confirmation status of the reservation and, depending on confirmation status, either cancels, queues, updates the reservation or adds another warning message to the reservation for informing the reserving entity depending upon a second set of limiting standards.

6. In the process of claim 1 wherein the process steps are effected remotely of the database of reservations.

7. In a system for firming flights in a central reservations system wherein the system includes a computer and at least one computer program for providing instructions to the computer, the central reservations system listing flight reservations issued by at least one reserving entity, the reservations being subject to ticketing according to a set of ticketing time limit rules, reservations and time limit rules to be applied to the reservations being obtained from the central reservations system, new reservations not previously subjected to flight firming being identified and assigned for flight firming, the new reservation being assigned one or more rules of the ticketing time limit rules and having a warning message added to the reservation in the event the reservation is not ticketed, the reserving entity being informed of the need to ticket the reservation subject to a set of conditions, the reservation being contained in a central database, the improvement comprising:

means for coordinating access to the database to acquire each reservation for operations thereon and for scheduling operations on each reservation;

means for returning each reservation to the database after the performance of operations thereon to a predetermined location within the database to thereby update the database, functions accomplished by the coordinating means and the reservation returning means being accomplished by the computer; and, means for checking reservations to determine issuance status of a ticket and, depending on issuance status, either cancels, queues, updates the reservation or adds another warning message to the reservation for transmittal to the reserving entity.

8. In the system of claim 7 wherein the computer program contains a set of standards indicative of suspicious names established according to certain criteria, the improvement further comprising means for checking the reservations for suspicious names.

9. In the system of claim 8 wherein data relating to the reservations and in a predetermined location is in a queue and the data is in the form of a multiplicity of batches, the improvement further comprising means for increasing size of at least certain of the batches in response to increasing levels of flight firming activity by the computer.

10. In the system of claim 7 wherein the improvement further comprises means for distributing data across the database to prevent data from becoming concentrated in any particular location within the database.

11. In the system of claim 7 wherein the improvement further comprises means for checking a reservation for duplicate flight segments.

12. In the system of claim 7 wherein the system is remote from the central reservations system.

13. In the system of claim 7 wherein the improvement further comprises means for checking reservations previously subjected to flight firming and assigning said reservations for further flight firming processing to determine whether the reservations have been confirmed.

14. In the system of claim 13 wherein the previously checked reservation is not confirmed, the improvement further comprising means for canceling, queuing or updating the reservation according to a further set of rules and transmitting such processing to the reserving entity.

15. In a flight firming process for automated firming of flight reservations made by a reserving entity for services which are to be confirmed by payment for said services prior to delivery of the services, which reservations are listed in a central database of reservations, the database being accessed with a computer operated by a computer program having a set of limiting standards to be applied to each reservation determined to be unconfirmed, the reserving entity being informed in an automated manner in accordance with the set of limiting standards of the need to confirm the reservation before expiration of time limitations established by the set of limiting standards, the improvement comprising:

coordinating access to the database to acquire data for operations therewith and scheduling said operations;

returning the data to the database after at least some of said operations are performed thereto to a predetermined location within the database, to thereby update the database, all steps being accomplished by the computer program;

checking said reservations for duplicate reservation numbers; and, assigning a new reservation to a robot, the robot assigning all or any portion of the limiting standards to the new reservation according to limitations imposed by the standards and issuing a warning message to the reserving entity in the event the reservation is not confirmed.

16. In the process of claim 15 wherein the predetermined location is a queue and the data is present in the form of a multiplicity of batches.

17. In the process of claim 16 wherein the improvement further comprises the step of increasing sizes of the batches in response to increasing levels of process activity.

18. In the process of claim 15 wherein confirming of a reservation comprises the step of issuing a ticket for the services.

19. In the process of claim 15 wherein the improvement comprises checking of reservations by the computer program for expired limiting standards and assigning of the reservation to a second robot which checks the reservation to determine confirmation status of the reservation and, depending on confirmation status, either cancels, queues, updates the reservation or adds another warning message to the reservation for informing the reserving entity depending upon a second set of limiting standards.

20. In the process of claim 15 wherein the process steps are effected remotely of the database of reservations.

21. In a system for firming flights in a central reservations system wherein the system includes a computer and at least one computer program for providing instructions to the computer, the central reservations system listing flight reservations issued by at least one reserving entity, the reservations being subject to ticketing according to a set of ticketing time limit rules, reservations and time limit rules to be applied to the reservations being obtained from the central reservations system, new reservations not previously subjected to flight firming being identified and assigned for flight firming, the new reservation being assigned one or more rules of the ticketing time limit rules and having a warning message added to the reservation in the event the reservation is not ticketed, the reserving entity being informed of the need to ticket the reservation subject to a set of conditions, the reservation being contained in a central database, the improvement comprising:

means for coordinating access to the database to acquire each reservation for operations thereon and for scheduling operations on each reservation;

means for returning each reservation to the database after the performance of operations thereon to a predetermined location within the database to thereby update the database;

means for checking a reservation for duplicate ticket numbers, functions accomplished by the coordinating means, the reservation returning means and the reservation checking means being accomplished by the computer; and, means for checking reservations to determine issuance status of a ticket and, depending on issuance status, either cancels, queues, updates the reservation or adds another warning message to the reservation for transmittal to the reserving entity.

22. In the system of claim 21, wherein the computer program contains a set of standards indicative of suspicious names established according to certain criteria, the improvement further comprising means for checking the reservations for suspicious names.

23. In the system of claim 22 wherein data relating to the reservations and in a predetermined location is in a queue and the data is in the form of a multiplicity of batches, the improvement further comprising means for increasing size of at least certain of the batches in response to increasing levels of flight firming activity by the computer.

24. In the system of claim 21 wherein the improvement further comprises means for distributing data across the database to prevent data from becoming concentrated in any particular location within the database.

25. In the system of claim 21 wherein the improvement further comprises means for checking a reservation for duplicate flight segments.

26. In the system of claim 21 wherein the improvement further comprises means for checking a reservation for existing ticket numbers.

27. In the system of claim 21 wherein the improvement further comprises means for checking any reservation without a ticket number for existing ticketing time limit rules.

28. In the system of claim 21 wherein the system is remote from the central reservations system.

29. In the system of claim 21 wherein the improvement further comprises means for checking reservations previously subjected to flight firming and assigning said reservations for further flight firming processing to determine whether the reservations have been confirmed.

30. In the system of claim 29 wherein the previously checked reservation is not confirmed, the improvement further comprising means for canceling, queuing or updating the reservation according to a further set of rules and transmitting such processing to the reserving entity.

\* \* \* \* \*